US009188198B2

United States Patent
Hall et al.

(10) Patent No.: US 9,188,198 B2
(45) Date of Patent: Nov. 17, 2015

(54) DRIVE TRAIN AND SYSTEMS FOR A THREE-WHEELED VEHICLE

(71) Applicant: Tanom Motors, LLC, Culpeper, VA (US)

(72) Inventors: Merrill C. Hall, Culpeper, VA (US); David M. Ankin, Jamestown, NC (US); Jody L. Rawson, Charlotte, NC (US); John A. Willes, Sr., Charlotte, NC (US)

(73) Assignee: Tanom Motors, LLC, Culpeper, VA (US)

( * ) Notice: Subject to any disclaimer, the term of this patent is extended or adjusted under 35 U.S.C. 154(b) by 0 days.

(21) Appl. No.: 14/526,074

(22) Filed: Oct. 28, 2014

(65) Prior Publication Data

US 2015/0114740 A1    Apr. 30, 2015

Related U.S. Application Data

(60) Provisional application No. 61/896,453, filed on Oct. 28, 2013.

(51) Int. Cl.
| | |
|---|---|
| *F16H 3/22* | (2006.01) |
| *B62K 5/027* | (2013.01) |
| *B62K 5/05* | (2013.01) |
| *B62M 9/04* | (2006.01) |
| *F16H 61/68* | (2006.01) |
| *F16H 61/02* | (2006.01) |

(52) U.S. Cl.
CPC ... *F16H 3/22* (2013.01); *B62K 5/027* (2013.01); *B62K 5/05* (2013.01); *B62M 9/04* (2013.01); *F16H 61/0246* (2013.01); *F16H 61/68* (2013.01)

(58) Field of Classification Search
CPC ....... F16H 3/22; F16H 61/0246; F16H 61/68; B62K 5/05; B62K 5/027; B62M 9/04
See application file for complete search history.

(56) References Cited

U.S. PATENT DOCUMENTS

| | | |
|---|---|---|
| D55,440 S | 6/1920 | Smith |
| 1,989,995 A | 2/1935 | Martin |
| D94,847 S | 3/1935 | Martin |
| 2,382,927 A | 8/1945 | Whitacre |
| 2,773,392 A | 12/1956 | Cizek |

(Continued)

OTHER PUBLICATIONS

Joseph, Noah, "Part Harley, Part Hot Rod, All Crazy," [retrieved from the Internet], Campagna V13R [retrieved on Oct. 12, 2012], Oct. 27, 2011.

(Continued)

*Primary Examiner* — Drew Brown
(74) *Attorney, Agent, or Firm* — Cooley LLP

(57) ABSTRACT

An apparatus includes a housing, an input portion including an input gear, an idler portion including an idler gear, and an output portion including an output gear and an output member disposed outside of the housing and substantially coplanar with a drive portion of a rear wheel assembly. The housing can couple to an engine assembly such that rotation of an engine output member rotates the input gear. The input gear can move within the housing between a first position, in which the input gear engages the idler gear and is spaced apart from the output gear to indirectly rotate the output gear in a first direction via the idler gear, and a second position, in which the input gear engages the output gear and is spaced apart from the idler gear to directly rotate the output gear in a second direction. The output member rotates with the output gear.

27 Claims, 34 Drawing Sheets

(56) References Cited

U.S. PATENT DOCUMENTS

| | | | |
|---|---|---|---|
| 2,788,858 | A | 4/1957 | Aasland et al. |
| 2,818,929 | A | 1/1958 | Kucera |
| 3,419,098 | A | 12/1968 | Mayers et al. |
| 3,610,358 | A | 10/1971 | Korff |
| 3,901,556 | A | 8/1975 | Prillinger et al. |
| D248,461 | S | 7/1978 | Edmonson |
| D260,871 | S | 9/1981 | Cargile |
| D262,871 | S | 2/1982 | Powers |
| 4,448,278 | A | 5/1984 | Badsey |
| 4,453,763 | A | 6/1984 | Richards |
| D274,995 | S | 8/1984 | Richards et al. |
| 4,506,753 | A | 3/1985 | Wood, Jr. |
| D283,113 | S | 3/1986 | Stollery |
| 4,583,613 | A | 4/1986 | Nakayama |
| 4,671,563 | A | 6/1987 | Shakespear |
| 4,763,538 | A | 8/1988 | Fujita et al. |
| 4,869,332 | A | 9/1989 | Fujita et al. |
| 4,870,874 | A | 10/1989 | Ito |
| 5,024,113 | A | 6/1991 | Ito et al. |
| 5,236,060 | A | 8/1993 | Huber |
| 5,431,243 | A | 7/1995 | Richards |
| 5,806,622 | A | 9/1998 | Murphy |
| D407,348 | S | 3/1999 | Riley |
| 5,960,901 | A | 10/1999 | Hanagan et al. |
| 6,015,022 | A | 1/2000 | Thuliez |
| D424,979 | S | 5/2000 | Hanagan et al. |
| D427,548 | S | 7/2000 | Sacco et al. |
| D449,018 | S | 10/2001 | Musser |
| D469,037 | S | 1/2003 | Hanagan et al. |
| D469,386 | S | 1/2003 | Hanagan et al. |
| 6,523,634 | B1 | 2/2003 | Gagnon et al. |
| 6,575,260 | B2 | 6/2003 | Bourget |
| 6,651,764 | B2 | 11/2003 | Fournier et al. |
| D485,788 | S | 1/2004 | Guay et al. |
| 6,708,579 | B2 | 3/2004 | Punko |
| 6,742,618 | B2 * | 6/2004 | Schoenfelder et al. ....... 180/182 |
| 6,948,581 | B2 | 9/2005 | Fecteau et al. |
| 7,377,295 | B2 | 5/2008 | Byers et al. |
| 7,464,781 | B2 | 12/2008 | Guay et al. |
| D584,188 | S | 1/2009 | Jenkins et al. |
| 7,484,767 | B2 | 2/2009 | Tsuya |
| D589,844 | S | 4/2009 | Aubé et al. |
| D592,547 | S | 5/2009 | Riley |
| D592,548 | S | 5/2009 | Aubé et al. |
| D593,908 | S | 6/2009 | Longpre et al. |
| 7,543,672 | B2 | 6/2009 | Codere et al. |
| 7,571,787 | B2 | 8/2009 | Saiki |
| 7,591,337 | B2 | 9/2009 | Suhre et al. |
| 7,617,899 | B1 | 11/2009 | Warner et al. |
| 7,621,362 | B2 | 11/2009 | Ogawa et al. |
| D613,203 | S | 4/2010 | Geslin et al. |
| D626,032 | S | 10/2010 | Starr |
| D633,821 | S | 3/2011 | Hill et al. |
| 7,926,607 | B2 | 4/2011 | Seiter |
| 8,001,862 | B2 | 8/2011 | Albulushi et al. |
| 8,061,465 | B2 | 11/2011 | Martino |
| D666,127 | S | 8/2012 | Nam |
| D678,124 | S | 3/2013 | Canni et al. |
| D682,158 | S | 5/2013 | Canni et al. |
| 8,474,345 | B2 * | 7/2013 | Riedel et al. .................... 74/339 |
| 8,534,151 | B2 * | 9/2013 | Johnson et al. ............. 74/337.5 |
| D710,274 | S | 8/2014 | Canni et al. |
| 8,887,853 | B2 * | 11/2014 | Hall et al. ..................... 180/210 |
| 2007/0256882 | A1 | 11/2007 | Bedard et al. |
| 2011/0006498 | A1 | 1/2011 | Mercier |
| 2012/0048045 | A1 * | 3/2012 | Riedel et al. ................... 74/404 |
| 2012/0204676 | A1 | 8/2012 | Walters et al. |
| 2012/0241237 | A1 | 9/2012 | Holroyd et al. |
| 2012/0241239 | A1 | 9/2012 | Holroyd et al. |
| 2013/0105238 | A1 | 5/2013 | Hall et al. |
| 2014/0025246 | A1 | 1/2014 | Hall et al. |

OTHER PUBLICATIONS

"The street legal Pavement Predator," T-Rex 14R, Campagna, 2011.
"T-Rex: Three Wheeled Sports Car or Motorcycle," [retrieved from the Internet] [retrieved on Sep. 18, 2012].
Nova Racing, Reversing Gearbox for Honda Motorcycles, [retrieved from the Internet] [retrieved on Feb. 4, 2014] at URL: http://www.novaracing.co.uk/ProductHondaReversingGearbox.html.
eGlideGoodies, Reverse Gear Option 1, [retrieved from the Internet] © 2002-2014, eGlide Goodies [retrieved on Feb. 4, 2014].
Baker Drivetrain, Factory Five-Speed Reverse kit, [retrieved from the Internet] @2012 Baker, Inc. [retrieved on Feb. 4, 2014] at URL: http://www.bakerdrivetrain.com/f5r-factory-5-speed-reverse#.
Marstanovic, George, Dual Brake Hanger, [retrieved from the Internet], Apr. 16, 2013.
International Search Report and Written Opinion for International Application No. PCT/US2012/062391, mailed Jan. 11, 2013.
Office Action for U.S. Appl. No. 13/662,832, mailed Mar. 22, 2013.

* cited by examiner

US 9,188,198 B2

DRIVE TRAIN AND SYSTEMS FOR A THREE-WHEELED VEHICLE

CROSS REFERENCE TO RELATED APPLICATIONS

This application claims the benefit of priority to U.S. Provisional Application No. 61/896,453, filed Oct. 28, 2013, entitled "Drive Train and Systems for a Three-Wheeled Vehicle," the disclosure of which is incorporated by reference herein in its entirety.

BACKGROUND

Embodiments described herein relate to three-wheeled motor vehicles and more specifically, the embodiments described herein relate to drive trains and systems for reverse-trike vehicles.

In an effort to reduce cost of operation, it has been desirable to reduce the fuel consumption of automotive vehicles that include an internal combustion engine. Accordingly, the size and power of some known vehicles are being reduced to improve the fuel efficiency of the engines included therein. Internal combustion engines themselves are becoming ever more fuel efficient; however, such advances in efficiency are limited and can contribute to an increased interest in alternatives to traditional four-wheeled automobiles.

One such alternative to traditional four-wheeled vehicles is a motorcycle. Known motorcycles are inherently more fuel efficient than even the smallest four-wheeled vehicles, and can often provide a level of performance that is otherwise not present in some four-wheeled vehicles. Thus, known motorcycles can provide a stimulating and fuel efficient alternative to known four-wheeled vehicles. On the other hand, motorcycles are inherently less safe than four-wheeled vehicles and therefore, can be unacceptable to some potential motorists.

The goal of combining the desirable features of both four-wheeled vehicles and motorcycles has led to the development of three-wheeled vehicles. One known configuration of a three-wheeled vehicle includes two wheels at the front of the vehicle and one wheel at the rear of the vehicle, commonly referred to as a "reverse-trike." Known reverse-trikes commonly have very limited space to accommodate components thereof due to their reduced width at the back end. In addition, some known reverse-trikes include a rear wheel that is significantly larger than a wheel included in most motorcycles and four-wheeled vehicles, which can further limit the space to accommodate components as well as restrict the potential arrangement of such components relative to one another. Therefore, the vehicle components, such as the engine, transmission, fuel tank, rear suspension, rear wheel, etc. cannot be arranged in the same manner as either motorcycles or four-wheeled vehicles. For example, the increased width of the rear wheel can result in an arrangement where a drive sprocket or gear of the real wheel is not aligned with an output sprocket or gear of the transmission. In some instances, this can result in including a mechanism with an input that can be coupled to the output sprocket or gear of the transmission, and an output that can be coupled to the drive sprocket or gear of the rear wheel, commonly referred to as a "jack-shaft." This arrangement, however, increases the weight, complexity, and cost of the vehicle as well as introduces additional points or potential failure.

Some known reverse-trikes have transmissions that do not include a reverse gear due, at least in part, to the limited space at the rear end. Such a configuration is often seen in motorcycles, where their arrangement and weight obviates the need for reverse systems (e.g., an operator can often manually move the motorcycle in the reverse direction by pushing with his or her foot). The arrangement and additional weight of known reverse-trikes relative to motorcycles, however, can result in challenges to reversing in such a manual fashion. This can lead to bolt-on reverse gear assemblies that are bulky, cumbersome, and/or challenging to operate, which can deter potential motorists.

Therefore, there is a need for an improved drive trains and systems for three-wheeled vehicles.

SUMMARY

The embodiments described herein relate to three-wheeled motor vehicles. In some embodiments, an apparatus includes a housing, an input portion, an idler portion, and an output portion. The housing is configured to be coupled to an engine assembly of a vehicle. The input portion includes an input gear disposed within the housing. The input portion is operably coupled to the engine assembly such that rotation of an engine output member rotates the input gear. The input gear is configured to be moved from a first position within the housing to a second position within the housing. The idler portion includes an idler gear disposed in the housing. The idler gear is rotatably engaged with the input gear when the input gear is in its first position and is spaced apart from the input gear when the input gear is in its second position. The output portion includes an output gear disposed within the housing and rotatably engaged with the idler gear and an output member disposed outside of the housing and substantially coplanar with a drive portion of a rear wheel assembly. The output gear is spaced apart from the input gear when the input gear is in its first position such that rotation of the input gear indirectly rotates the output gear in a first direction via the idler gear. The output gear is rotatably coupled to the input gear when the input gear is in its second position such that rotation of the input gear directly rotates the output gear in a second direction, opposite the first direction. The output member is configured to rotate with the output gear.

DETAILED DESCRIPTION

Figure 1:
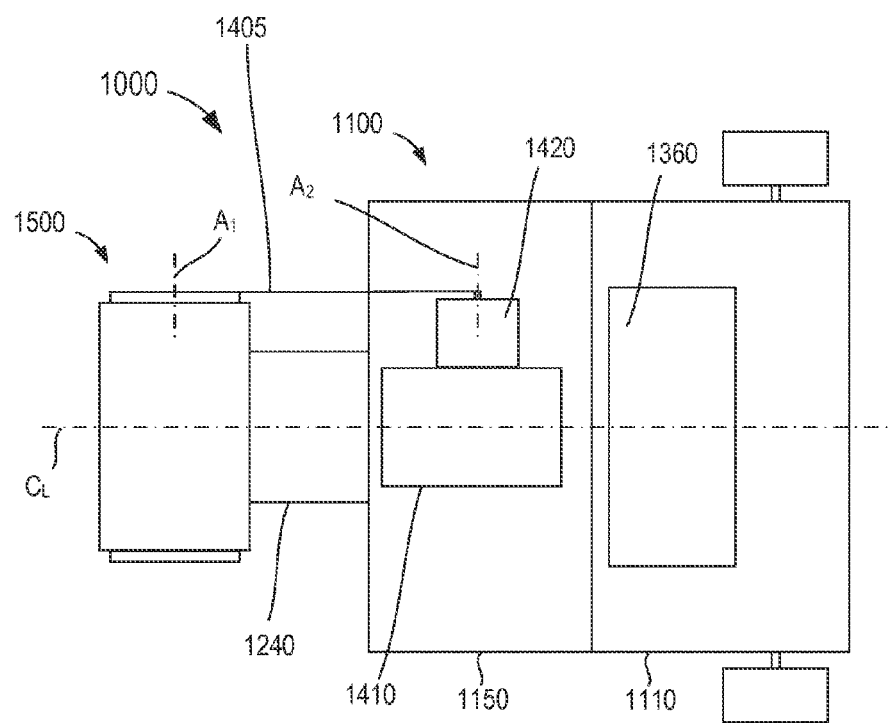
FIG. 1 is a schematic illustration of a vehicle according to an embodiment.

In some embodiments, an apparatus includes a housing, an input portion, an idler portion, and an output portion. The housing is configured to be coupled to an engine assembly of a vehicle. The input portion includes an input gear disposed within the housing. The input portion is operably coupled to the engine assembly such that rotation of an engine output member rotates the input gear. The input gear is configured to be moved from a first position within the housing to a second position within the housing. The idler portion includes an idler gear disposed in the housing. The idler gear is rotatably engaged with the input gear when the input gear is in its first position and is spaced apart from the input gear when the input gear is in its second position. The output portion includes an output gear disposed within the housing and rotatably engaged with the idler gear and an output member disposed outside of the housing and substantially coplanar with a drive portion of a rear wheel assembly. The output gear is spaced apart from the input gear when the input gear is in its first position such that rotation of the input gear indirectly rotates the output gear in a first direction via the idler gear. The output gear is rotatably coupled to the input gear when the input gear is in its second position such that rotation of the input gear directly rotates the output gear in a second direction, opposite the first direction. The output member is configured to rotate with the output gear.

In some embodiments, a vehicle includes a frame, a swing arm, and a reverse gear assembly. The frame defines a longitudinal centerline and includes an engine mounting portion configured to mount an engine assembly thereto. The swing arm has a first end portion rotatably coupled to the frame, and a second end portion rotatably coupled to a rear wheel assembly. The rear wheel assembly includes a drive portion. The reverse gear assembly is coupled to the engine assembly and includes an input shaft having an input gear and an output shaft having an output gear and an output member. The input shaft is configured to receive an input from the engine assembly such that the input gear rotates in a first direction. The output member is operatively coupled to the drive portion of the rear wheel assembly via a continuous linkage. The input gear is configured to move relative to the output gear to transition the reverse gear assembly between a first configuration, in which the output gear is rotated in the first direction, and a second configuration, in which the output gear is rotated in a second direction opposite the first direction.

In some embodiments, an apparatus includes a housing, an input portion, an idler portion, an output portion, and a sensor. The housing is configured to be coupled to an engine assembly of a vehicle. The input portion includes an input gear disposed within the housing. The input portion is configured to be operably coupled to the engine assembly such that rotation of an engine output member rotates the input gear. The input gear is movable between a first position within the housing to a second position within the housing. The idler portion includes an idler gear disposed in the housing. The idler gear is rotatably engaged with the input gear when the input gear is in its first position and is spaced apart from the input gear when the input gear is in its second position. The output portion includes an output gear rotatably coupled to the idler gear. The output gear is spaced apart from the input gear when the input gear is in its first position such that rotation of the input gear indirectly rotates the output gear in a first direction via the idler gear. The output gear is rotatably coupled to the input gear when the input gear is in its second position such that rotation of the input gear directly rotates the output gear in a second direction. The sensor is configured to produce a signal associated with an alignment position of the input gear.

In some embodiments, an apparatus includes a frame, a swing arm, a reverse gear assembly, and a wheel assembly. Although described as including the wheel assembly, in some embodiments, a drive train apparatus need not include the wheel assembly. The swing arm includes a first end portion rotatably coupled to the frame, and second end portion rotatably coupled to the wheel assembly. The frame is configured to support an engine operably coupled to the reverse gear assembly such that an output of the reverse gear assembly is substantially coplanar with an input of the wheel assembly to allow the reverse gear assembly to be operably coupled to the wheel assembly. The reverse gear assembly is configured to be transitioned between a first configuration associated with a rotation of the wheel assembly in a first direction, and a second configuration associated with a rotation of the wheel assembly in a second direction, opposite the first direction. The wheel assembly includes a brake system configured to limit rotation of the wheel assembly.

As used in this specification, the singular forms "a," "an" and "the" include plural referents unless the context clearly dictates otherwise. Thus, for example, the term "a mount" is intended to mean a single mount or a combination of mounts.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or centerline that is within plus or minus 5% of being linear.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the term "parallel" generally describes a relationship between two geometric constructions (e.g., two lines, two planes, a line and a plane or the like) in which the two geometric constructions are substantially non-intersecting as they extend substantially to infinity. For example, as used herein, a line is said to be parallel to another line when the lines do not intersect as they extend to infinity. Similarly, when a planar surface (i.e., a two-dimensional surface) is said to be parallel to a line, every point along the line is spaced apart from the nearest portion of the surface by a substantially equal distance. Two geometric constructions are described herein as being "parallel" or "substantially parallel" to each other when they are nominally parallel to each other, such as for example, when they are parallel to each other within a tolerance. Such tolerances can include, for example, manufacturing tolerances, measurement tolerances or the like. Thus, two geometric constructions are considered as "substantially parallel" when they are within five degrees of being parallel.

As used herein, the terms "perpendicular" and "orthogonal" generally described a relationship between two geometric constructions (e.g., two lines, two planes, a line and a plane, or the like) in which the two geometric constructions are disposed at substantially 90°. For example, a line is said to be perpendicular to another line when the lines intersect at an angle substantially equal to 90°. Similarly, when a planar surface (e.g., a two dimensional surface) is said to be orthogonal to another planar surface, the planar surfaces are disposed at substantially 90° as the planar surfaces extend to infinity. Thus, two geometric constructions are considered as "substantially perpendicular" when they are within five degrees of being perpendicular (i.e., within a range of 85 to 95 degrees).

As used herein, the term "recumbent seat" refers to a seat that supports a person in a substantially recumbent position. For example, a recumbent seat can include a seat back portion such that the recumbent seat supports a portion of the back and a portion of the legs of a person. In this manner, the person can be seated in the recumbent seat such that the legs of the person extend away from the seat.

The embodiments described herein relate to three-wheeled vehicles. More specifically, the embodiments described herein are examples of a three-wheeled vehicle in a reverse-trike configuration, including two front wheels and one rear wheel. The presented embodiments are meant to be examples only. Thus, the systems and/or components can be included in a three-wheeled vehicle of varying configurations such as, for example, a standard trike (e.g., two rear wheels and a single front wheel).

FIG. 1 is a schematic illustration showing a portion of a three-wheeled vehicle 1000, according to an embodiment. The vehicle 1000 includes a frame 1100 having a front portion 1110 and a rear portion 1150. The frame 1100 can be any suitable configuration and can be formed from any suitable material. For example, in some embodiments, the frame 1100 can include tubing (not shown) that can be formed from any suitable metallic material such as, aluminum, aluminum alloy, steel, steel alloy, or any combination thereof.

The frame 1100 can include any suitable portion or region configured to receive and/or couple to various components of the vehicle 1000. For example, while some components are not shown in FIG. 1, the frame 1100 can be configured to support and/or be coupled to a body, a drive train, a front and rear suspension system, a set of wheels, a linkage system, any suitable electronics, or the like that collectively make the vehicle 1000 suitable for driving. Furthermore, the frame 1100 can include a firewall or other suitable structure (not shown in FIG. 1) configured to separate an operator from a portion of the drive train. For example, in some embodiments, the frame 1100 can include a firewall configured to separate an engine coupled to the rear portion 1150 of the frame 1100 from a passenger compartment defined by the front portion 1110 of the frame 1100.

The front portion 1110 of the frame 1100 is configured to support at least a portion of a seat 1360. In some embodiments, the front portion 1110 can include a seat support structure or the like (not shown in FIG. 1) that can be, for example, a portion of the frame 1100 that includes sufficient structure to support a passenger seated in a recumbent position. Similarly stated, the front portion 1110 of the frame 1100 is configured to support a seat 1360 on which a passenger can be seated in a posture in which their legs do not straddle (or otherwise extend below on either side of) a portion of the seat 1360, and in which their legs are at least partially forward. For example, in some embodiments, the front portion 1110 of the frame 1100 can include a seat support structure that can include flat bar (e.g., aluminum flat bar, steel flat bar, etc.) that is fixedly coupled (e.g., welded or otherwise fixedly attached) to tubing that forms a portion of the frame 1100. In this manner, the seat support structure can provide sufficient structure to which a portion of the recumbent seat 1360 can be coupled, either directly or indirectly. In some embodiments, the front portion 1110 of the frame 1100 can include a seat support structure with a seat back portion (not shown in FIG. 1) configured to support a back portion of the recumbent seat 1360 (e.g., the portion of the seat that supports the back of a person seated thereon). In some embodiments, the front portion 1110 of the frame 1100 is configured to at least partially enclose, envelope and/or surround the seat 1360 when the seat 1360 is supported by such a seat support structure.

In some embodiments, the seat 1360 can be of any suitable recumbent configuration and can support an operator of the vehicle 1000 such that when the operator is seated thereon, the operator's legs do not straddle (or otherwise extend below on either side of) a portion of the seat 1360, and are extended away from (toward the front of) the recumbent seat 1360. In some embodiments, the seat 1360 can be coupled to an adjustable structure or mechanism that is in turn coupled to and/or supported by a seat support structure of the front portion 1110 of the frame 1100. In this manner, the position of the seat 1360 can be adjustable along a length of a longitudinal centerline $C_L$ defined by the vehicle 1000. For example, the seat 1360 can be adjusted from a first position closer to a point on the front portion 1110 of the frame 1100 to a second position farther away from the point on the front portion 1110 of the frame 1100, or vice versa.

Although the seat 1360 is described as being a recumbent seat, in other embodiments, the seat 1360 can be any suitable seat, and need not be a recumbent seat.

The rear portion 1150 of the frame 1100 is rotatably coupled to a swing arm 1240. More particularly, a first end portion of the swing arm 1240 is rotatably coupled to the rear portion 1150 of the frame 1100 to allow the swing arm 1240 to pivot relative to the frame 1100 about an axis that is normal to the longitudinal centerline $C_L$. While not shown in FIG. 1, in some embodiments the swing arm 1240 can include and/or be coupled to any suitable suspension component(s) configured to influence the movement of the swing arm 1240 relative to the frame 1100. For example, in some embodiments, the swing arm 1240 can include and/or define a bearing and/or bushing (or set of bearings and/or bushings) that are disposed about the rear portion 1150 of the frame 1100, thereby allowing the swing arm 1240 to rotate relative to the frame 1100. Furthermore, the swing arm 1240 can be coupled to a shock absorber (e.g., a spring and/or damper) that is in turn coupled to the rear portion 1150 of the frame 1100. Thus, the shock absorber can dampen and/or control a portion of the movement of swing arm 1240 relative to the frame 1100.

The swing arm 1240 has a second end portion that is configured to be coupled to a wheel assembly 1500, as described in further detail herein. The second end portion of the swing arm 1240 can define a radial axis (not shown in FIG. 1) and can be arranged relative to the frame 1100 such that the radial axis of the second end portion is substantially coaxial with the longitudinal centerline $C_L$ of the frame 1100 in at least one plane. Said another way, the longitudinal centerline $C_L$ of the frame 1100 can be thought of as defining a plane of symmetry between a left side of the frame 1100 and a right side of the frame 1100 (as shown in FIG. 1) and the radial axis defined by the second end portion is substantially parallel with the plane of symmetry. In this manner, the swing arm 1240 and/or the second end portion are laterally centered at the rear portion of the frame 1100. Thus, this arrangement allows the frame 1100 to be suited for three-wheeled vehicles having a single rear wheel (i.e., a reverse trike).

In some embodiments, the second end portion forms a bifurcated portion of the swing arm 1240 that can extend on two sides of the wheel assembly 1500. In such embodiments, the second end portion can define and/or include an axle (not shown in FIGS. 1 and 2) about which the wheel assembly 1500 can rotate. In this manner, when the wheel assembly 1500 is coupled to the second end portion of the swing arm 1240, a radial axis (not shown) of the wheel assembly 1500 can also be substantially coaxial with the longitudinal centerline $C_L$ of the frame.

The rear portion 1150 of the frame 1100 is configured to support at least a portion of a drive train. For example, the rear portion 1150 can includes an engine support structure (not shown in FIG. 1) to which an engine 1410 can be mounted, as shown in FIG. 1. The arrangement of the rear portion 1150 can be such that the engine support structure to which the engine 1410 is mounted is disposed between the front portion 1110 of the frame 1100 and a portion of the swing arm 1240. More specifically, the engine support structure can be rearward of, for example, a firewall such that the engine support structure is separated from the seat support structure (described above) included in the front portion 1110 of the frame 1100. The rear portion 1150 and/or the engine support structure can include any suitable hardware, bracket(s), accommodations for air ducting, exhaust plumbing and the like such that the engine 1410 can be mounted thereto. In some embodiments, the rear portion 1150 can be configured to receive and/or accommodate a four-cylinder gasoline engine, such as, for example, a liquid-cooled motorcycle engine having a displacement of 1000 to 1500 cubic centimeters. In some embodiments, the rear portion 1150 can be configured to receive and/or accommodate a Suzuki Hayabusa engine. Thus, the arrangement of the vehicle 1000 is such that the engine 1410 is disposed rearward of the seat 1360 and forward of the swing arm 1240.

As shown in FIG. 1, the engine 1410 is coupled to a reverse gear assembly 1420. More specifically, an output shaft or gear can be disposed in and/or otherwise coupled to an input portion of the reverse gear assembly 1420 such that rotation of the output shaft rotates at least a portion of the reverse gear assembly, as described in further detail herein. The reverse gear assembly 1420 can be coupled to the engine 1410 in any suitable manner. For example, the reverse gear assembly 1420 can include a mounting portion that is coupled to a mounting portion of the engine 1410 via one or more mechanical fasteners (e.g., nuts and bolts). As such, the input portion of the reverse gear assembly 1420 can define an opening configured to receive the output shaft of the engine 1410 when coupled thereto. In some embodiments, the reverse gear assembly 1420 can be assembled with the engine 1410 such that a portion of the reverse gear assembly 1420 and a portion of the engine 1410 include a similar structure (e.g., a housing or the like) and/or are included with the same structure. In such embodiments, the output of the engine 1410 and the input of the reverse gear assembly 1420 can be disposed within a similar casing, housing, support structure, or the like and can be arranged such that rotation of the output of the engine 1410 rotates the input of the reverse gear assembly 1420. For example, the output of the engine 1410 can include a gear or the like that is configured to mesh, couple to, or otherwise engage a gear or the like included in the input of the reverse gear assembly 1420. In other embodiments, the reverse gear 1420 can be coupled to and/or otherwise support by the rear portion 1150 of the frame such that the input of the reverse gear assembly 1420 is operably coupled to the output of the engine 1410 via a belt, chain, or other suitable linkage.

In some embodiments, for example, the engine 1410 can be an engine assembly, i.e., the engine assembly 1410 can include an engine and a transmission. For example, in some embodiments, the engine 1410 can be integrally formed with a transmission such that an output of the engine 1410 is an output of the transmission. Similarly stated, in some embodiments, at least a portion of the engine 1410 and at least a portion of the transmission (not shown) can share a common structure such that an interface therebetween is disposed within a casing or housing. Thus, the output of the transmission is, for example, the only external output shaft of the associated with the engine 1410. In other embodiments, the transmission can be coupled to the engine 1410. In this case, the reverse gear assembly 1420 can be coupled to the transmission to receive an output shaft from the transmission. Moreover, the transmission can be a forward gear transmission with an output that is configured to rotate in a single direction. That is to say, the output shaft of the engine and the output shaft of the transmission are configured to rotate in a single direction regardless of the configuration of the reverse gear assembly 1420, as described in further detail herein.

The reverse gear 1420 includes an output that can be operably coupled to an input of the wheel assembly 1500. For example, the output of the reverse gear assembly 1420 can be a cylindrical shaft that can include and/or define a gear or sprocket and the input of the wheel assembly 1500 can be a cylindrical shaft that can include and/or define a gear or sprocket and can be operably coupled via a belt or chain 1405. More specifically, the wheel assembly 1500 can be rotatably coupled to the swing arm 1240 (as described above) such that an axis of rotation $A_1$ of the input is substantially perpendicular to the longitudinal centerline $C_L$ of the frame 1100. Similarly, the rear portion 1150 of the frame 1100 can support the engine 1410 such that when the reverse gear assembly 1420 is coupled thereto, an axis of rotation $A_2$ of the output is substantially perpendicular to the longitudinal centerline $C_L$ of the frame 1100. The arrangement of the rear portion 1150 of the frame 1100, the engine 1410, and the reverse gear assembly 1420 is such that at least a portion of the output of the reverse gear assembly is aligned with at least a portion of the input of the wheel assembly 1500, thereby allowing the wheel assembly 1500 to be operably coupled to the reverse gear assembly 1420. Similarly stated, the arrangement of the rear portion 1150 of the frame 1110, the engine 1410, and the reverse gear assembly 1420 is such that at least a portion of the output of the reverse gear assembly 1420 and at least a portion of the input of the wheel assembly 1500 are substantially coplanar in at least one plane (e.g., a "drive plane"). The drive plane can be substantially parallel to the longitudinal centerline $C_L$ of the frame 1100. Said another way, the rear portion 1150 of the frame 1110, the engine 1410, the wheel assembly 1500 and/or the reverse gear assembly 1420 are collectively configured such that the drive component (e.g., the belt or chain 1405) is substantially linear in at least one plane (the "drive plane"). Thus, when the input of the wheel assembly 1500 is operably coupled to the output of the reverse gear assembly 1420, rotation of the output of the reverse gear assembly 1420 about the axis $A_2$ rotates the wheel assembly 1500 about the axis $A_1$.

Moreover, as described herein, in some embodiments, the reverse gear assembly 1420, the swing arm 1240 and/or the drive train can be devoid of a secondary, offsetting shaft (e.g., a "jackshaft") configured to align components of the wheel assembly 1500 and the reverse gear assembly 1420. Similarly stated, the drive train is configured such that the drive component (e.g., the belt or chain 1405) that operatively couples the output of the reverse gear assembly 1420 and the wheel assembly 1500 is a single component (e.g., is monolithically constructed and/or is a single belt or chain) rather than multiple components (e.g., multiple chains or belts that are operatively coupled via a jackshaft). This arrangement can be further characterized in that no portion of the drive component (e.g., the belt or chain 1405) that operatively couples the output of the reverse gear assembly 1420 and the wheel assembly 1500 is in contact with the swing arm 1240. This arrangement leads to greater power transmission efficiency, improved reliability (e.g., because the absence of additional drive train components). As shown herein (e.g., with respect to the vehicle 1000 and the vehicle 2000), this arrangement also provides for efficient coupling of a wide rear wheel.

The reverse gear assembly 1420 can be transitioned between a first configuration associated with a rotation of the output in a first direction, and a second configuration associated with a rotation of the output in a second direction, opposite the first. For example, when in the first configuration, the reverse gear assembly 1420 can rotate the wheel assembly 1500 operably coupled thereto (as described above) in the first rotational direction to move the vehicle 1000 in a forward direction relative to a surface on which the wheel assembly 1500 sits (not shown in FIG. 1). When in the second configuration, the reverse gear assembly 1420 can rotate the wheel assembly 1500 operably coupled thereto in the second rotational direction to move the vehicle in a reverse direction (e.g., substantially opposite the forward direction when the arrangement of the front wheels (not shown) remains constant) relative to the surface.

Although not shown in FIG. 1, the vehicle 1000 can include a shift assembly or the like (not shown in FIG. 1) that can be engaged to transition the reverse gear assembly 1420 between the first configuration and the second configuration. In some embodiments, the shift assembly can be manually operated such that a mechanical linkage system operably couples a portion of the reverse gear assembly 1420 to a shifter or the like such as, for example, those commonly included in four-wheeled vehicles with a manual transmission. Thus, the operator can manipulate the shifter to transition the reverse gear assembly 1420 between the first configuration and the second configuration. In other embodiments, the vehicle 1000 can have an electronic shift system that can have an actuator or the like configured to engage a portion of the reverse gear assembly 1420 to transition the reverse gear assembly 1420 between the first configuration and the second configuration. For example, the actuator can be a solenoid or the like that can receive an electrical signal that actuates the actuator to transition the reverse gear assembly 1420 between the first configuration and the second configuration.

The wheel assembly 1500 of the vehicle 1000 can be any suitable configuration. For example, in some embodiments, the wheel assembly 1500 can include a support structure that is coupled to a tire. The support structure can include a rim and hub (not shown in FIG. 1). In some embodiments, the rim can be, for example, a three-piece rim with a hub member disposed on opposite sides of a central member of the rim. The hub of the wheel assembly 1500 can receive an axle that is coupled to the second end portion of the swing arm 1240. In this manner, the axle can define the axis $A_1$ about which the wheel assembly 1500 rotates.

Although not shown in FIG. 1, the input of the wheel assembly 1500 can be coupled to a first hub member disposed on a first side of the central member of the rim. As described above, the input can be a gear or sprocket and can be operably coupled to the output of the reverse gear assembly 1420. Thus, rotation of the input of the wheel assembly 1420 as a result of rotation of the output of the reverse gear assembly 1420 rotates the hub, and therefore the wheel assembly 1420, about the axis $A_1$. The wheel assembly 1500 can also include a brake system (not shown in FIG. 1) with a rotor that is coupled to a second hub member disposed on a second side of the central member of the rim, opposite the first side. The brake system includes a brake hanger that can be coupled to, for example, a first brake caliper and a second brake caliper. In other embodiments, the brake hanger can be coupled to a single brake caliper or more than two brake calipers. The brake hanger can be disposed about the axle and coupled to the second end portion of the swing arm 1240 such that the brake hanger is maintained in a substantially fixed position relative to the rotor.

The first brake caliper and the second caliper can be substantially similar in size, shape, and configuration. In other embodiments, the first brake caliper and the second brake caliper can be different in size, shape, or configuration. The first brake caliper and the second brake caliper can be substantially similar to known brake calipers commonly used in four-wheeled vehicles and/or motorcycles with disc brakes (e.g., brake rotor and caliper configuration). Thus, the first and second brake calipers can include one or more actuators that can be actuated to transition the brake calipers between a first configuration and a second configuration (e.g., hydraulic actuators or the like). The brake calipers can define a slot that can receive a pair of opposing brake pads that can be moved by the actuator to reduce a space defined therebetween. More specifically, the brake pads can be disposed in the slot defined by the calipers such that when the brake calipers are in the first configuration, the brake pads are spaced apart from each other by a first distance, and when the brake calipers are transitioned to the second configuration, the brake pads are spaced apart from each other by a second distance, smaller than the first distance.

The brake hanger can be arranged such that when the first brake caliper and the second brake caliper are coupled thereto, the rotor, coupled to the second hub member, is disposed within the space defined between the brake pads of the first brake caliper and the second brake caliper. Thus, when the actuator of the first brake caliper and the actuator of the second brake caliper transition the first brake caliper and the second brake caliper, respectively, from their first configuration to their second configuration, the brake pads can engage the rotor to limit rotation of the wheel assembly 1500. In other words, the brake hanger can be coupled to a first brake caliper and a second brake caliper that can be transitioned between a first configuration, in which the wheel assembly 1500 can rotate about the axle substantially unhindered by the brake system, and a second configuration in which the first brake caliper and the second brake caliper hinder or prevent rotation of the wheel assembly 1500 about the axle.

Figure 8:
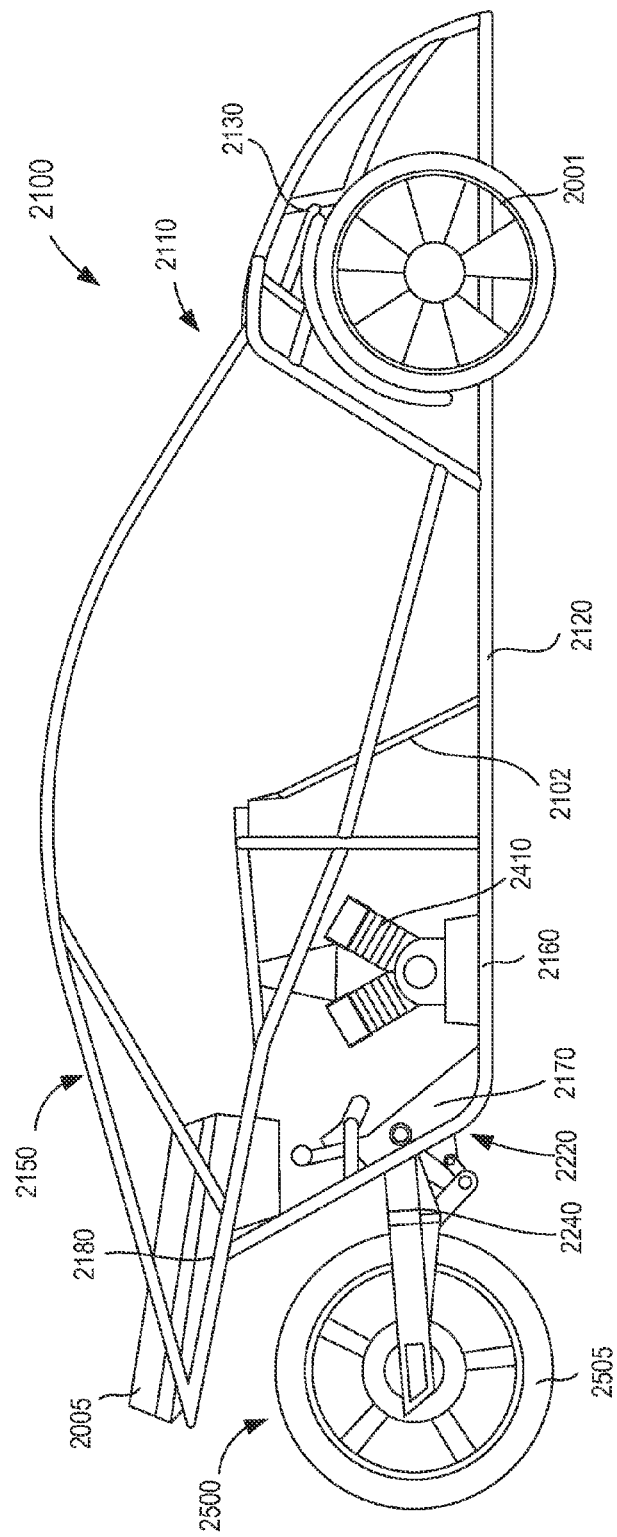
FIG. 8 is a side view of a frame and a portion of a suspension system of the three-wheeled vehicle illustrated in FIGS. 2-7.
Figure 9:
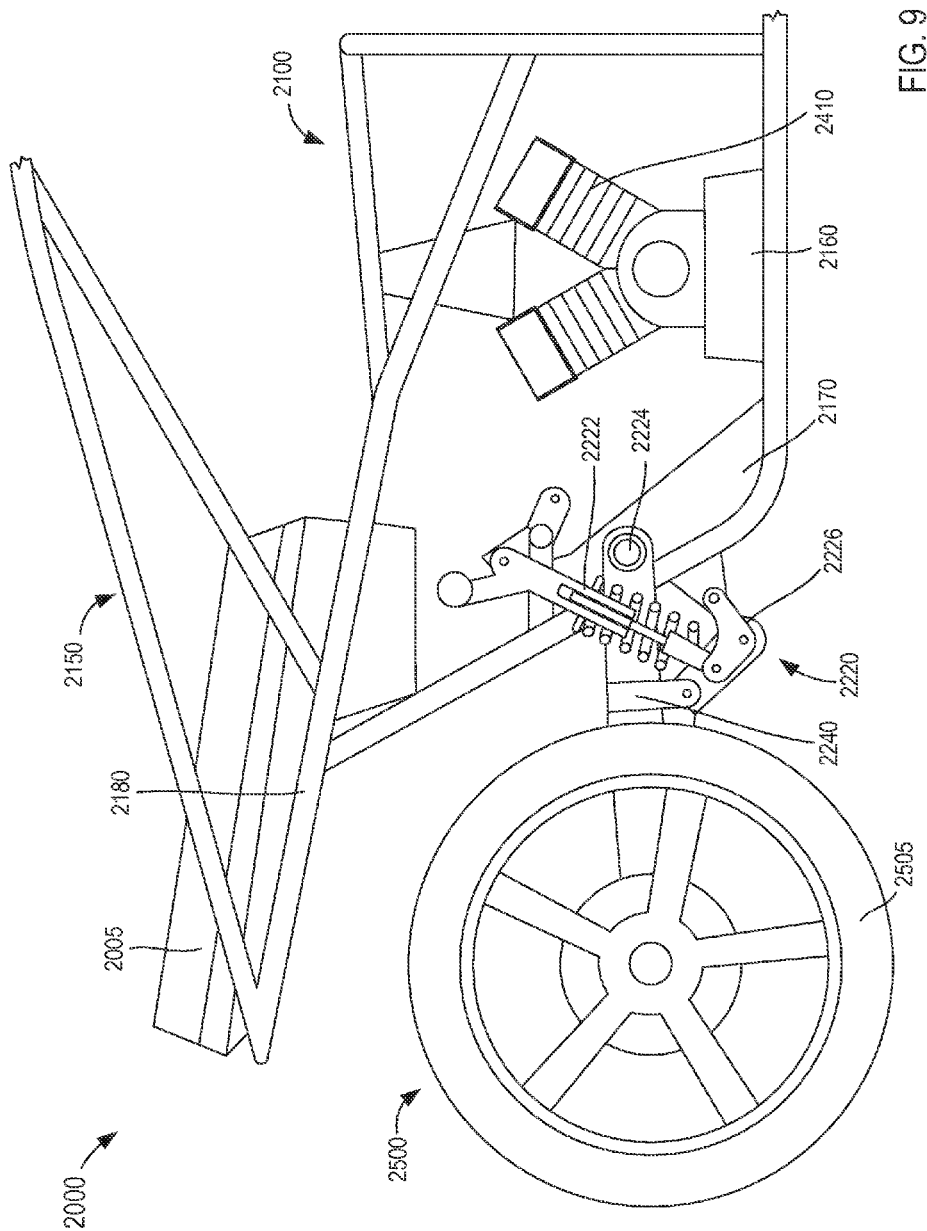
FIG. 9 is an enlarged cross-sectional view of a portion of the frame and a portion of the suspension system illustrated in FIG. 8.

FIGS. 2-43 show a three-wheeled vehicle 2000, according to an embodiment. The vehicle 2000 includes a body 2300 (see e.g., FIGS. 2-7), a frame 2100 (see e.g., FIGS. 8 and 9), and a drive train 2400 (see e.g., FIGS. 10-44), including a reverse gear assembly 2420 (see e.g., FIGS. 11-27), a swing arm 2240 (see e.g., FIGS. 27-34), and a wheel assembly 2500 (see e.g., FIGS. 35-43). As shown in FIGS. 2-7, the vehicle 2000 is in a reverse-trike configuration, having two front wheels 2001 and a rear wheel 2005. The body 2300 of the vehicle 2000 is configured to be disposed about and/or coupled to at least a portion of the frame 2100 (not shown in FIGS. 2-7, see e.g., FIGS. 8 and 9 showing the frame 2100). As described in further detail herein, the body 2300 defines a cabin portion 2350 within which a pair of side-by-side recumbent seats 2360 is mounted. The cabin portion 2350 is configured to substantially enclose and/or surround the recumbent seats 2360 such that a passenger(s) sitting on the recumbent seat(s) 2360 is isolated from, for example, at least a portion of the drive train 2400 and/or front suspension 2210.

As shown in FIGS. 2-7, the vehicle 2000 is configured such that the drive train 2400 is disposed substantially rearward of the cabin portion 2350 of the body 2300. More specifically, an engine and transmission (not shown in FIGS. 7-12) are disposed rearward of the cabin portion 2350 of the body 2300. Furthermore, the vehicle 2000 is a rear wheel drive vehicle and includes a drive chain 2405 configured to operably couple the drive train 2400 (e.g., via the reverse gear assembly 2420) to the rear wheel 2005, as further described herein.

Figure 3:
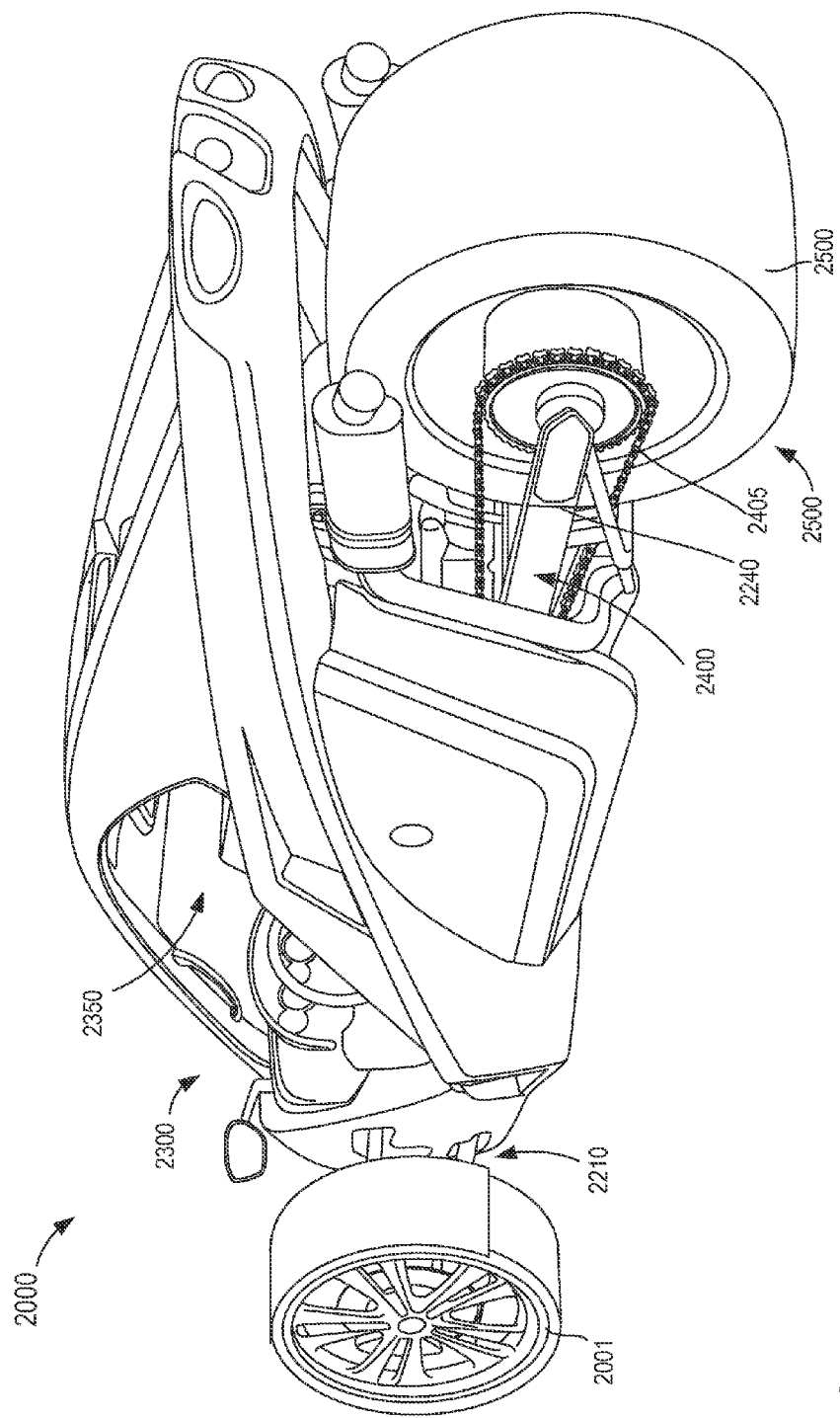
Figure 6:
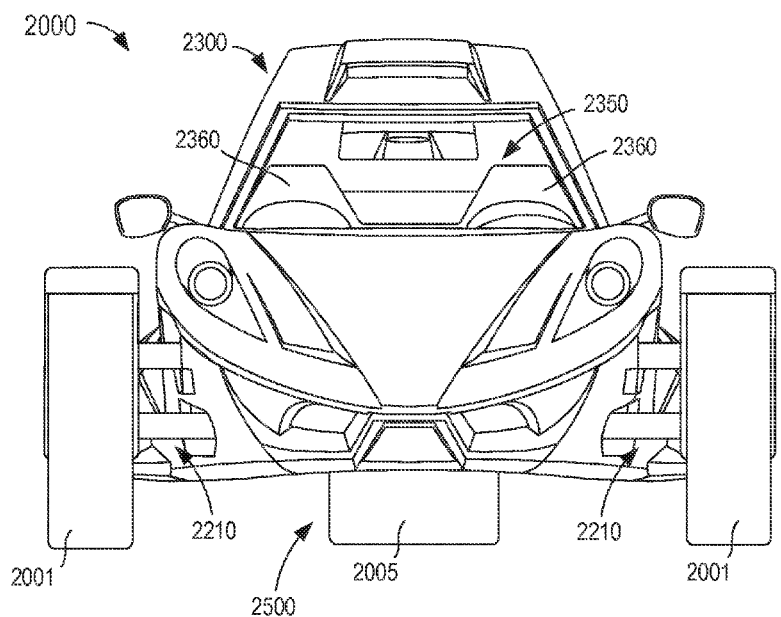
Figure 7:
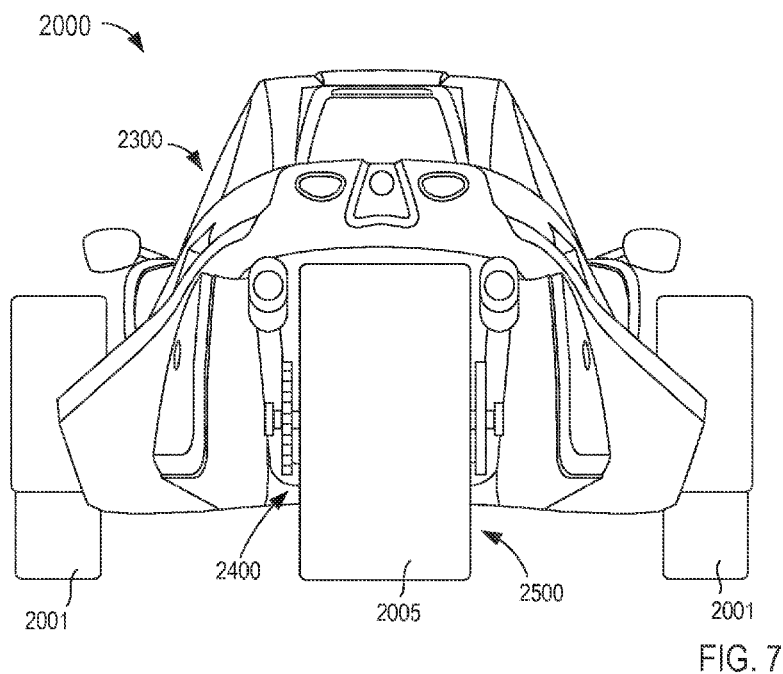

As shown in FIGS. 3 and 6, a portion of the front suspension system 2210 is configured to be disposed within and/or covered by the body 2300 and a second portion of the front suspension system 2210 is disposed substantially outside of the body 2300. In this manner, the front suspension system 2210 can be coupled to, for example, the front wheels 2001 and can be at least operably coupled to driving controls disposed within the cabin portion 2350 such that an operator sitting therein (e.g., on the recumbent seat 2360) can engage the driving controls to operate the vehicle 2000.

The body 2300 of the vehicle 2000 can be any suitable shape, size, or configuration and can be formed from any suitable material or combination of materials. For example, in some embodiments, the body 2300 can be formed from fiberglass. In other embodiments, the body 2300 can be, for example, a plastic, a composite, or any other moldable material such as carbon fiber or the like. In some embodiments, the body 2300 can be formed substantially unitarily. In such embodiments, the cabin portion 2350 defined by the body 2300 can be formed independently of the other portions and can be coupled thereto. In other embodiments, the body 2300 can be formed in any suitable sections that can be coupled to form the body 2300.

Figure 2:
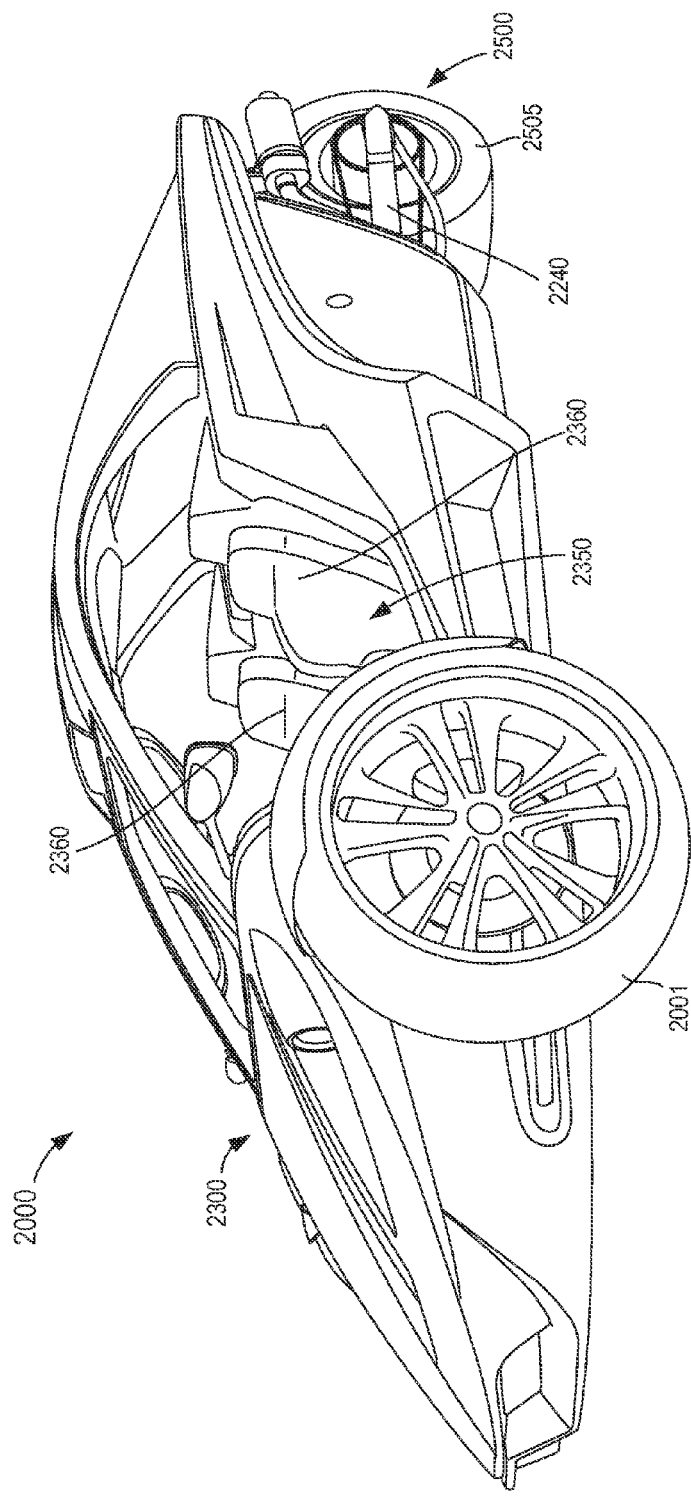
FIGS. 2-7 are a front perspective view, a rear perspective view, a side view, a top view, a front view, and a rear view, respectively, of a three-wheeled vehicle according to an embodiment.
Figure 4:
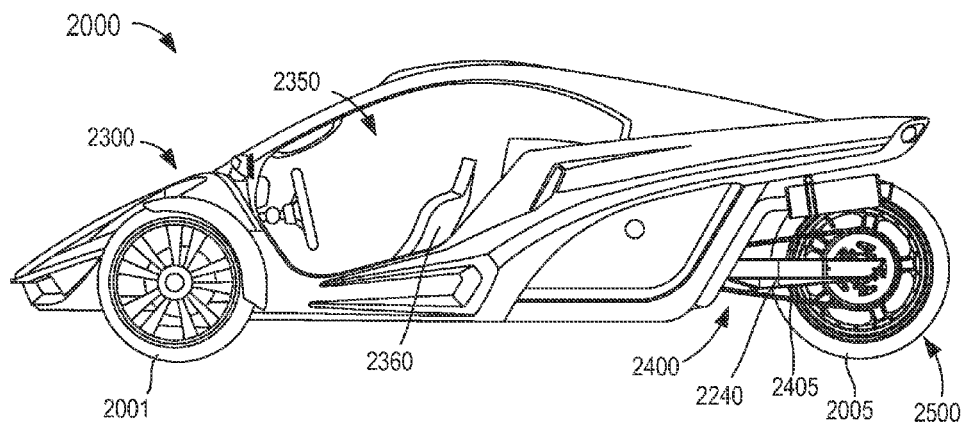
Figure 5:
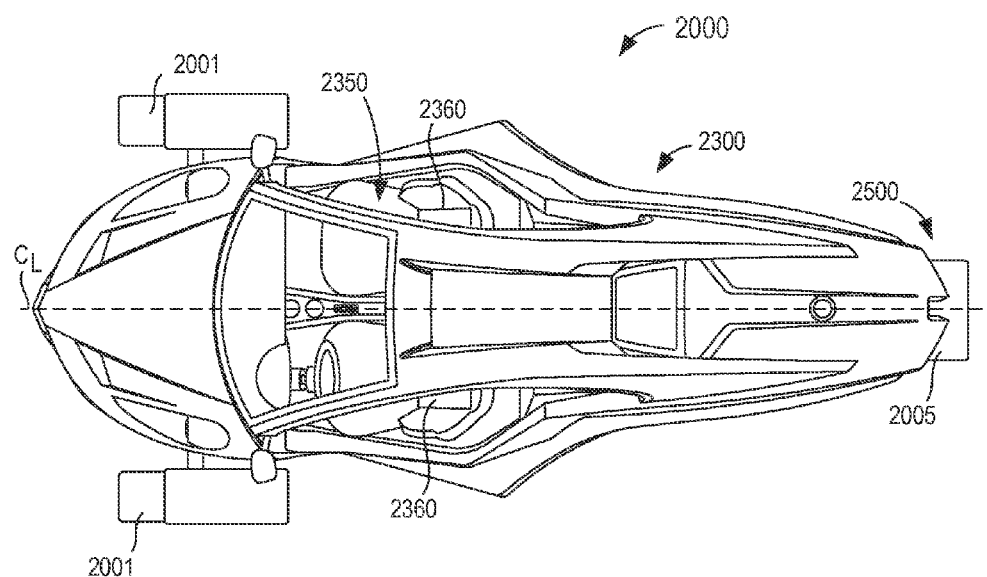

As shown in FIGS. 2-4, the body 2300 defines a set of entrance openings that allow access to the cabin portion 2350. In some embodiments, the openings can each receive a door (not shown in FIGS. 2-44) such that the cabin portion 2350 can be substantially entirely enclosed. While not shown in FIGS. 2-43, the vehicle 2000 can include any suitable style of doors. For example in some embodiments, the doors can be similar in function to those commonly found on four-wheeled automobiles where opening of the door includes pivoting the door about a substantially vertical axis. In other embodiment, the vehicle 2000 can include doors that pivot on or about a substantially horizontal axis (e.g., "gull wing doors"). In other embodiments, the vehicle 2000 can include doors configured to move in more than one direction such as, for example, "scissor doors." In such embodiments, the door can be coupled to the body 2300 via a mounting assembly that includes an adjustable hinge, one or more stiffening members and/or a gas strut. In some embodiments, the door can include a vent disposed at the bottom portion of the door.

The cabin portion 2350 defines a substantially enclosed portion of the body 2300 and, as such, can house the interior components of the vehicle 2000. For example, although not shown in FIGS. 2-43, the cabin portion 2350 can include a seat support surface or floorboard, a seat back surface, a center console, a front dash, a steering wheel, grab handles, the recumbent seats 2360, a shifter and/or shift linkage, any suitable instrumentation or duct, and a foot pedal assembly. The steering wheel 2357 can be any suitable configuration and is operably coupled to a portion of the front suspension system 2210. The floorboard (or substantial portions thereof) can be substantially planar. The substantially planar surface (e.g., the seat support surface) formed by the floorboard is such that an adjustment structure can be disposed between the floorboard and the recumbent seats 2360. For example, a slide adjustment assembly (not shown) can be coupled to the floorboard and in turn, the recumbent seats 2360 can be movably coupled to the slide adjustment assembly. Thus, the recumbent seats 2360 can be adjusted in a linear direction along a longitudinal centerline $C_L$ (see e.g., FIG. 5) of the vehicle 2000.

In some embodiments, the recumbent seats 2360 can be fully adjustable seats (e.g., similar to those commonly found in four-wheeled automobiles). For example, in some embodiments, the recumbent seats 2360 can include a forward and aft adjustment, a back adjustment, and/or height adjustment. In some embodiments, either of the recumbent seats 2360 can allow the seat portion (i.e., the tongue) and the seat back portion to be cooperatively moved and/or moved together relative to the floorboard, as described above. This arrangement allows the recumbent seats 2360 positioned in the cabin portion 2350 to be moveable as an integrated unit (as opposed to a configuration in which a portion is fixedly coupled to the floor and only the seat back portion can be adjusted). In this manner, the vehicle 2000 can comfortably accommodate occupants of different sizes. While shown and described as including two recumbent seats 2360, in some embodiments, the vehicle 2000 can include any number of seats. Moreover, in some embodiments, the recumbent seats 2360 can be arranged in along the longitudinal centerline $C_L$ of the vehicle 2000 such that one seat is in front of another seat. In some embodiments, the adjustable configuration of the recumbent seats 2360 can be such that the foot pedal assembly can be fixedly coupled to the floorboard (or supporting structure of the frame 2100). Similarly stated, with the recumbent seats 2360 being adjustable relative to the floorboard, the foot pedal assembly need not be adjustable. Thus, the potential of the foot pedal assembly moving during operation (e.g., as is inherent in adjustable foot pedal assemblies) is reduced or eliminated.

In some embodiments, the body 2300 of the vehicle 2000 can be substantially similar to or the same as the body of the vehicles described in U.S. Pat. No. 8,540,045 (referred to henceforth as "'045 patent") entitled, "Systems and Apparatus for a Three-Wheeled Vehicle," issued Sep. 24, 2013, the disclosure of which is incorporated herein by reference in its entirety. Similarly, the front suspension 2210 can be substantially similar to or the same as the front suspension included in the vehicles of the '045 patent.

Referring now to FIGS. 8 and 9, the frame 2100 of the vehicle 2000 includes a front portion 2110 and a rear portion 2150 separated, at least partially, by a firewall 2102. The frame 2100 can be any suitable configuration and can be formed from any suitable material. For example, as shown in FIGS. 8 and 9, the frame 2100 can be formed from fixedly coupled (e.g., welded) tubing. The tubing can be formed from any suitable metallic material such as, for example, aluminum, aluminum alloy, steel, steel alloy, or any combination thereof. In some embodiments, the frame 2100 can be substantially similar to or the same as the frame included in the vehicles of the '045 patent.

The front portion 2110 of the frame 2100 includes a seat support structure 2120 and a front suspension structure 2130. The front suspension structure 2130 of the frame 2100 is configured to support at least a portion of the front suspension 2210. The front suspension structure 2130 can be arranged in any suitable configuration. Furthermore, the front suspension structure 2130 can include any suitable bracket and/or mounting hardware that can be coupled to a portion of the front suspension 2210.

The seat support structure 2120 can be configured to support at least a portion of the recumbent seat 2360. More specifically, the seat support structure 2120 can be, for example, a portion of the frame 2100 that includes sufficient structure to support a passenger. For example, in some embodiments, the seat support structure 2120 can include flat bar (e.g., aluminum flat bar, steel flat bar, etc.) that is fixedly coupled (e.g., welded, adhered, or otherwise fixedly attached) to the tubing that forms a portion of the frame 2100. In this manner, the seat support structure 2120 can provide sufficient structure to fixedly couple (at least temporarily) a portion of the recumbent seat 2360 thereto (e.g., via the body 2300). Expanding further, the seat support structure 2120 of the frame 2100 can be disposed below the floorboard of the cabin portion 2350 of the body 2300 and can be substantially aligned with the mounting portion (described above) of the floorboard. Thus, when the recumbent seat 2360 is coupled to the mounting portion of the floorboard, the recumbent seat 2360 can also be coupled to the seat support structure 2120. Moreover, with the recumbent seat 2360 being coupled to an adjustment structure (e.g., a sliding adjustment assembly as described above), the recumbent seat 2360 can be moved along the longitudinal centerline $C_L$ (FIG. 5) of the vehicle 2000 while the adjustment structure (not shown) can remain fixedly coupled to the seat support structure 2120.

The rear portion 2150 of the frame 2100 includes an engine mount structure 2160, a rear suspension support structure 2170, and a fuel tank support structure 2180. The engine mount structure 2160 can include any suitable mounting hardware configured to couple an engine 2410 to the engine mount structure 2160. For example, the mounting hardware can include brackets, reinforcement, bushings, bolts, etc. As shown in FIGS. 8 and 9, the engine mount structure 2160 is disposed at a rearward position relative to the seat support structure 2120 included in the front portion 2110 of the frame 2100. Expanding further, the firewall 2102 is configured to span across the width of the frame 2100 to separate the engine mount structure 2160 from the seat support structure 2120. Thus, when the body 2300 is coupled to the frame 2100, the firewall 2102 isolates the portion of the body 2300 defining the cabin 2350 from components of the drive train 2400. Similarly stated, the firewall 2102 can define at least a portion of a drive train compartment that is isolated from the cabin portion 2350 of the body 2300.

The fuel tank support structure 2180 is coupled to and/or configured to support at least a portion of the fuel tank 2005. The fuel tank support structure 2180 can include any suitable mounting structure to couple the fuel tank 2005 thereto. The fuel tank 2005 can be any suitable configuration. For example, as shown in FIGS. 8 and 9, the fuel tank 2005 can be arranged such that fuel is gravity fed through a fuel supply line (not shown) to the engine 2410. In other embodiments, the fuel tank 2005 can include a pump (not shown) configured to feed fuel through a fuel supply line to the engine.

The rear suspension support structure 2170 is configured to be coupled to at least a portion of a rear suspension 2220. As shown, the rear suspension support structure 2170 can be disposed below the fuel tank support structure 2180. Thus, when the fuel tank 2005 is coupled to the fuel tank support structure 2180, at least a portion of the fuel tank 2005 can be disposed above at least a portion of the rear suspension 2220 coupled to the rear suspension support structure 2170, as described in further detail herein. The rear suspension support structure 2170 can include any suitable structure to couple the rear suspension 2220 thereto. More specifically, portions of the rear suspension 2220 can be rotatably coupled to the rear suspension support structure 2170, thereby allowing the rear suspension 2220 to pivot or otherwise move, relative to the frame 2100.

As shown in FIGS. 8 and 9, the rear suspension 2220 includes a swing arm 2240 (described in further detail herein with reference to FIGS. 28-35), a shock absorber 2222 (e.g., a strut, a coilover, or any other spring and damper combination), a pivot axle 2224, and a linkage system 2226. The shock absorber 2222 can be statically coupled to the rear suspension support structure 2170 (e.g., the components do not move relative to one another at the point of coupling). Conversely, the swing arm 2240 and the linkage system 2226 can be coupled to the rear suspension support structure 2170 for pivoting motion. In some embodiments, the rear suspension support structure 2170 can include bushings, bearings, or joints that define an axis of rotation about which the swing arm 2240 and the linkage system 2226 can pivot when coupled thereto. For example, in some embodiments, the rear suspension support structure 2170 can include one or more bushings and/or bearings that can receive the pivot axle 2224 to movably (e.g., in a pivoting motion) couple the swing arm 2240 to the rear suspension support structure 2170. The shock absorber 2222 and the linkage system 2226 can be collectively configured to dampen and/or control the movement of the swing arm 2240 relative to the frame 2100.

Referring now to FIGS. 10-43, the drive train 2400 includes the engine 2410 (FIGS. 8 and 9), the reverse gear assembly 2420, the swing arm 2240, the drive chain 2405, and the wheel assembly 2500. Although not shown in FIGS. 8 and 9, the reverse gear assembly 2420 can be coupled to an output portion of the engine 2410 and/or a transmission (not shown herein). The engine 2410 can be any suitable engine coupled to or supported by at least a portion of the engine support structure 2160 of the frame 2100. For example, in some embodiments, the engine 2410 can be a Suzuki Hayabusa engine. In some embodiments, for example, the engine 2410 can be integrally formed with a transmission such that an output of the engine 2410 is an output of the transmission. Similarly stated, at least a portion of the engine 2410 and at least a portion of the transmission can share a common structure such that an interface therebetween is disposed within a casing or housing. Thus, the output of the transmission is, for example, the only external output shaft of the associated with the engine 2410. In other embodiments, the transmission can be coupled to the engine 2410. In this case, the reverse gear assembly 2420 can be coupled to the transmission to receive an output shaft from the transmission. Moreover, the transmission can be a forward gear transmission with an output that is configured to rotate in a single direction. That is to say, the output shaft of the engine and the output shaft of the transmission are configured to rotate in a single direction regardless of the configuration of the reverse gear assembly 2420, as described in further detail herein.

The arrangement of the engine mount portion 2160 of the frame 2100 and the engine 2410 (and/or transmission) can be such that the when the reverse gear assembly 2420 is coupled thereto, at least a portion of an output of the reverse gear assembly is aligned with at least a portion of the input of the wheel assembly 2500, thereby allowing the drive chain 2405 to operably couple the wheel assembly 2500 to the reverse gear assembly 2420. Similarly stated, at least a portion of the output of the reverse gear assembly 2420 and at least a portion of the input of the wheel assembly 2500 are substantially coplanar in at least one plane that is substantially parallel to a longitudinal centerline $C_L$ (FIG. 5) of the frame 2100, as described in further detail herein.

Figure 10:
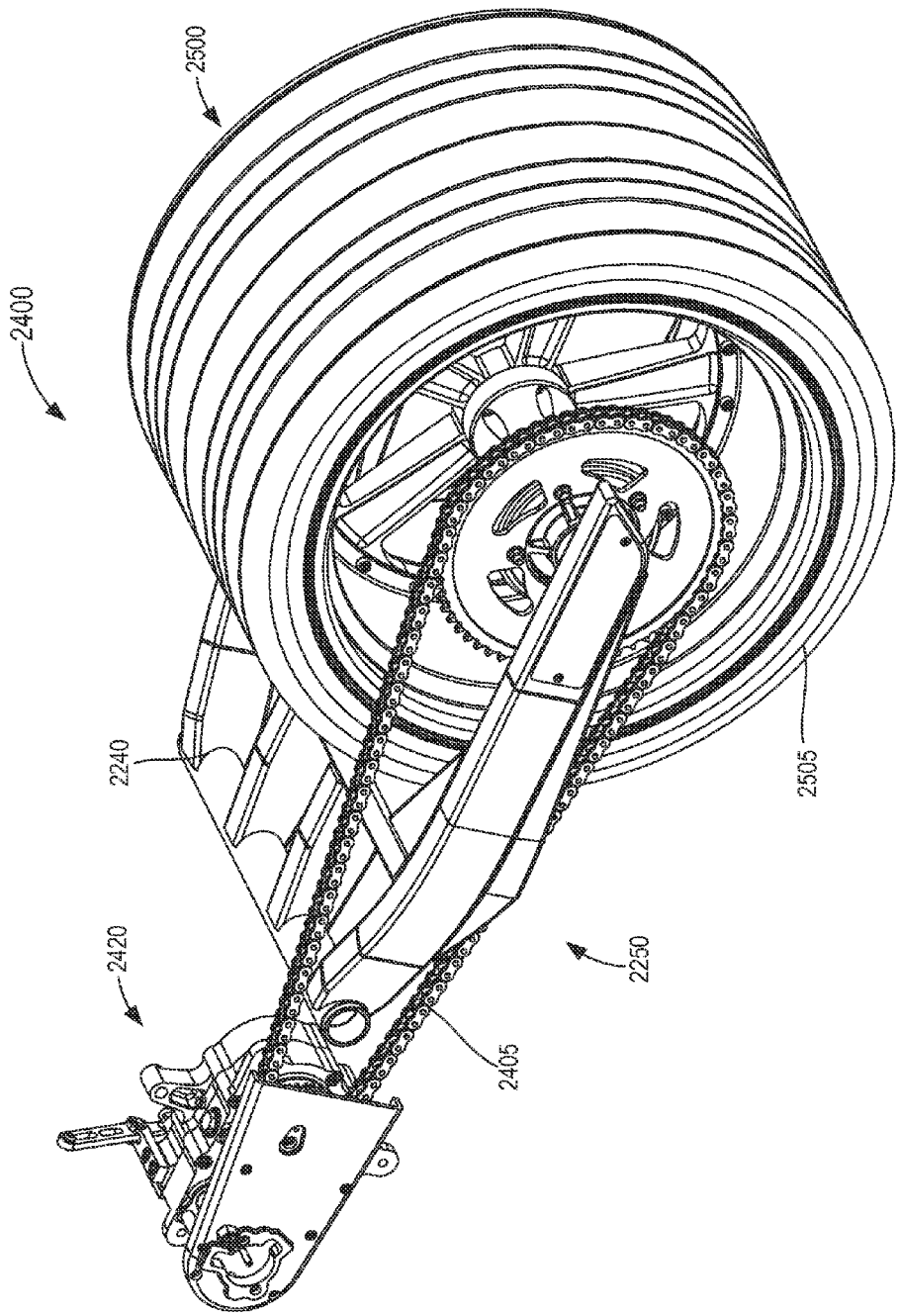
FIG. 10 is a perspective view of a portion of a drive train according to an embodiment.

In this manner, the reverse gear assembly 2420, the swing arm 2240 and/or the overall drive train can be devoid of a secondary, offsetting shaft (e.g., a "jackshaft") configured to align components of the wheel assembly 2500 and the reverse gear assembly 2420. Similarly stated, the drive train is configured such that a single drive chain 2405 operatively couples the output of the reverse gear assembly 2420 and the wheel assembly 2500, rather than multiple components (e.g., multiple chains or belts that are operatively coupled via a jackshaft). Moreover, as shown in FIG. 10, no portion of the drive chain 2405 is in contact with the swing arm 2240. Said another way, the drive chain 2405 is spaced apart from the swing arm 2240. This arrangement leads to greater power transmission efficiency, improved reliability (e.g., because the absence of additional drive train components).

Figure 11:
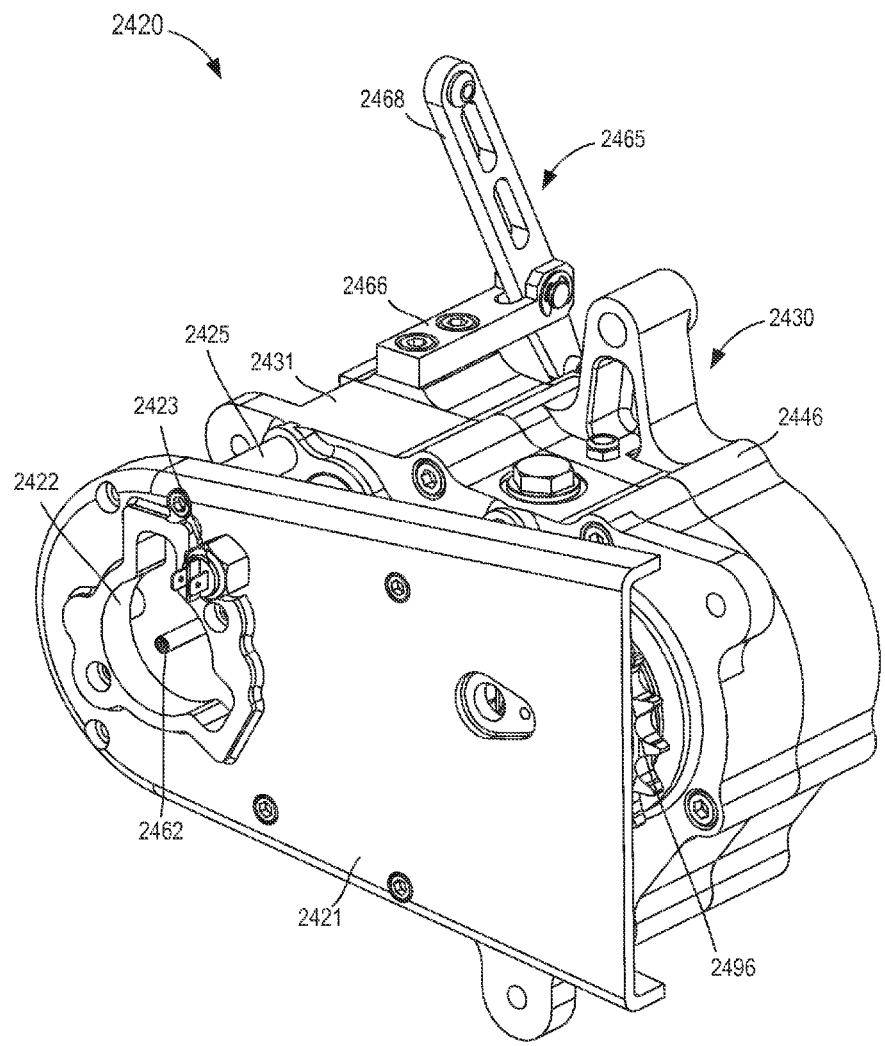
FIGS. 11 and 12 are a front perspective view and a rear perspective view, respectively, of a reverse gear assembly included in the drive train illustrated in FIG. 10.
Figure 12:
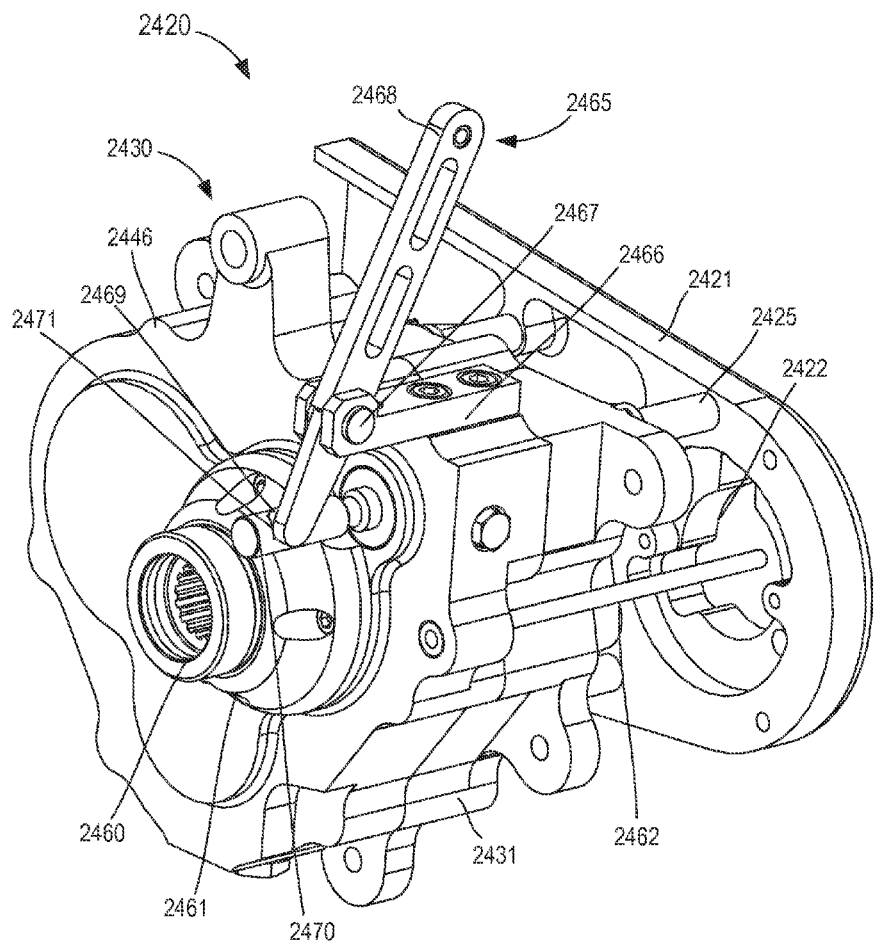

As shown in FIGS. 11 and 12, the reverse gear assembly 2420 includes a cover 2421, a housing 2430, and a shift assembly 2465. The housing 2430 is configured to enclose a set of interior components of the reverse gear assembly 2420 that include an input portion 2475A, an idler portion 2481A, and an output portion 2486A. The outer drive portion of the housing 2430 (i.e., the portion including the housing 2430) is configured to be coupled to the frame to provide support. Moreover, the housing 2430 is configured to be coupled external to the transmission (i.e., the reverse gear assembly 2420 is bolt-on). As described in further detail herein, the reverse gear assembly 2420 is configured to be transitioned between a first configuration that is associated with, for example, a forward motion of the vehicle 2000, and a second configuration that is associated with, for example, a reverse motion of the vehicle 2000.

Figure 18:
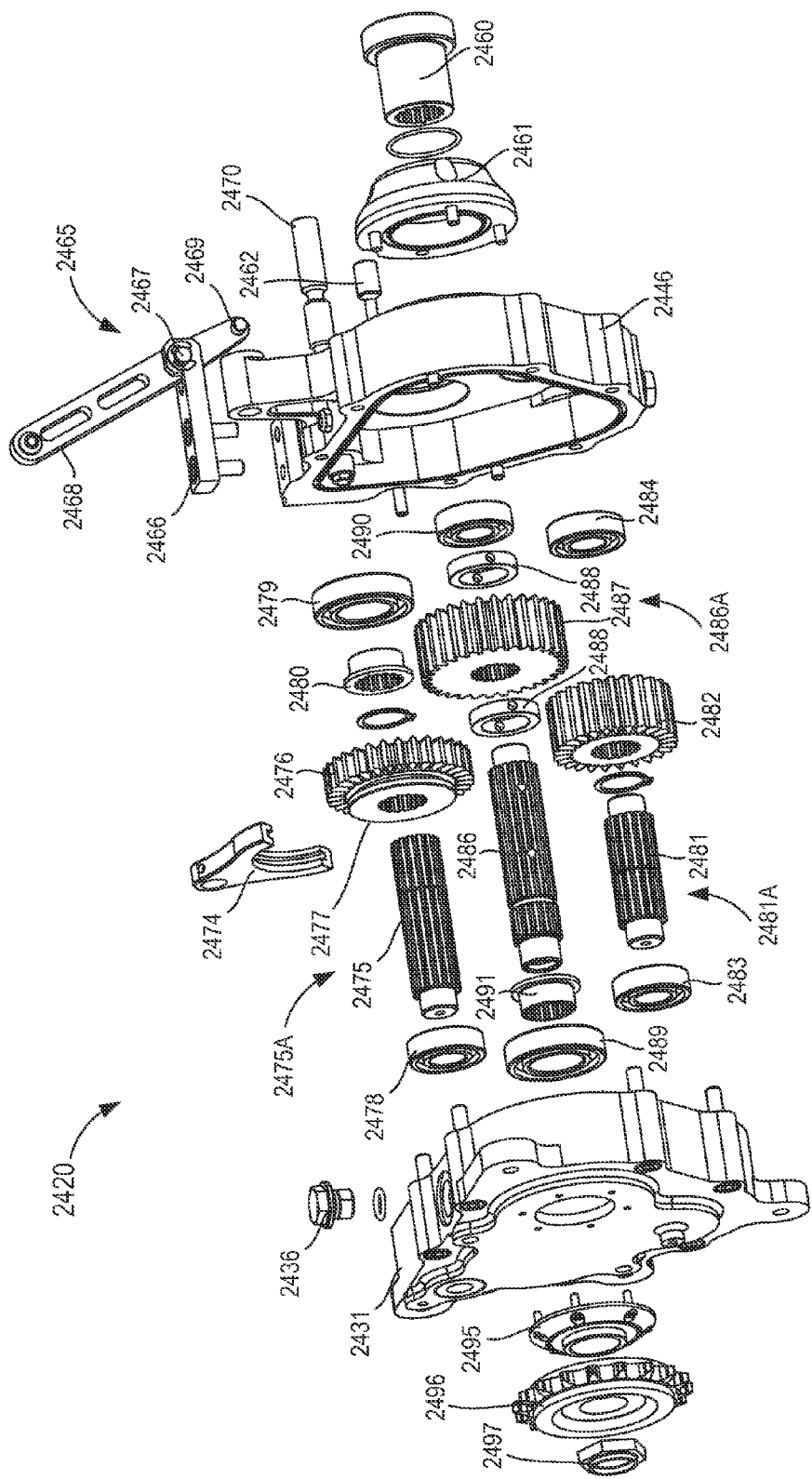

The shift assembly 2465 includes at least a mounting bracket 2466, a pivot pin 2467, a shift arm 2468, a shift rod 2470, and a shift fork 2474 (see e.g., FIG. 18). The mounting bracket 2466 is coupled to the housing 2430, as shown in FIG. 12. The shift arm 2468 is movably coupled to the bracket for pivoting motion. The shift arm 2468 includes a protrusion 2469 that is disposed within a notch 2471 defined by the shift rod 2470 such that when the shift arm 2468 is pivoted relative to the bracket 2466, the shift rod 2470 is moved in a substantially linear direction between a first position and a second position relative to the housing 2430. For example, an operator can engage a shifter (e.g., a manual shifter including mechanical linkage that is coupled to the shift arm 2468 or an electronic shifter including an actuator operably coupled to the shift arm 2468) to pivot the shift arm 2468 about the pivot pin 2467 to move the shift rod 2470 (e.g., via the protrusion 2469) in a substantially linear motion between the first position and the second position. Moreover, the shift fork 2474 can be disposed within the housing 2430 and coupled to the shift rod 2470 such that when the shift rod 2470 is moved between its first position and its second position, the shift fork 2474 is moved concurrently between a first position and a second position, respectively, within the housing 2430, and in turn, transitioning the reverse gear assembly 2420 between the first configuration and the second configuration, respectively, as described in further detail herein.

As shown in FIG. 12, the housing 2430 is coupled to an input shaft adapter 2460 and an input shaft seal 2461. The input shaft adapter 2460 can be configured to receive an input from the engine 2410 and/or a transmission (e.g., an output shaft of the engine 2410 or transmission). As described in further detail herein, the housing can define an input shaft opening (see e.g., FIGS. 16 and 17) that can allow the input shaft adapter 2460 and/or the input shaft (not shown) to engage with the interior components of the reverse gear assembly 2420. The input shaft adapter 2460 is a configured to receive a splined shaft, and can thus receive input from a variety of different power plants. In this manner, the reverse gear assembly is adaptable for any suitable engine and/or transmission.

The input shaft seal 2461 can be configured to form a substantially fluid tight seal about the input shaft opening 2447 defined by the housing 2430 such that a fluid disposed within the housing 2430 is substantially fluidically isolated from a volume outside of the housing 2430. The input shaft seal 2461 can be any suitable seal such as, for example, a cover, gasket, bushing, O-ring, etc. Moreover, the input shaft seal 2461 can include any suitable structure that can couple the input shaft seal 2461 to the housing 2430.

Figure 13:
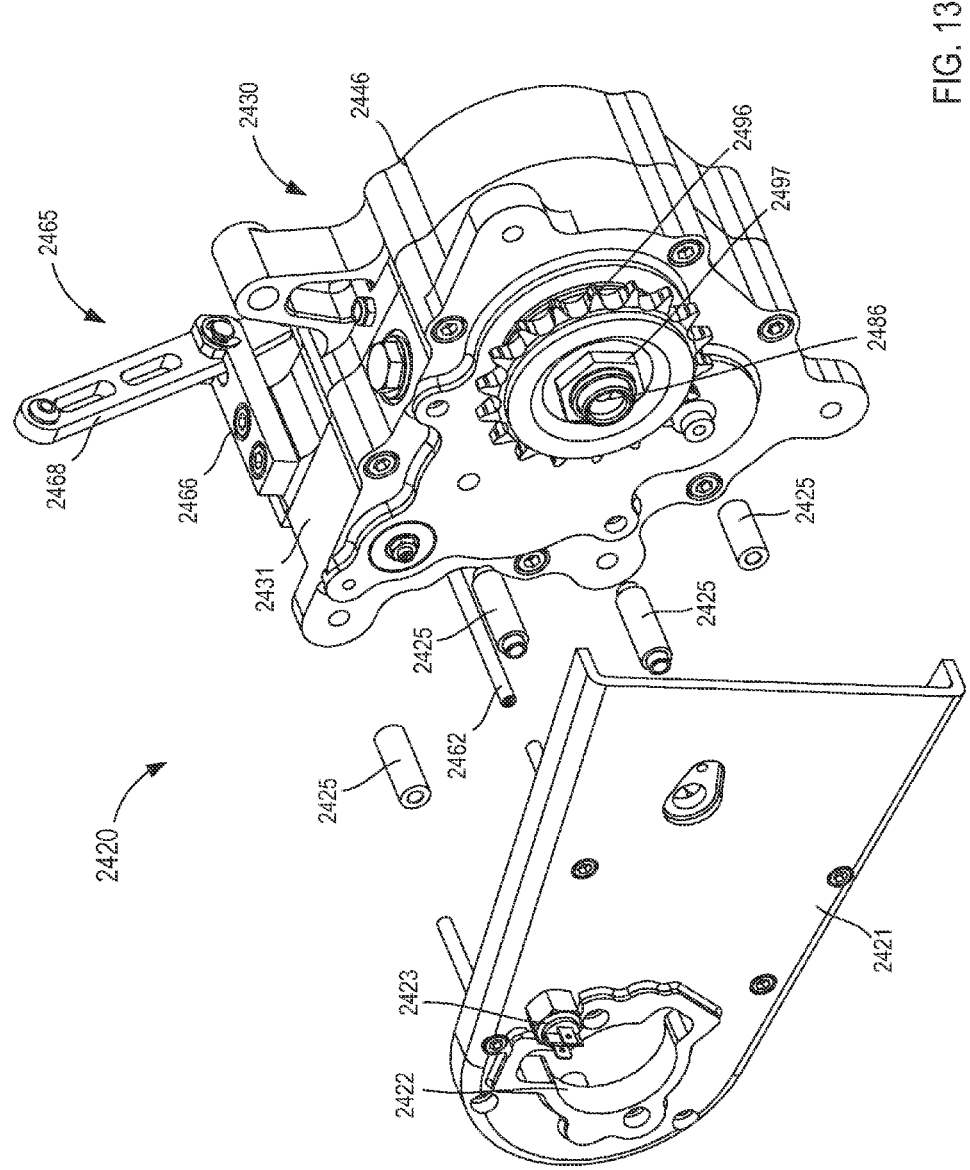
FIGS. 13 and 18 are exploded views of the reverse gear assembly illustrated in FIGS. 11 and 12.
Figure 14:
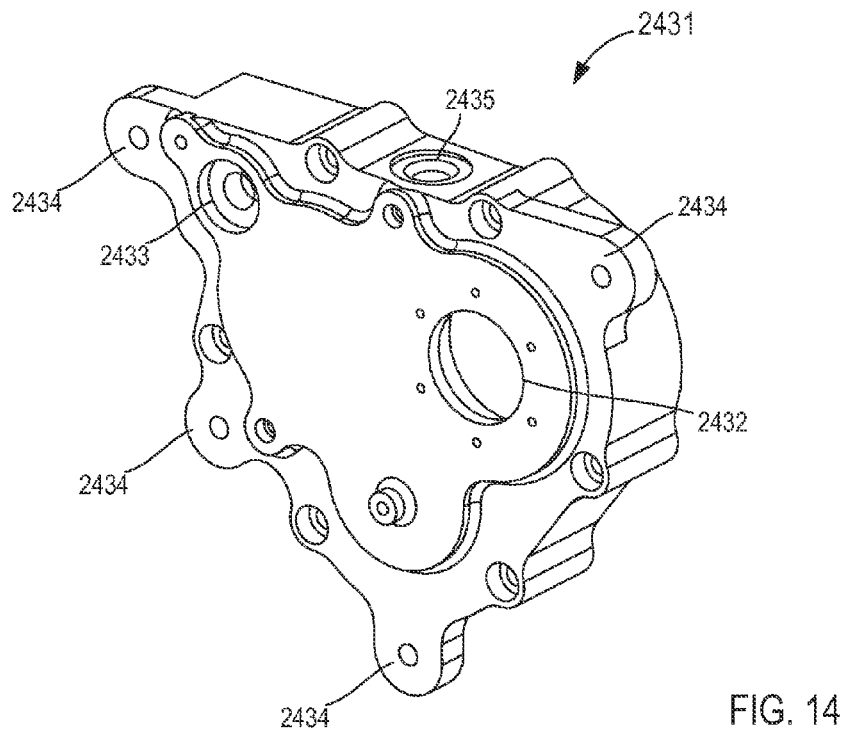
FIGS. 14 and 15 are a front perspective view and a rear perspective view, respectively, of a first housing member of the reverse gear assembly illustrated in FIGS. 11 and 12.

The cover 2421 is coupled to the housing 2421 and is configured to cover and/or protect, for example, an output sprocket 2496 of the reverse gear assembly 2420 (see e.g., FIG. 13). More particularly, the cover 2421 can be coupled to the housing 2430 and spaced apart via one or more spacers 2425 a suitable distance as to allow the drive chain 2405 to be disposed therebetween and about the output sprocket 2496. In some embodiments, the cover 2421 can shield and/or protect the output sprocket 2496 of the reverse gear assembly 2420 from damage and/or can shield and/or protect an operator from injury associated with inadvertent contact with the output sprocket 2496 of the reverse gear assembly 2420. The cover 2421 defines an opening 2422 and is coupled to a switch 2423. The opening 2422 can be configured to receive a clutch component or the like that can be used in conjunction with the switch 2423 and a clutch push rod 2462 to engage or disengage an input portion of the reverse gear assembly 2420 from an output portion of the reverse gear assembly 2420. In some embodiments, one or more electrical controls and/or the like can be configured to control a clutch or the like.

As shown in FIGS. 14-17, the housing 2430 includes a first housing member 2431 and a second housing member 2446. The first housing member 2431 includes a set of mounting tabs 2434 that can be configured to couple the reverse gear assembly 2420 to, for example, a support structure included in the rear portion 2150 of the frame 2100. The first housing member 2431 defines an output opening 2432, a shift rod opening 2433, and a fill port 2435. The output opening 2432 receives a portion of an output shaft 2486 (see e.g., FIG. 18) such that a portion of the output shaft 2486 extends beyond a surface of the first housing member 2431. In this manner, the output sprocket 2496 can be coupled to the output shaft 2486, as described in further detail herein. Moreover, an output shaft seal 2495 (see e.g., FIG. 18) can be coupled to the first housing member 2431 and disposed about the output shaft 2486. In this manner, the output shaft seal 2495 can form a substantially fluid tight seal about the opening 2432 defined by the first housing member 2431 such that fluid disposed within the housing 2430 is substantially fluidically isolated from a volume outside of the housing 2430. In some embodiments, the output shaft seal 2495 can be substantially similar to or the same as the input shaft seal 2461 described above with reference to FIG. 12.

The shift rod opening 2433 movably receives the shift rod 2470 as the shift rod 2470 is moved between its first position and its second position relative to the housing 2430. Moreover, the shift rod opening 2433 can receive a bushing, seal, and/or the like that can be disposed about the shift rod 2470 and that can form a substantially fluid tight seal with the shift rod 2470 and the shift rod opening 2433 to fluidically isolate a fluid within the housing 2430 from a volume outside of the housing 2430. The fill port 2435 can receive a flow of fluid from an external fluid source to dispose a volume of the fluid in the housing 2430. For example, in some embodiments, the fill port 2435 can be configured to receive a flow of transmission oil or the like. With a desired volume of fluid disposed in the housing 2430, the fill port 2435 can receive a fill plug 2436 (see e.g., FIG. 18). The fill plug 2436 can be, for example, a threaded plug or the like that can include a seal member configured to form a fluid tight seal with the first housing member 2431 to substantially fluidically isolate a volume of fluid within the housing 2430 from a volume outside of the housing 2430.

Figure 15:
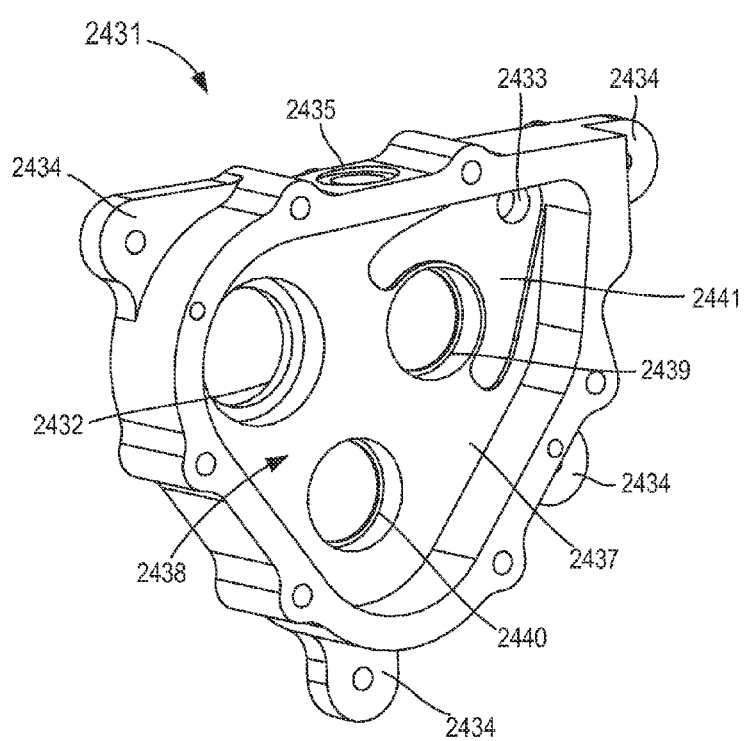

The first housing member 2431 includes an inner surface 2437 that defines an inner volume 2438 of the first housing member 2431, as shown in FIG. 15. Said another way, the first housing member 2431 can include a set of walls that extend from the inner surface 2437 such that the inner surface 2437 is spaced apart from an outer surface of the walls, thus defining the inner volume 2438. The inner surface 2437 defines an input shaft bearing recess 2439, an idler shaft bearing recess 2440, and a shift fork recess 2441. The input shaft bearing recess 2439 is configured to receive a first bearing 2478 of the input portion 2475A (see e.g., FIG. 18). Similarly, the idler shaft bearing recess 2440 is configured to receive a first bearing 2483 of the idler portion 2481A. The arrangement of the output shaft opening 2432 can be such that a portion of the output shaft opening 2432 receives a first bearing 2489 of the output portion 2486A in a similar manner. In some embodiments, the arrangement of the input shaft bearing recess 2439, the idler shaft bearing recess 2440, and the output shaft opening 2432 can be such that the bearings 2478, 2483, 2489, respectively, form a press fit with the inner surface 2437 of the first housing member 2431, thereby retaining the bearings 2478, 2483, and 2489, respectively, in a fixed orientation relative to the first housing member 2431. The shift fork recess 2441 is configured to increase a distance between the inner surface 2437 of the first housing member 2431 and a shift fork 2474 of the shift assembly 2470. Said another way, the shift fork receive 2441 can be configured to provide a clearance between the inner surface 2437 of the first housing member 2431 and a surface of the shift fork 2470 when the shift fork 2470 is moved from a first position to a second position relative to the first housing member 2431, as described in further detail herein.

Figure 17:
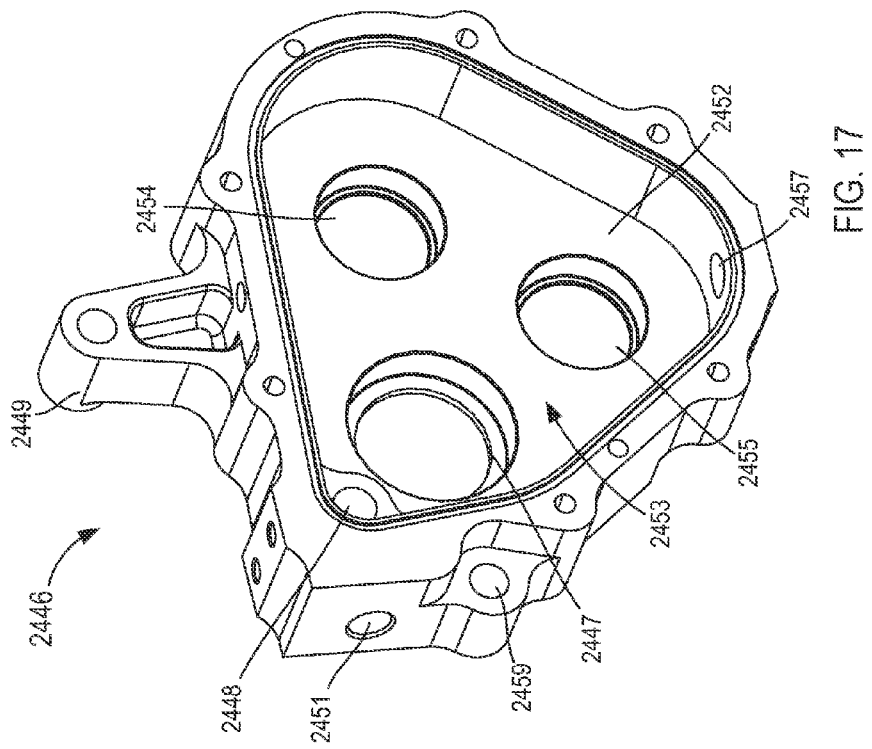
FIGS. 16 and 17 are a front perspective view and a rear perspective view, respectively, of a second housing member of the reverse gear assembly illustrated in FIGS. 11 and 12.
Figure 16:
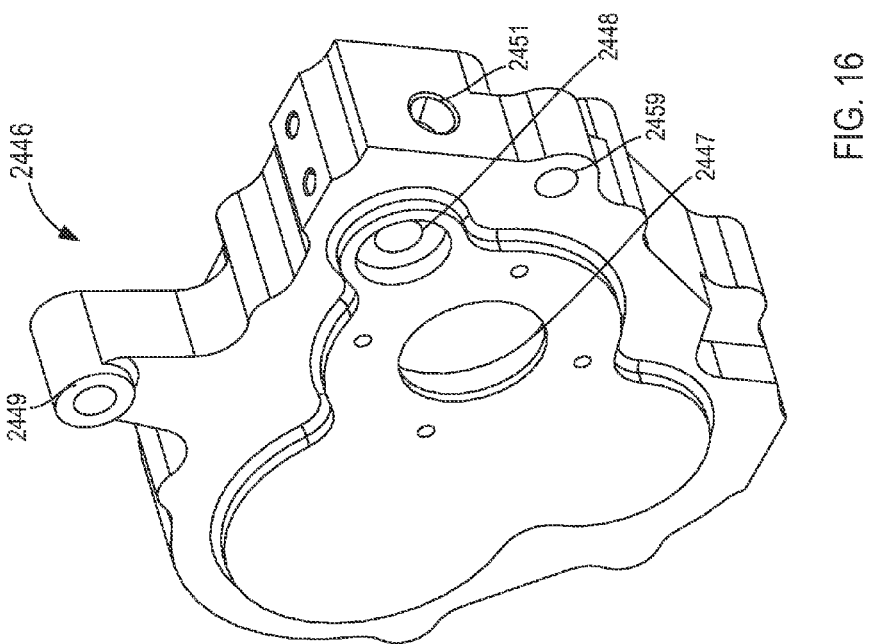

As shown in FIGS. 16 and 17, the second housing member 2446 includes mounting portion 2449 that can be configured to couple the reverse gear assembly 2420 to, for example, a support structure included in the rear portion 2150 of the frame 2100 and/or to a structure included in or on the engine 2410. The second housing member 2449 defines an input opening 2447, a shift rod opening 2448, a shift lock opening 2451, a drain opening 2457, and a clutch rod opening 2459. The input opening 2447 is configured to receive a portion of the input shaft and/or the input shaft adapter 2462 and is circumscribed by the input shaft seal 2461, as described above with reference to FIG. 12.

The shift rod opening 2448 movably receives the shift rod 2470 as the shift rod 2470 is moved between its first position and its second position relative to the housing 2430. Moreover, the shift rod opening 2448 can receive a bushing, seal, and/or the like that can be disposed about the shift rod 2470 and that can form a substantially fluid tight seal with the shift rod 2470 and the shift rod opening 2433, as described above. The shift lock opening 2451 can receive a portion of a shift lock mechanism, as described in further detail herein. The drain port 2457 can receive a flow of fluid within the housing 2430 to drain a volume of the fluid from the housing 2430. As described above, the drain port 2457 can receive a drain plug 2458 (see e.g., FIG. 19). The drain plug 2458 can be, for example, a threaded plug or the like that can include a seal member configured to form a fluid tight seal with the second housing member 2446 to substantially fluidically isolate a volume of fluid within the housing 2430 from a volume outside of the housing 2430. Thus, the drain plug 2458 can be removed from the drain port 2457 periodically to drain fluid from the housing 2430 that can include contaminants or debris. With a desired amount of fluid drained from the housing 2430, the drain plug 2458 can be replaced a flow of substantially clean fluid can be delivered to the housing 2430 via the fill port 2435 of the first housing member 2431. The clutch rod opening 2459 can be configured to movably receive the clutch push rod 2462 to allow the clutch push rod 2462 to engage or disengage the input portion of the reverse gear assembly 2420 from the output portion of the reverse gear assembly 2420, as described above.

The second housing member 2446 includes an inner surface 2452 that defines an inner volume 2453 of the second housing member 2446, as shown in FIG. 15. Said another way, the second housing member 2446 can include a set of walls that extend from the inner surface 2452 such that the inner surface 2452 is spaced apart from an outer surface of the walls, thus defining the inner volume 2453. The inner surface 2452 defines an output shaft bearing recess 2454 and an idler shaft bearing recess 2455. The output shaft bearing recess 2454 is configured to receive a second bearing 2490 of the output portion 2486A (see e.g., FIG. 18). Similarly, the idler shaft bearing recess 2455 is configured to receive a second bearing 2484 of the idler portion 2481A. The arrangement of the input shaft opening 2447 can be such that a portion of the input shaft opening 2447 receives a second bearing 2479 of the input portion 2486A in a similar manner. In some embodiments, the arrangement of the output shaft bearing recess 2454, the idler shaft bearing recess 2455, and the input shaft opening 2447 can be such that the bearings 2490, 2484, 2479, respectively, form a press fit with the inner surface 2437 of the first housing member 2431, thereby retaining the bearings 2490, 2484, and 2490, respectively, in a fixed orientation relative to the second housing member 2446.

Figure 19:
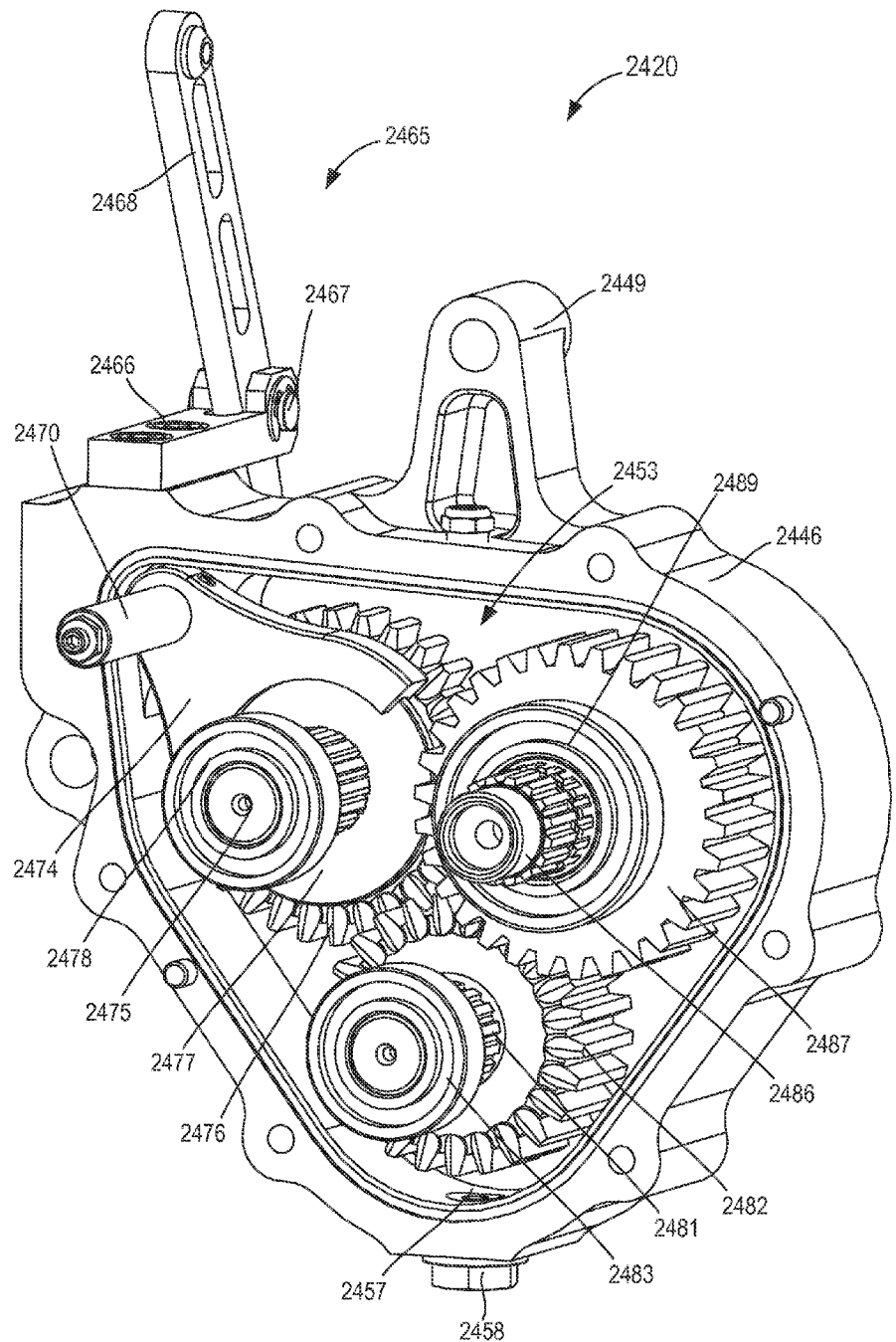
FIGS. 19-21 are a right perspective view, a left perspective view, and a front view, respectively, of a portion of the reverse gear assembly illustrated in FIGS. 11 and 12, in a first configuration.

As shown in FIGS. 18-21, the reverse gear assembly 2420 includes the input portion 2475A, the idler portion 2481A, and the output portion 2489A. The input portion 2475A includes an input shaft 2475, an input gear 2476, the first bearing 2478, the second bearing 2479, and a bearing adapter 2480. The input shaft 2475 is a substantially cylindrical shaft with at least a portion of an outer surface forming and/or defining a spline (i.e., a set of grooves and/or protrusions that are parallel to an axis of rotation of the input shaft 2475 and that are uniform in size and shape as well as uniformly spaced about the circumference of the input shaft 2475). As shown in FIG. 18, the arrangement of the input shaft 2475 can be such a first end portion of the input shaft 2475 is substantially smooth while the spline extends through a second end portion to an end surface associated therewith. In other words, the input shaft 2475 can be arranged such that the spline does not extend the entire length of the input shaft 2475. Thus, the first bearing 2478 of the input portion 2475A can be disposed about the first end portion of the input shaft 2475, as shown in FIG. 19. In some embodiments, the first bearing 2478 can form a press fit with the first end portion of the input shaft 2475 (e.g., a friction fit). Therefore, when the first bearing 2478 is disposed in the input shaft bearing recess 2439 defined by the first housing member 2431, the first bearing 2478 can permit the input shaft 2475 to rotate relative to the housing 2430.

With the spline defined by the input shaft 2475 extending to an end surface at the second end portion, the bearing adapter 2480 can be disposed about the input shaft 2475 and in turn, the second bearing 2479 can be disposed about the bearing adapter 2480. More specifically, the bearing adapter 2480 can include an inner surface that forms a female spline that can mesh or otherwise matingly couple to the male spline of the input shaft 2475, and can include an outer surface that is substantially smooth. Thus, the second bearing 2479 can be disposed about the bearing adapter 2480 to be coupled to the input shaft 2475. Although described as including a bearing adapter 2480, in other embodiments, the second bearing 2479 can include an inner surface that forms a female spline configured to mesh or otherwise matingly couple to the spline of the input shaft 2475. As described above with reference to the first bearing 2478, when the second bearing 2479 is disposed within the portion of the input shaft opening 2447 defined by the second housing member 2446 (see e.g., FIGS. 16 and 17), the second bearing 2479 can permit the input shaft 2475 to rotate relative to the housing 2430. In this manner, the input shaft 2475 can traverse the inner volume 2438 of the first housing member 2431 and the inner volume 2453 of the second housing member 2446 while being supported at the first end portion and the second end portion by the first bearing 2478 and the first housing member 2431, and the second bearing 2479 and the second housing member 2446, respectively.

Figure 20:
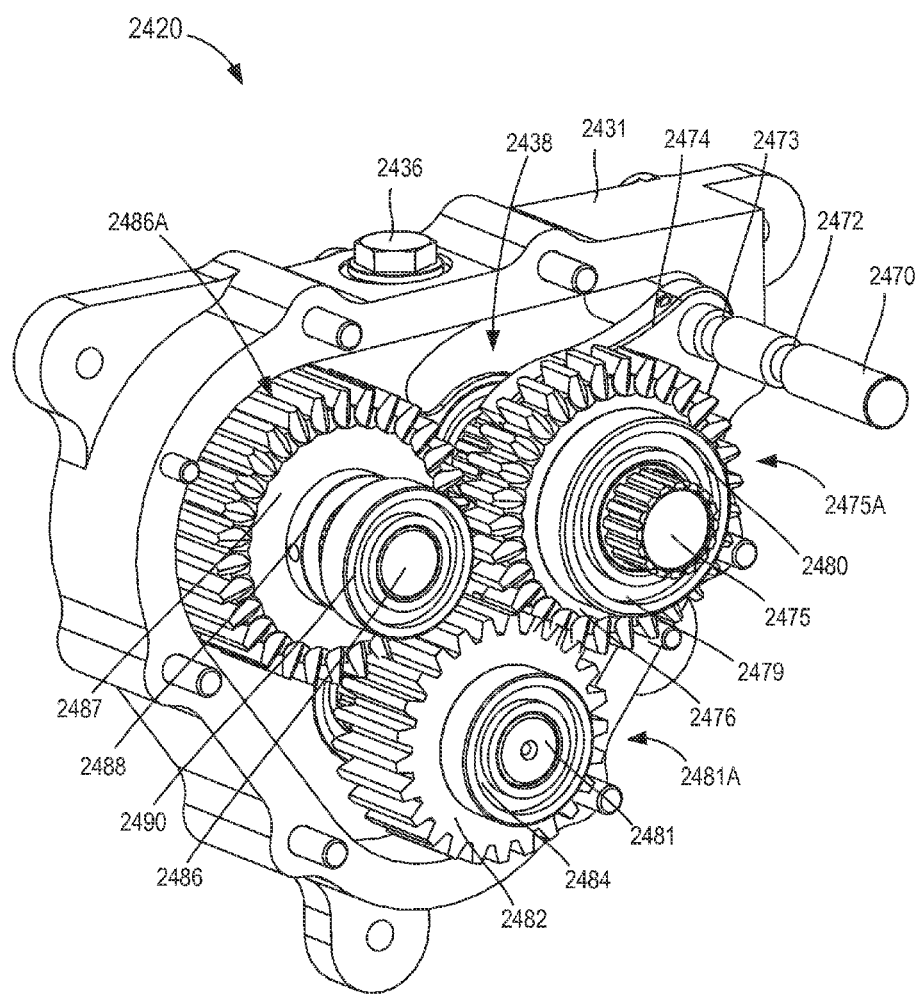
Figure 21:
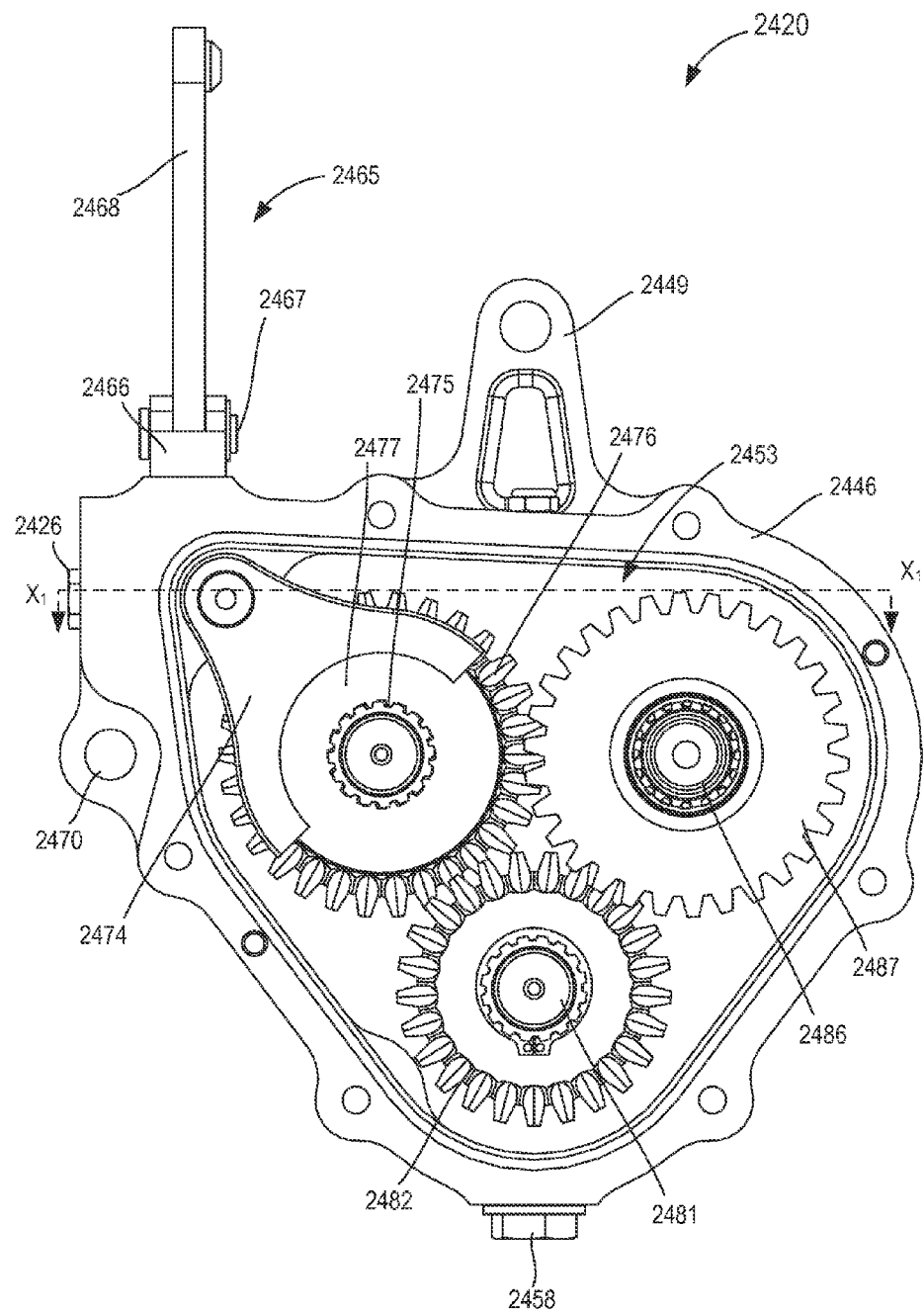

As shown in FIG. 20, the arrangement of the input portion 2475A can be such that the second end portion of the input shaft 2475 extends beyond the second bearing 2480. Similarly stated, the second bearing 2480 is spaced apart from the end surface at the second end portion. In this manner, the input shaft 2475 can be inserted into a portion of the input adapter 2460 (see e.g., FIGS. 12 and 18) such that when a portion of the output shaft of the engine 2410 (not shown in FIGS. 10-43) is disposed in the input adapter 2460, the input shaft 2475 is operably coupled to the output shaft of the engine 2410. Thus, rotation of the output shaft of the engine 2410 (and/or rotation of an output shaft of a transmission as described above) rotates the input shaft 2475 with same rotational velocity.

As shown, the input gear 2476 includes a set of teeth or cogs with a uniform size and shape that are uniformly spaced along the circumference (e.g., an outer surface) of the input gear 2476. The input gear 2476 is movably disposed about the input shaft 2475. More specifically, an inner surface of the input gear 2476 can form a female spline that is configured to mesh and/or matingly couple to the male spline formed by the input shaft 2475. The arrangement of the spline formed by the input shaft 2475 and the spline formed by the input gear 2476 is such that rotational motion of the input gear 2476 relative to the input shaft 2475 is substantially eliminated (and vice versa). Thus, rotation of the input shaft 2475 rotates the input gear 2476 with the same rotational velocity. The input gear 2476 and the input shaft 2475 can be arranged, however, to allow the input gear 2476 to be moved in an axial direction relative to the input shaft 2475. In some embodiments, the input gear 2476 and the input shaft 2475 can be arranged in a manner as to reduce friction therebetween (at least in the axial direction), thereby allowing the input gear 2476 to be moved along a length of the input shaft 2475. In some embodiments, any suitable retention member and/or clip can be disposed about the input shaft 2475 in any suitable position to, for example, define a limit of travel for the input gear 2476.

The input gear 2476 includes a shift fork portion 2477 that is configured to receive a portion of the shift fork 2474. For example, in some embodiments, the shift fork portion 2477 can extend from a surface of the input gear 2476 and can include an annular flange about which the shift fork 2474 can be disposed. More specifically, a portion of the shift fork 2474 can be semi-annular with an inner surface that defines a groove configured to receive the shift fork portion 2477 of the input gear 2476. In this manner, the shift fork 2474 can be configured to move the input gear 2476 along the input shaft 2475 between a first position relative to the housing 2430 associated with the reverse gear assembly 2420 in the first configuration, and a second position relative to the housing 2430 associated with the reverse gear assembly 2420 in the second configuration, as described in further detail herein.

The idler portion 2481A of the reverse gear assembly 2420 includes an idler shaft 2481, an idler gear 2482, the first bearing 2483, and the second bearing 2484. The idler shaft 2481 is a substantially cylindrical shaft with at least a portion of an outer surface forming and/or defining a spline, as described above with reference to the input shaft 2475. As shown in FIG. 18, the arrangement of the idler shaft 2481 can be such that the end portions of the idler shaft 2481 are substantially smooth. In other words, the idler shaft 2481 can be arranged such that the spline does not extend the entire length of the idler shaft 2481. Thus, the first bearing 2483 of the idler portion 2481A can be disposed about a first end portion of the idler shaft 2481 (FIG. 19) and the second bearing 2484 of the idler portion 2481A can be disposed about a second end portion of the idler shaft 2481 (FIG. 20). As described above, the first bearing 2483 and the second bearing 2484 can form a press fit with the first end portion and the second end portion, respectively, of the idler shaft 2481 (e.g., a friction fit). Therefore, when the first bearing 2483 is disposed in the idler shaft bearing recess 2440 defined by the first housing member 2431 and the second bearing 2484 is disposed in the idler shaft bearing recess 2455 of the second housing member 2446, the first bearing 2483 and the second bearing 2484 can permit the idler shaft 2481 to rotate relative to the housing 2430. In this manner, the idler shaft 2481 can traverse the inner volume 2438 of the first housing member 2431 and the inner volume 2453 of the second housing member 2446 while being supported at the first end portion and the second end portion by the first bearing 2483 and the first housing member 2431, and the second bearing 2484 and the second housing member 2446, respectively.

As shown, the idler gear 2482 includes a set of teeth or cogs with a uniform size and shape that are uniformly spaced along the circumference (e.g., an outer surface) of the idler gear 2482. The idler gear 2482 is disposed about the idler shaft 2481. More specifically, an inner surface of the idler gear 2482 can form a female spline that is configured to mesh and/or matingly couple to the male spline formed by the idler shaft 2481. In some embodiments, any suitable retention member and/or clip can be disposed about the idler shaft 2481 in any suitable position to, for example, substantially prevent movement of the idler gear 2482 in an axial direction relative to the idler shaft 2481. The arrangement of the spline formed by the idler shaft 2481 and the spline formed by the idler gear 2482 is such that rotational motion of the idler gear 2482 relative to the idler shaft 2481 is substantially eliminated (and vice versa). Thus, rotation of the idler gear 2482 rotates the idler shaft 2481 with the same rotational velocity (and vice versa). More specifically, the idler shaft 2481 and the idler gear 2482 can be disposed within the housing 2430 such that the idler gear 2482 rotatably couples, engages, syncs, and/or meshes with the input gear 2476 when the input gear 2476 is in its first configuration. As such, rotation of the input shaft 2475 as a result of a rotation of the output shaft of the engine 2410 (as described above) rotates the input gear 2476 and with the input gear 2476 enmeshed with the idler gear 2482, the rotation of the input gear 2476 rotates the idler gear 2482 with substantially the same rotational speed in an opposite rotational direction, as described in further detail herein.

The output portion 2486A of the reverse gear assembly 2420 includes an output shaft 2486, an output gear 2487, a set of retention members 2488, the first bearing 2489, the second bearing 2490, and a bearing adapter 2491. The output shaft 2486 is a substantially cylindrical shaft with at least a portion of an outer surface forming and/or defining a spline, as described above with reference to the input shaft 2475. As shown in FIG. 18, the arrangement of the output shaft 2486 can be such that a first end portion of the output shaft 2486 defines a threaded surface (not shown) and a second end portion of the output shaft 2486 is substantially smooth. In other words, the output shaft 2486 can be arranged such that the spline does not extend the entire length of the output shaft 2486.

The first end portion of the output shaft 2486 is configured to extend through the output shaft opening 2432 defined by the first housing member 2431 such that a portion of the spline is disposed outside of the housing 2430, as described in further detail herein. In this manner, the bearing adapter 2491 can be disposed about the output shaft 2486 and in turn, the first bearing 2489 can be disposed about the bearing adapter 2491. More specifically, the bearing adapter 2491 can include an inner surface that forms a female spline that can mesh or otherwise matingly couple to the male spline of the output shaft 2486, and can include an outer surface that is substantially smooth. Thus, the first bearing 2489 can be disposed about the bearing adapter 2491 to be coupled to the output shaft 2486, as shown in FIG. 19. The second bearing 2490 of the output portion 2486A can be disposed about the second end portion of the output shaft 2486 (FIG. 20), as described above. Therefore, when the first bearing 2489 is disposed in the portion of the output shaft opening 2432 defined by the first housing member 2431 and the second bearing 2490 is disposed in the output shaft bearing recess 2456 of the second housing member 2446, the first bearing 2489 and the second bearing 2490 can permit the output shaft 2486 to rotate relative to the housing 2430. In this manner, the output shaft 2486 can traverse the inner volume 2438 of the first housing member 2431 and the inner volume 2453 of the second housing member 2446 while being supported at the first end portion and the second end portion by the first bearing 2489 and the first housing member 2431, and the second bearing 2490 and the second housing member 2446, respectively.

The output gear 2487 of the output portion 2486A includes a set of teeth or cogs with a uniform size and shape that are uniformly spaced along the circumference (e.g., an outer surface) of the output gear 2487. The output gear 2487 is disposed about the output shaft 2486. More specifically, an inner surface of the output gear 2487 can form a female spline that is configured to mesh and/or matingly couple to the male spline formed by the output shaft 2486. As shown in FIG. 18, the retention members 2488 can be disposed about the output shaft 2486 and positioned on opposite side of the output gear 2487 to substantially prevent and/or eliminate axial movement of the output gear 2487 relative to the output shaft 2486. In some embodiments, the retention members 2488 can be, for example, annular rings that include a set screw or the like configured to be inserted into the an opening defined by the output shaft 2486, thereby maintaining the retention members 2488 in a fixed position relative to the output shaft 2486. The arrangement of the spline formed by the output shaft 2486 and the spline formed by the output gear 2487 is such that rotational motion of the output gear 2487 relative to the output shaft 2486 is also substantially prevented and/or eliminated (and vice versa). Thus, rotation of the output gear 2487 rotates the output shaft 2486 with the same rotational velocity (and vice versa). More specifically, the output shaft 2486 and the output gear 2487 can be disposed within the housing 2430 such that the output gear 2487 rotatably couples, engages, syncs, and/or meshes with the idler gear 2482 and selectively engages and/or meshes with the input gear 2476 when the input gear 2476 is in its second position. As such, rotation of the input shaft 2475 as a result of a rotation of the output shaft of the engine 2410 (as described above) rotates the input gear 2476 which in turn, indirectly (e.g., via the idler gear 2482) rotates the output gear 2487 with substantially the same rotational velocity, or directly rotates the output gear 2487 with substantially the same rotational speed in an opposite rotational direction, as described in further detail herein.

As described above, with the first end portion of the output shaft 2486 disposed outside of the housing 2430, the output sprocket 2496 can be coupled thereto. More particularly, the drive sprocket 2496 can include an inner surface that forms a female spline that can mesh and/or matingly couple to the male spline formed by the output shaft 2486. In this manner, the output sprocket 2496 can be retained in a substantially fixed position relative to the output shaft 2496. Similarly stated, the arrangement of the output shaft 2486 and the output sprocket 2496 is such that rotational motion of the output sprocket 2496 relative to the output shaft 2486 is substantially prevented and/or eliminated (and vice versa). Furthermore, as shown in FIGS. 13 and 18, a nut 2497 can be disposed about the threaded surface of the first end portion of the output shaft 2486 to form a threaded coupling that can substantially prevent and/or eliminate axial movement of the output sprocket 2496 relative to the output shaft 2486. In some embodiments, the first end portion of the output shaft 2486 can define an annular channel or recess that is substantially perpendicular to the grooves defined by the spline. The annular channel can be configured to receive a seal member or the like that can form a substantially fluid tight seal with, for example, a portion of the output shaft seal 2495, as described above.

As shown in FIGS. 19-26, the reverse gear assembly 2420 can be transitioned between the first configuration (FIGS. 19-23) associated with a forward motion of the vehicle 2000, and the second configuration (FIGS. 24-26) associated with a reverse motion of the vehicle 2000. In some embodiments, the operator of the vehicle 2000 can manipulate a shifter and/or other controller to transition the reverse gear assembly 2420. For example, in some embodiments, an operator can engage a shifter (e.g., a manual shifter including mechanical linkage that is coupled to the shift arm 2468 or an electronic shifter including an actuator operably coupled to the shift arm 2468 (not shown)) to pivot the shift arm 2468 about the pivot pin 2467. As described above and as shown in FIG. 22, with the protrusion 2469 of the shift arm 2468 disposed in the notch 2471 defined by the shift rod, the pivoting of the shift arm 2468 about the pivot pin 2467 places a surface of the protrusion 2469 in contact with a surface defining the notch 2471, thereby moving the shift rod 2470 in a substantially linear motion between the first position and the second position (e.g., in a direction substantially parallel to an axis of rotation defined by the input shaft 2475. As shown, for example, in FIG. 19, the shift fork 2474 can be fixedly disposed about a portion of the shift rod 2470. For example, in some embodiments, the shift fork 2474 can include a setscrew or the like that can be inserted into an opening defined by the shift rod 2470 to fixedly couple the shift fork 2474 thereto. Therefore, with the shift fork 2474 disposed about the shift fork portion 2477 of the input gear 2476, movement of the shift rod 2470 moves the shift fork 2474 which in turn, moves the input gear 2476 along a length of the input shaft 2475 between its first position and its second position, as described in further detail herein.

Figure 22:
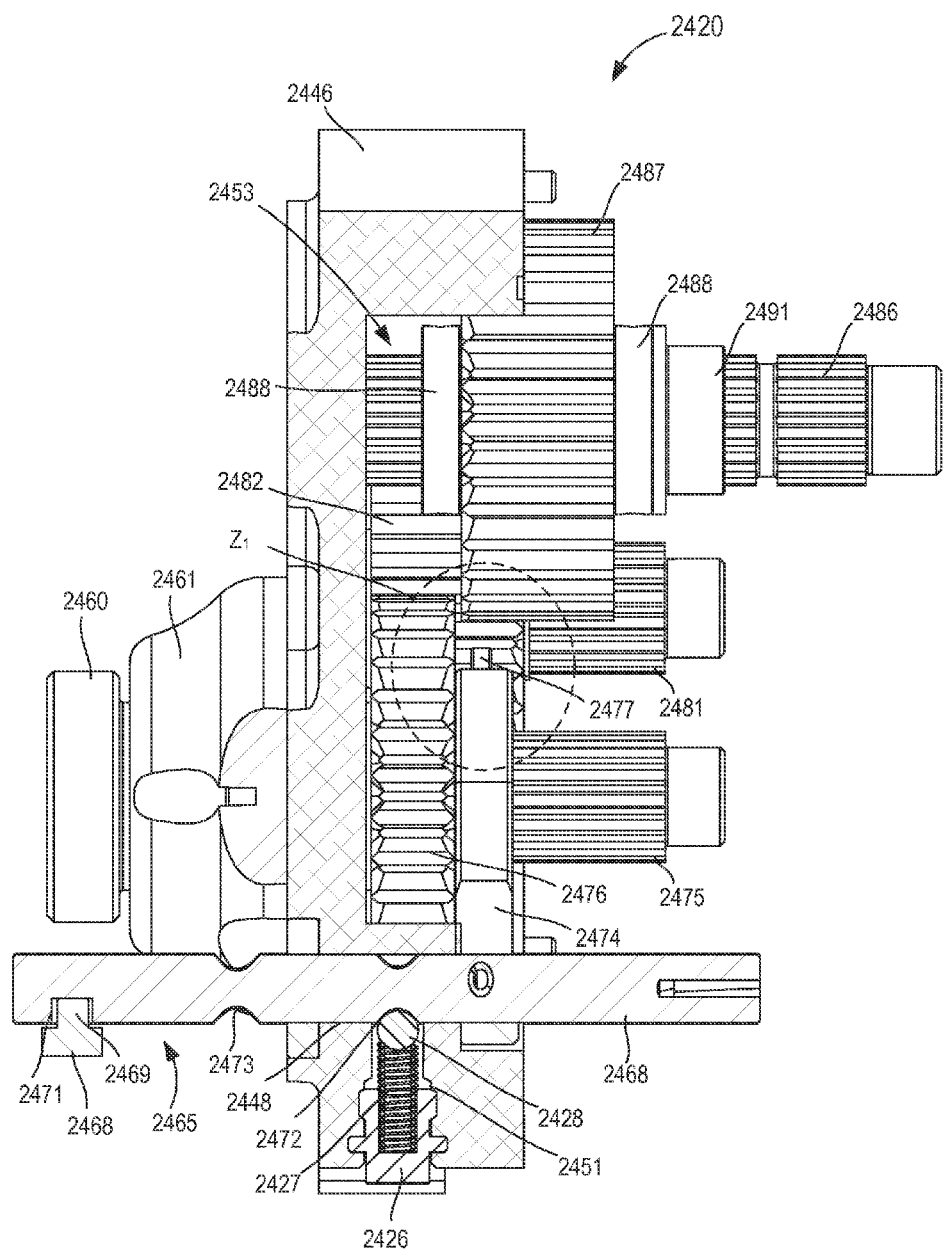
FIG. 22 is a cross-sectional view of the portion of the reverse gear assembly illustrated in FIGS. 19-21 in the first configuration, taken along the line $X_1$-$X_1$ in FIG. 21.

The reverse gear assembly 2420 includes a shift lock mechanism. More specifically, the reverse gear assembly 2420 includes a shift lock bolt 2426, a spring 2427, and a lock member 2428. As shown in FIG. 22, at least a portion of the shift lock bolt 2426, the spring 2427, and the lock member 2428 are disposed within the shift lock opening 2451. In some embodiments, the shift lock bolt 2426 can form a threaded coupling with an interior surface defining the shift lock opening 2451 to fixedly couple the shift lock bolt 2426 thereto. In some embodiments, the shift lock 2428 can be, for example, a ball or the like that is made of a substantially uncompressible material (e.g., a metal or plastic with a sufficient hardness) The arrangement of the housing 2430 is such that the second housing member 2446 defines the shift lock opening 2451 and the shift rod opening 2448 in a substantially orthogonal orientation relative to one another. In this manner, with the shift rod 2470 disposed within the shift rod opening 2448 a portion of the shift rod 2470 is disposed adjacent to the shift lock opening 2451.

When disposed in the shift lock opening 2451, the shift lock bolt 2426, the spring 2427, and the shift lock 2428 can be disposed in a substantially linear orientation such that the shift lock bolt 2426 is maintained in contact with the spring 2427 and the spring 2427 is maintained in contact with the shift lock 2428. In this manner, the shift lock bolt 2426, the spring 2427, and the shift lock 2428 can collectively define a length that is greater than a length (e.g., a depth) of the shift lock opening 2451. Thus, with the shift lock bolt 2426 fixedly coupled to the second housing member 2446 and with the shift rod 2470 disposed within the shift rod opening 2448 such that a surface is adjacent to the shift lock opening 2451, the spring 2451 can be maintained in at least a partially compressed state. Thus, the spring 2427 exerts a force (e.g., a reaction force in response to being compressed) that maintains the shift lock 2428 in contact with the surface of the shift rod 2470.

Figure 25:
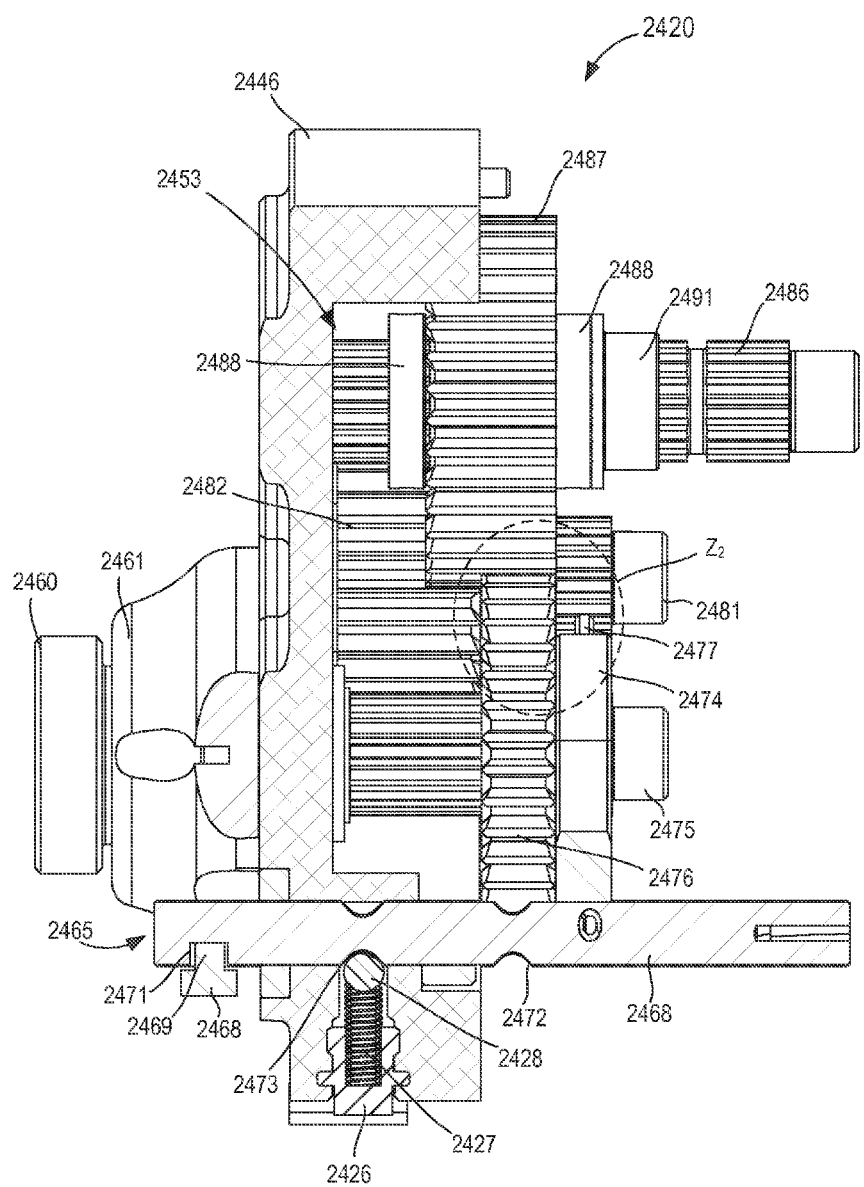
FIG. 25 is a cross-sectional view of the portion of the reverse gear assembly illustrated in FIGS. 19-21 in the second configuration, taken along the line $X_1$-$X_1$ in FIG. 21.

As shown in FIG. 22, the shift rod 2470 defines a first annular recess 2472 and a second annular recess 2473. The arrangement of the shift rod 2470 is such that, when in its first configuration, the first annular recess 2472 is substantially aligned with the shift lock opening 2451 and, when in its second configuration, the second annular recess 2473 is substantially aligned with the shift lock opening 2451 (FIG. 25). Therefore, when the shift rod 2470 is in its second configuration, the reaction force exerted by the spring 2427 places that shift lock 2428 in contact with the first annular recess 2472. More specifically, the force exerted by the spring 2427 can be sufficient to place the shift lock 2428 in contact with the first annular recess 2472 such that a friction force defined between the shift lock 2428 and the first annular recess 2472 is sufficient to resist a lateral movement of the shift lock 2428 along the shift rod 2470. Thus, the shift rod 2470 can be retained in its first position until an external force is exerted on the shift rod 2470 that is sufficient to overcome the friction force defined between the shift lock 2428 and the first annular recess 2472.

Figure 23:
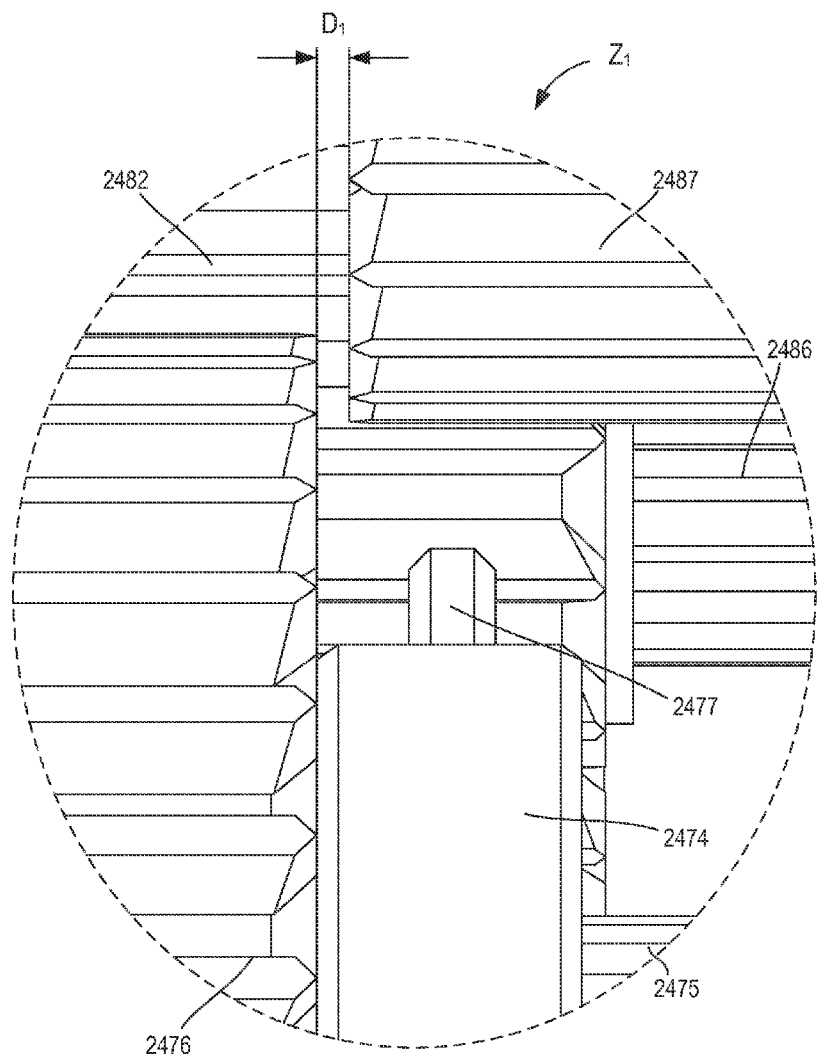
FIG. 23 is an enlarged view of a portion of the reverse gear assembly identified as the region $Z_1$ in FIG. 22, in the first configuration.

As shown in FIGS. 22 and 23, when the reverse gear assembly 2420 is in the first configuration, the shift rod 2470 and the input gear 2476 are each in their first positions. In this manner, the input gear 2476 can be positioned such that the input gear 2476 is enmeshed with the idler gear 2482 but spaced apart a distance $D_1$ from the output gear 2487. That is to say, the output gear 2487 is isolated from, separated from, and/or otherwise not enmeshed with the input gear 2476. The idler gear 2482, however, is enmeshed with the output gear 2487 and thus, the input gear 2476 is indirectly engaged with the output gear 2487. In use, the output shaft of the engine 2410 (not shown in FIGS. 10-43) can rotate the input shaft adapter 2460, which in turn, rotates the input shaft 2475 at substantially the same rotational velocity. With the idler gear 2482 enmeshed with the input gear 2476, the rotation of the input gear 2476 rotates the idler gear 2482 with substantially the same rotational speed but in an opposite rotational direction. Similarly, with the output gear 2487 enmeshed with the idler gear 2482, the rotation of the idler gear 2482 rotates the output gear 2487 with substantially the same rotational speed but in an opposite rotational direction. Thus, when the input gear 2476 is in its first position (i.e., when the reverse gear assembly 2420 is in its first configuration), the input gear 2476 indirectly rotates the output gear 2487 with substantially the same rotational velocity. Moreover, with the output sprocket 2496 coupled to the output shaft 2486 and with the drive chain 2405 operably coupling the output sprocket 2496 to the wheel assembly 2500, the wheel assembly 2500 can be rotated in the same rotational direction to move the vehicle 2000 in the forward direction.

Figure 24:
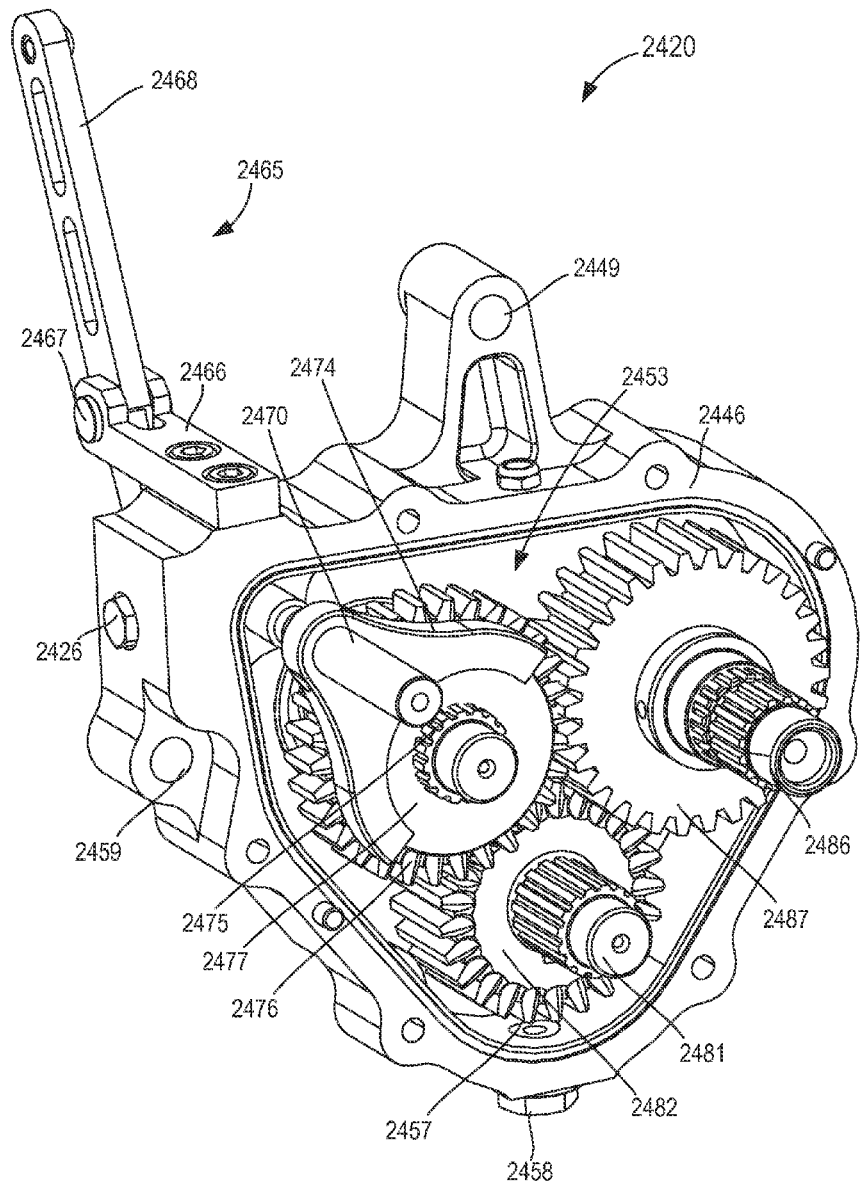
FIG. 24 is a perspective view of the portion of the reverse gear assembly illustrated in FIGS. 19-21, in a second configuration.
Figure 26:
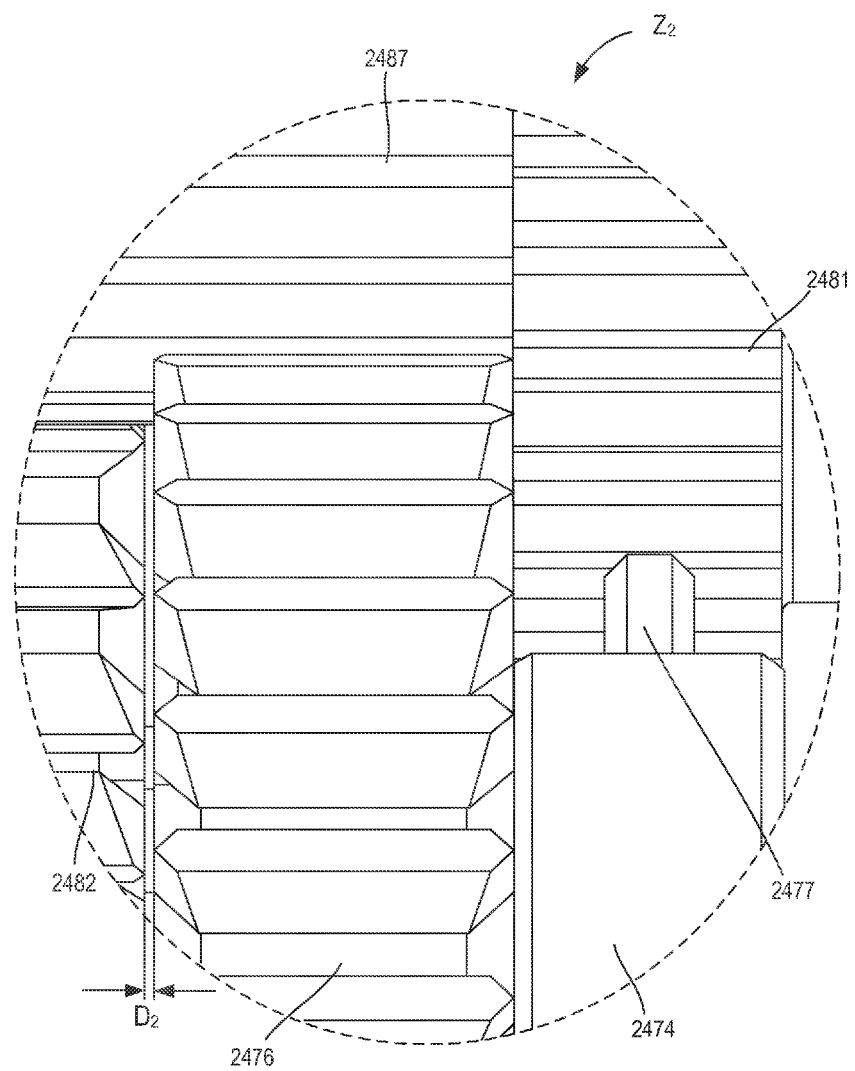
FIG. 26 is an enlarged view of a portion of the reverse gear assembly identified as the region $Z_2$ in FIG. 25, in the second configuration.

As shown in FIGS. 24-26, the operator can manipulate the shifter (as described above) to pivot the shift arm 2468 about the pivot pin 2467. As such, the protrusion 2469 can be exert a force on the surface of the shift rod 2470 that defines notch 2471 to move the shift rod 2470 to its second position. More specifically, the pivoting motion of the shift arm 2468 can exert a force of the shift rod 2470 that is sufficient to overcome the friction force between the shift lock 2428 and the first annular recess 2472. Thus, the shift rod 2470 can be moved in a substantially linear direction to the second position in which the shift lock 2428 is placed in contact with the second annular recess 2473, thereby retaining the shift rod 2470 in the second position, as shown in FIG. 25. With the shift fork 2474 fixedly coupled to the shift rod 2470 and with the shift fork 2474 disposed about the shift portion 2477 of the input gear 2476, the movement of the shift rod 2470 to the second position moves the input gear 2476 to its second position. As shown in FIG. 26, with the input gear 2476 in the second position, the input gear 2476 is spaced apart a distance $D_2$ from the idler gear 2482 and aligned with the output gear 2487 to be enmeshed therewith. That is to say, the idler gear 2482 is isolated from, separated from, and/or otherwise not enmeshed with the input gear 2476.

In use, the output shaft of the engine 2410 (not shown in FIGS. 10-43) can rotate the input shaft adapter 2460, which in turn, rotates the input shaft 2475 at substantially the same rotational velocity. With input gear 2476 spaced apart from the idler gear 2482 and enmeshed with the output gear 2487, the rotation of the input gear 2476 rotates the output gear 2487 with substantially the same rotational speed but in an opposite rotational direction. Thus, when the input gear 2476 is in its second position (i.e., when the reverse gear assembly 2420 is in its first configuration), the input gear 2476 directly rotates the output gear 2487 with substantially the same rotational but in the opposite (i.e., reverse) direction. Moreover, with the output sprocket 2496 coupled to the output shaft 2486 and with the drive chain 2405 operably coupling the output sprocket 2496 to the wheel assembly 2500, the wheel assembly 2500 can be rotated in the same rotational direction as the output sprocket 2496 to move the vehicle 2000 in the reverse direction.

The arrangement of the input gear 2476, the idler gear 2482, and the output gear 2487 is such that, when in the input gear 2476 is in the second position, the output gear 2487 remains enmeshed with the idler gear 2482. Thus, by disengaging the input gear 2476 from the idler gear 2482 (e.g., by separating the input gear 2476 and the idler gear by the distance $D_2$), the output gear 2487 can freely rotate the idler gear 2482. Although not described in detail herein, the reverse gear assembly 2420 and/or an output portion of the engine 2410 can include a clutch mechanism that can be configured to sync the input gear 2476, the idler gear 2482, and/or the output gear 2487 as the reverse gear assembly 2420 is transitioned between the first configuration and the second configuration. Although not described in detail herein, the reverse gear assembly 2420 can be transitioned from the second configuration back to the first configuration by moving the shift rod 2470 in a substantially opposite direction.

Figure 27:
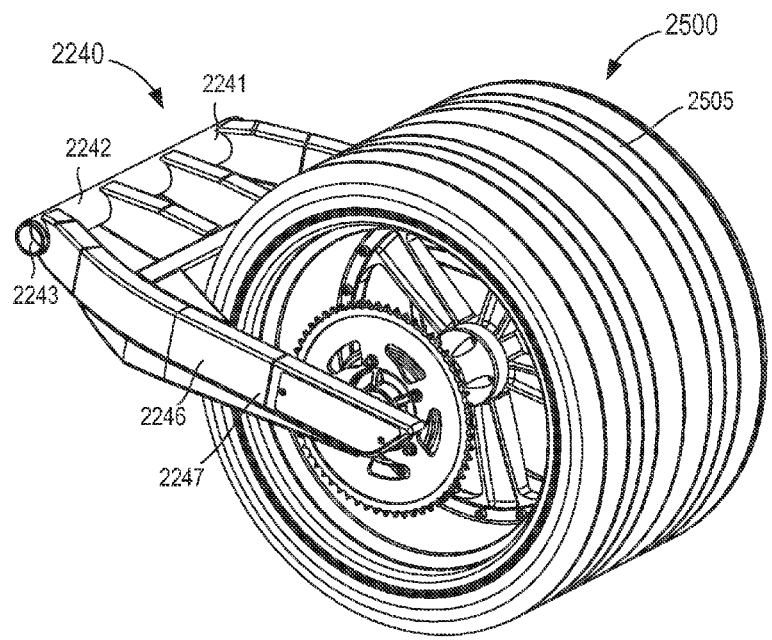
FIGS. 27 and 28 are a front perspective view and a rear perspective view, respectively, of a wheel assembly and a swing arm of the drive train illustrated in FIG. 10.
Figure 28:
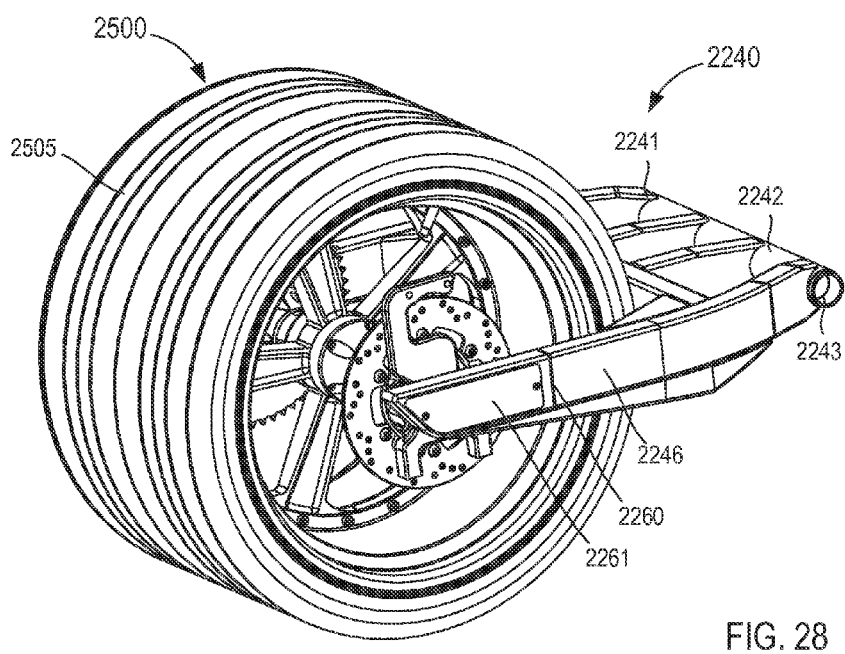
Figure 29:
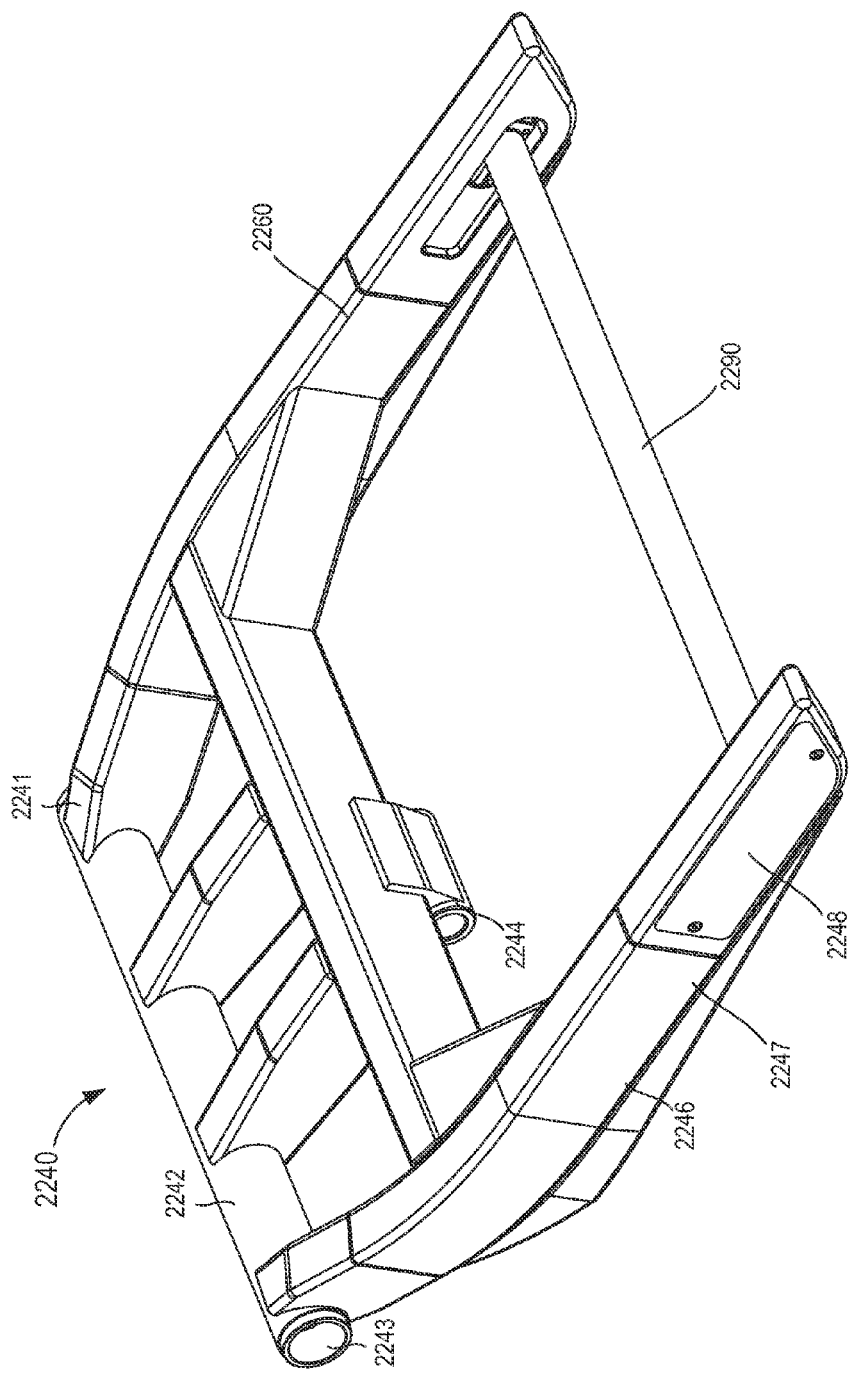
FIG. 29 is a perspective view of the swing arm illustrated in FIGS. 27 and 28.

Referring now to FIGS. 27-34 the swing arm 2240 is configured to be rotatably coupled to the rear suspension support structure 2170 of the frame 2100 and rotatably coupled to the wheel assembly 2500. As shown in FIGS. 27-29, the swing arm 2240 includes a front end portion 2241 and a rear end portion 2446. The front end portion 2241 includes a frame mounting portion 2242 that defines an opening 2243 that extends therethrough and a shock mounting portion 2244. The shock mounting portion 2244 is configured to be coupled to the shock absorber 2222 (FIGS. 8 and 9) in such a way that the shock absorber 2222 can dampen and/or absorber a force exerted on the swing arm 2240, thereby controlling a characteristic of the pivoting motion of the swing arm 2240 relative to the frame 2100.

The opening 2243 defined by the frame mounting portion 2242 can be configured to receive the pivot axle 2224, as described in detail above with reference to FIGS. 8 and 9. In this manner, the rear suspension support structure 2170 can include bushings, bearings, or joints that define an axis of rotation about which the swing arm 2240 can pivot when coupled thereto. For example, in some embodiments, the rear suspension support structure 2170 can include one or more bushings and/or bearings that can receive the pivot axle 2224, thereby movably (e.g., for pivoting motion) couple the swing arm 2240 to the rear suspension support structure 2170. Although not shown in FIGS. 27-34, the frame mounting portion 2242 can include one or more bushings, bearings, seals, and/or the like that can facilitate the rotation of the frame mounting portion 2242 about the pivot axle 2224. For example, in some embodiments, the frame mounting portion 2242 can include a grease fitting that can receive a flow of machine grease that can, for example, decrease friction between an inner surface of the frame mounting portion 2242 and an outer surface of the pivot axle 2224. In such embodiments, the frame mounting portion 2242 can include one or more seals at each end portion to substantially isolate an inner volume defined by the frame mounting portion 2242, thereby retaining the machine grease therein and substantially preventing contaminants from entering the inner volume.

Figure 30:
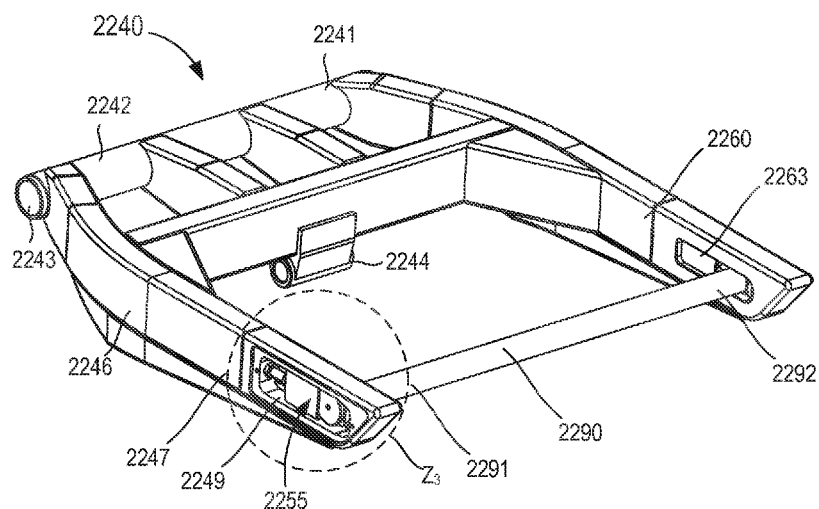
FIG. 30 is a left perspective view of the swing arm illustrated in FIGS. 27 and 28.
Figure 31:
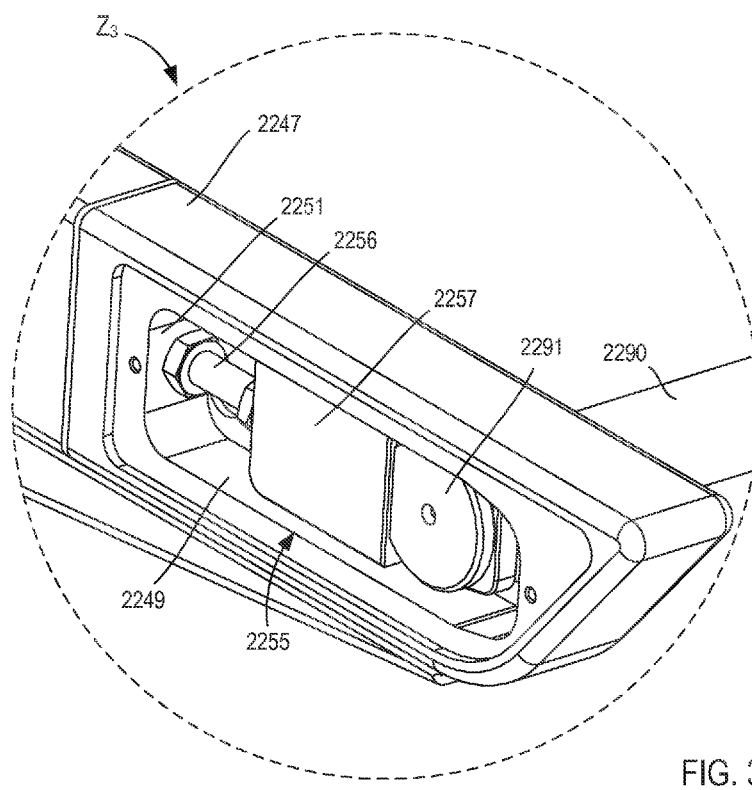
FIG. 31 is an enlarged view of a portion of the swing arm identified as the region $Z_3$ in FIG. 30.
Figure 32:
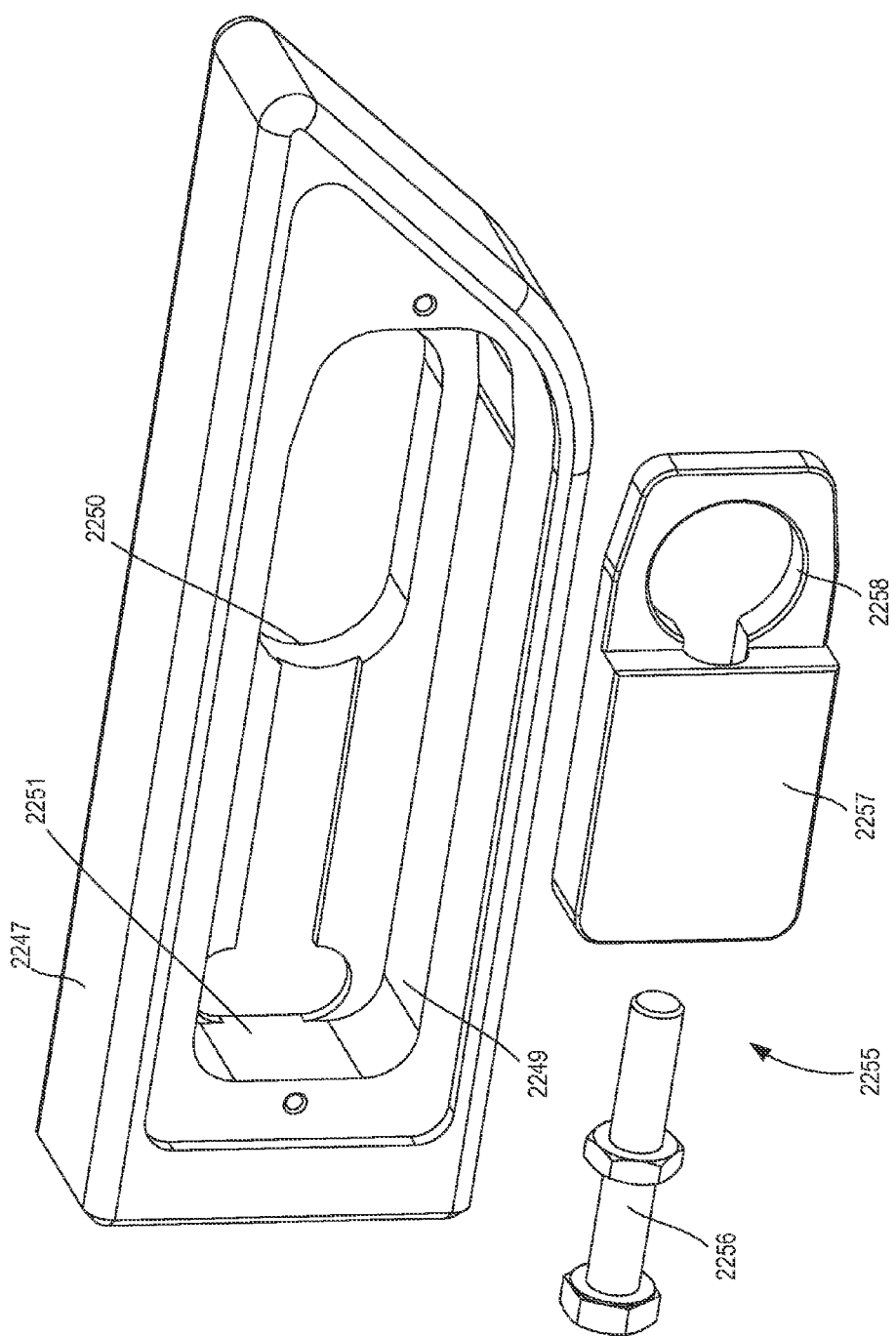
FIG. 32 is an enlarged exploded view of a portion of the swing arm illustrated in FIGS. 27 and 28.

As shown in FIGS. 30-34, the rear portion 2446 of the swing arm 2240 is bifurcated having a first arm 2247 and a second arm 2260 that are each coupled to an axle 2290 configured to extend therebetween. As shown in FIGS. 29-32, the first arm 2247 includes a cover 2248 (FIG. 29) that at least partially encloses a recess 2249 configured to receive an axle coupling mechanism 2255 (FIGS. 30-32). The axle mounting portion 2255 can be configured to couple the axle 2290 to the first arm 2247 and allow for the position of the axle 2290 to be adjusted relative to the first arm 2247. For example, as shown in FIGS. 31 and 32, the axle coupling mechanism 2255 includes an adjustment bolt 2256 and a shuttle 2257. The shuttle 2257 defines an opening 2258 that is configured to receive a first end portion 2291 of the axle 2290. More particularly, the axle 2290 includes the first end portion 2291 and a second end portion 2292. The first end portion 2291 can include a flanged end or the like while the second end portion 2292 is substantially cylindrical with an outer surface that defines, for example, a set of threads, as described in further detail herein. In this manner, the second end portion 2292 of the axle 2290 can be inserted through the opening 2258 to place the flanged end of the first end portion 2291 in contact with the shuttle 2257 (see e.g., FIG. 31). Moreover, the first arm 2247 of the swing arm 2240 defines a slot 2250 (see e.g., FIG. 32) through which the axle 2290 can extend to be coupled to the second arm 2260.

As shown in FIG. 31, with the axle coupling mechanism 2255 disposed in the recess 2249 and with the first end portion 2291 of the axle 2290 in contact with the shuttle 2257, the adjustment bolt 2256 can be in contact with a contact surface 2251 of the first arm 2247 and the shuttle 2257. More specifically, in some embodiments, the adjustment bolt 2256 can form a threaded coupling with the shuttle 2257. In this manner, the adjustment bolt 2256 can be rotated relative to the shuttle 2257 to advance or retract a portion of the adjustment bolt 2256 relative to the shuttle 2257. Thus, with the adjustment bolt 2256 in contact with the contact surface 2251 of the first arm 2246, rotation of the adjustment bolt 2256 moves the shuttle 2257 relative to the contact surface 2251. For example, the adjustment bolt 2251 can be rotated to move the shuttle 2257 away from the contact surface 2251. Therefore, with the first end portion 2291 of the axle 2290 coupled to the shuttle 2257, the axle 2290 can be moved concurrently with the shuttle 2257 along a path defined by the slot 2250.

Figure 33:
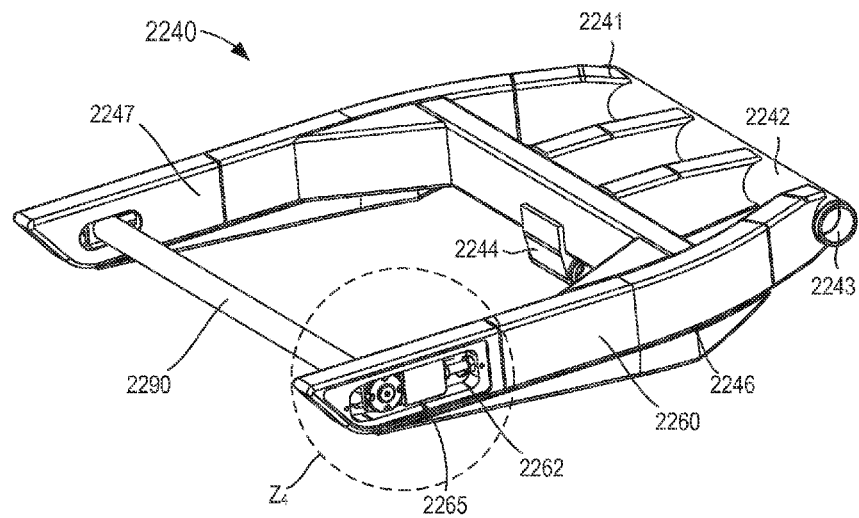
FIG. 33 is a right perspective view of the swing arm illustrated in FIGS. 27 and 28.
Figure 34:
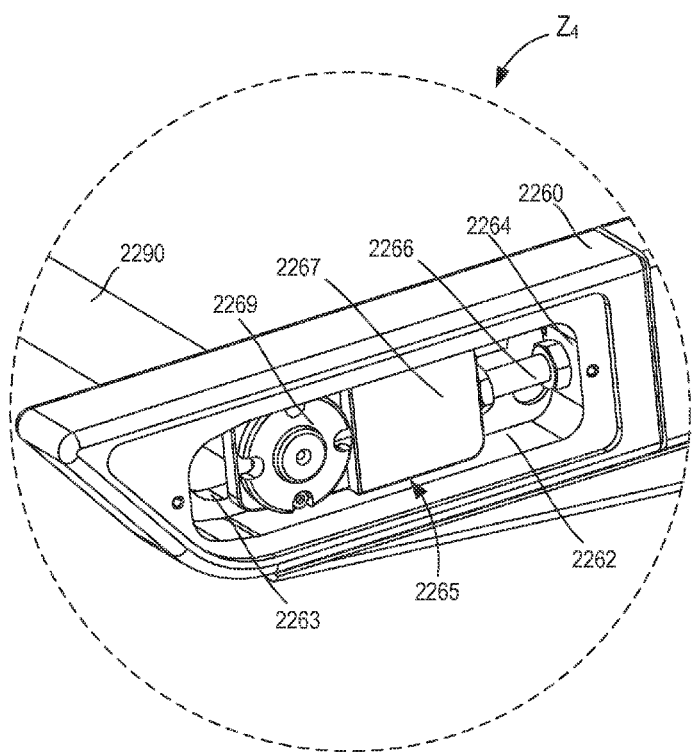
FIG. 34 is an enlarged view of a portion of the swing arm identified as the region $Z_4$ in FIG. 33.
Figure 35:
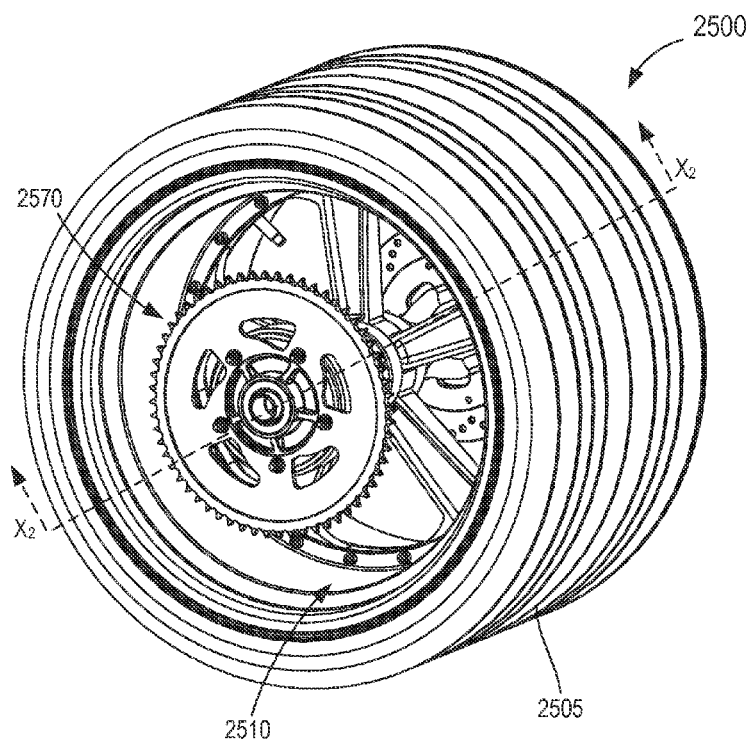
FIGS. 35 and 36 are a left perspective view and a right perspective view, respectively, of the wheel assembly illustrated in FIGS. 27 and 28.
Figure 36:
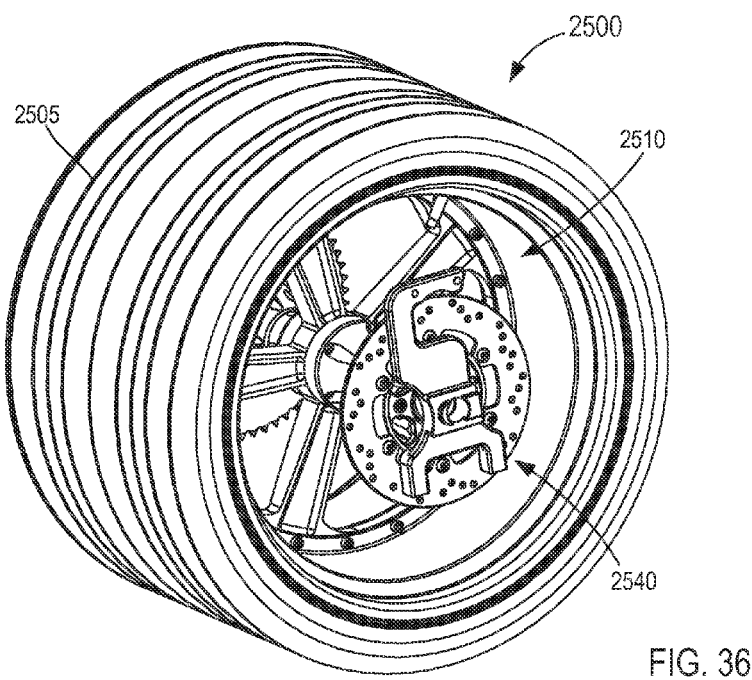

As shown in FIGS. 28, 33 and 34, the second arm 2260 includes a cover 2261 (FIG. 28) that at least partially encloses a recess 2249 configured to receive an axle coupling mechanism 2265 (FIGS. 33 and 34). The axle mounting portion 2265 can be configured to couple the axle 2290 to the second arm 2260 and allow for the position of the axle 2290 to be adjusted relative to the second arm 2260. For example, as shown in FIGS. 33 and 34, the axle coupling mechanism 2265 includes an adjustment bolt 2266 and a shuttle 2267 that are substantially similar in form and function as the adjustment bolt 2256 and the shuttle 2257 of the adjustment mechanism 2255. Thus, aspects of the adjustment mechanism 2265 are not described in further detail herein. As shown in FIG. 34, the second arm 2260 of the swing arm 2240 defines a slot 2250 (see e.g., FIG. 32) through which the second end portion 2292 of the axle 2290 can extend to be coupled to the axle coupling mechanism 2265. More specifically, the swing arm 2240 can include a coupling member 2269 that is configured to from a threaded coupling with the threaded surface of the second end portion 2292 of the axle 2290. In this manner, the coupling member 2269 can be advanced along the threaded surface to couple the axle 2290 to the swing arm 2240. Moreover, the coupling member 2269 can include, for example, a set of grooves or holes that can include a mechanical fastener (e.g., a bolt or the like) that can be coupled to a surface of the shuttle 2267 to prevent the coupling member 2269 from being rotated relative to the axle 2290. Although not shown in FIGS. 30-34, the wheel assembly 2500 can be disposed about the axle 2290 to rotatably couple the wheel assembly 2500 to the swing arm 2240.

Referring now to FIGS. 35-43, the wheel assembly 2500 includes a rim 2510, a brake assembly 2540, and a sprocket assembly 2570. The wheel assembly 2500 can have any suitable rim diameter such as, for example, 13", 14", 15", 16", 17", 18", 19", 20", 21", 22", 23", 24", or the like. Similarly, the wheel assembly 2500 can have any suitable rim width such as, for example, 10", 11", 12", 13", 14", 15", 16", 17", 18", 19", 20", 21", 22", 23", 24", 25", 26", 27", 28", 29", 30", 31", 32", or more or any suitable size therebetween. Furthermore, the wheel assembly 2500 can include the rear tire 2505 having any suitable size related at least in part on the size of the rim 2510. With the arrangement of the vehicle 2000 being a "reverse trike," the wheel assembly 2500 is configured to be substantially centered about the longitudinal centerline $C_L$ (FIG. 5) of the vehicle 2000. More specifically, the wheel assembly 2500 defines a radial axis R (see e.g., FIG. 38) that is substantially aligned, coplanar and/or coaxial with the longitudinal centerline $C_L$ of the vehicle 2000.

Figure 37:
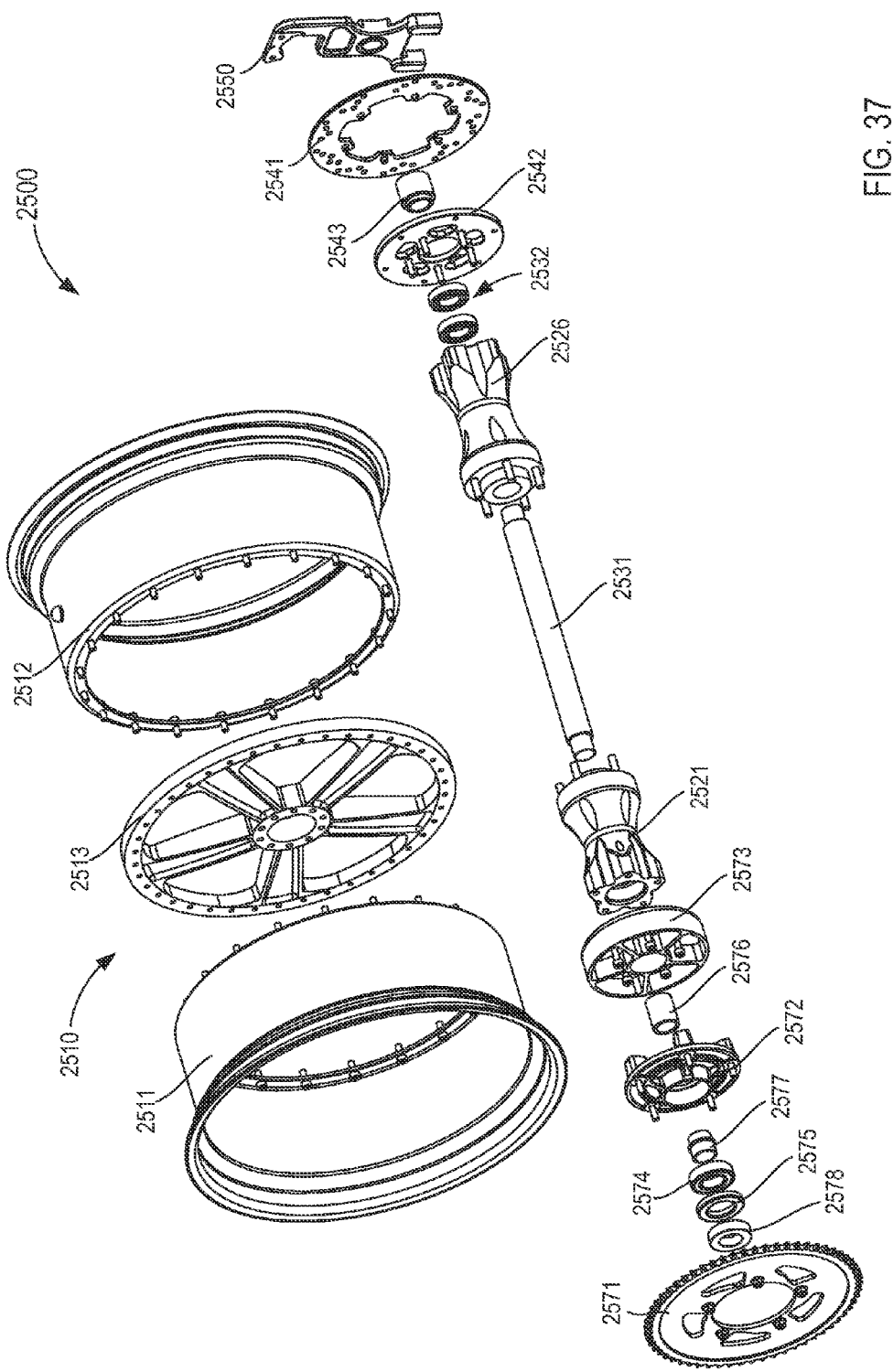
FIG. 37 is an exploded view of the wheel assembly illustrated in FIGS. 27 and 28.

As shown in FIG. 37, the rim 2510 includes a first portion 2511, a second portion 2512, and a third portion 2513. The first portion 2511, the second portion 2512, and the third portion 253 can be coupled via, for example, a set of mechanical fasteners or the like. Said another way, in some embodiments, the rim 2510 is formed by three individual parts that are coupled to form the rim 2510. In other embodiments, the rim 2510 can be unitarily formed from a single work piece such as billet aluminum or the like. The rim 2510 can be formed using any suitable manufacturing technique such as, for example, forging, casting, and/or machining (e.g., milling). Although the third portion 2513 is particularly shown in FIG. 37 as including a five spoke design, in other embodiments, the third portion 2513 can be any suitable design. Moreover, in some embodiments, the third portion 2513 can be interchangeable wherein an operator and/or technician can change the remove the third portion 2513 and install a replacement that can have, for example, a different design, color, style, etc. In some embodiments, the third portion 2513 can be sold independently from the vehicle 2000 and/or the first portion 2511 and the second portion 2512.

The wheel assembly 2500 includes a first hub 2521 and a second hub 2526 that are coupled to opposite sides of the third member 2513 of the rim 2510. As shown, for example, in FIG. 38, a first end portion of the first hub 2521 is coupled to the third member 2513 of the rim 2510 and a second end portion of the first hub 2521 is coupled to the sprocket assembly 2570. Similarly, a first end portion of the second hub 2526 is coupled to the third member 2513 of the rim 2510 and a second end portion of the second hub 2526 is coupled to the brake assembly 2540. Moreover, the first hub 2521 and the second hub 2526 can receive a center tube 2532 that extends substantially through the first hub 2521 and the second hub 2526. The second end portion of the first hub 2521 and the second end portion of the second hub 2526 each include a set of hub bearings 2532 configured to support the first hub 2521 and the second hub 2526 in such a way that the rim 2510, hubs 2521 and 2526, brake assembly 2540, and sprocket assembly 2570 can rotate about an axis defined by the center tube 2531.

Figure 38:
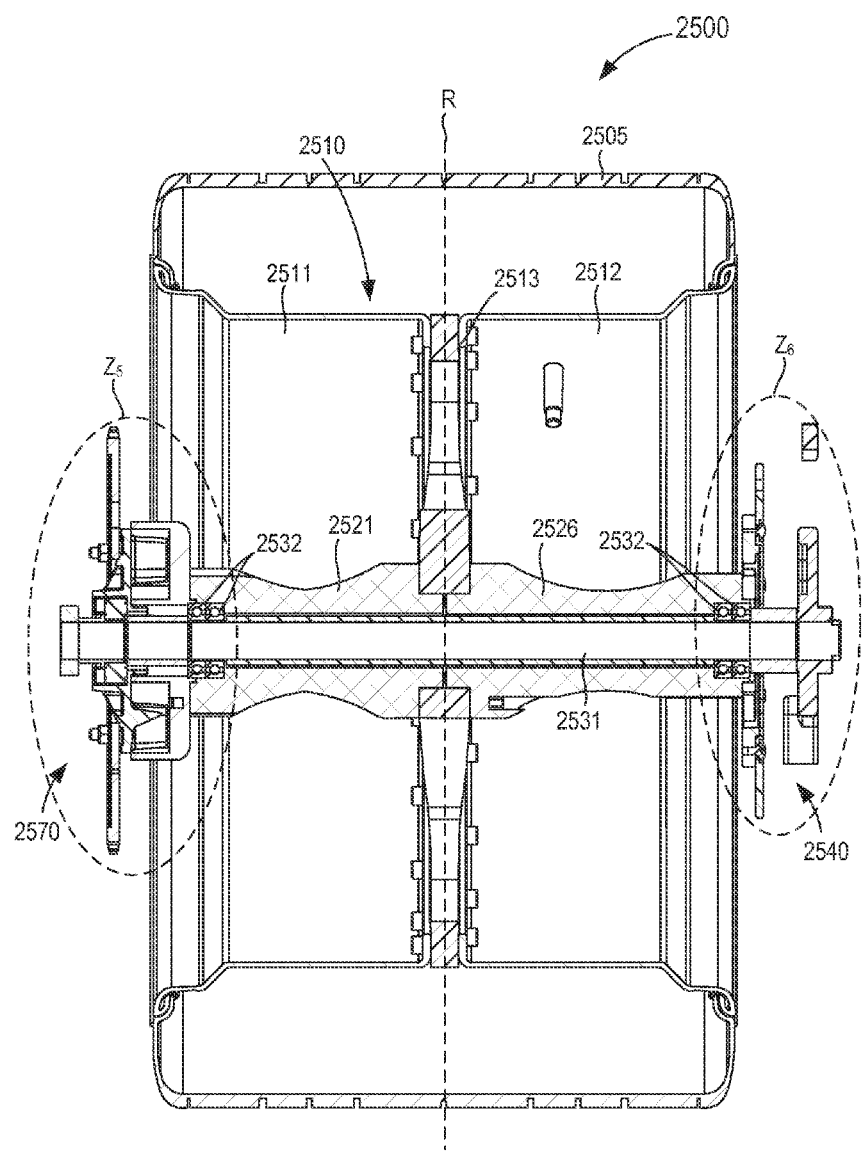
FIG. 38 is a cross-sectional view of the wheel assembly of FIGS. 27 and 28, taken along the line $X_2$-$X_2$ in FIG. 35.
Figure 39:
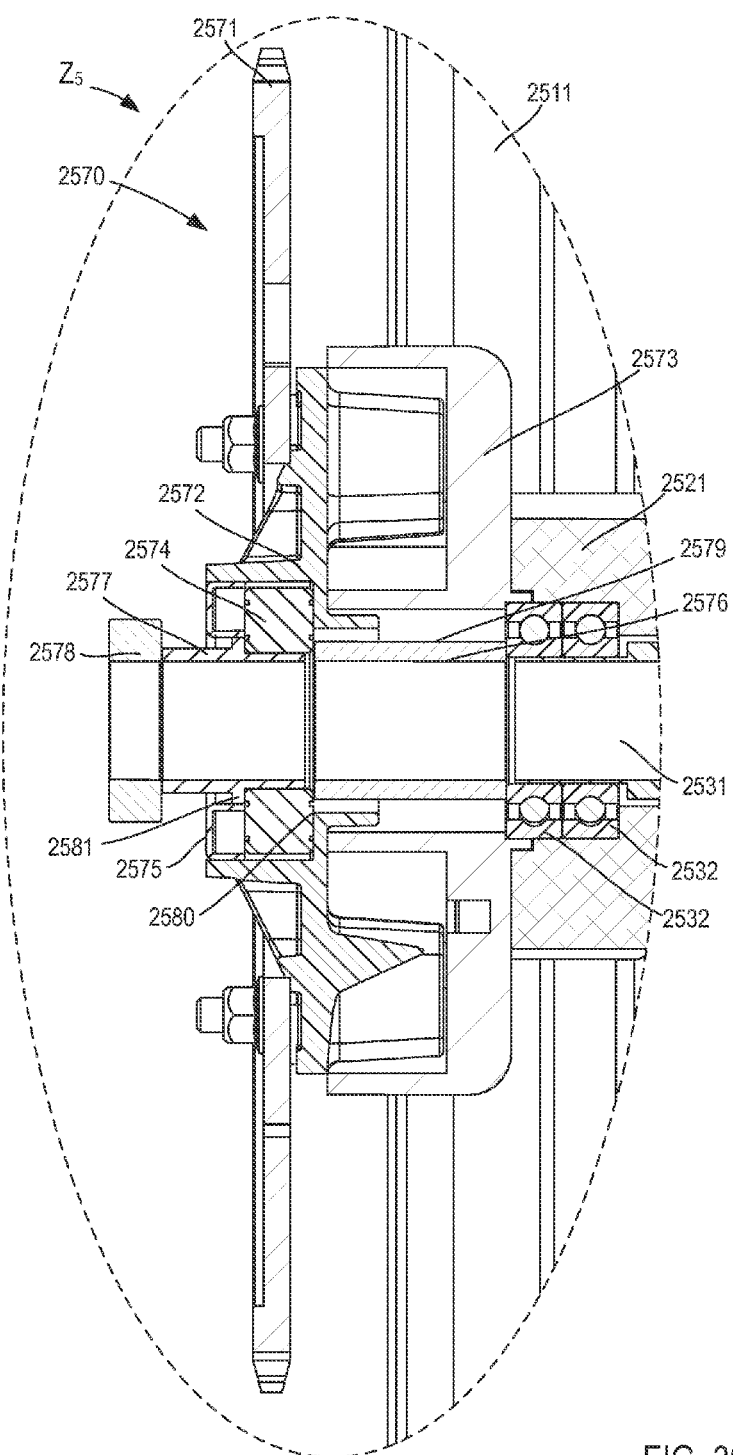
FIG. 39 is an enlarged view of the wheel assembly identified as the region $Z_5$ in FIG. 38.

As shown in FIGS. 37-39, the sprocket assembly 2570 includes a sprocket 2571, a sprocket bracket 2572, a cush disc 2573, a bearing 2574, a seal 2575, a first spacer 2576, a spacer bushing 2577, and a second spacer 2578. The cush disc 2573 is configured to be coupled to the first hub 2521 via, for example, a set of mechanical fasteners (e.g., bolts or the like). Although not shown in FIGS. 35-43, the cush disc 2573 can include a set of dampers disposed within one or more recesses defined by the cush disc 2573. In this manner, the dampers can be dampen and/or absorb an impulse force resulting from a change in torque applied to or on the sprocket 2571. More specifically, as shown in FIGS. 38 and 39, a first portion of the sprocket bracket 2572 is fixedly coupled to the sprocket 2571 via a set of mechanical fasteners and a second portion, substantially opposite the first portion, includes a set of protrusions or the like that can be disposed within the recesses defined by the cush disc 2573. In this manner, the dampers disposed within the recesses of the cush disc 2573 can envelop at least a portion of the protrusions of the sprocket bracket 2572 such that at least a portion of a force exerted by an abrupt change in rotational acceleration of the sprocket 2571 is dampened and/or absorbed by the dampers.

As shown in FIG. 39, the first spacer 2576 is disposed within an opening 2579 defined by the cush disc 2573 and an opening 2580 defined by the sprocket bracket 2580. In this manner, the spacer 2576 can reduce a space defined between a surface of the cush disc 2573 and/or the sprocket bracket 2572 and the axle 2290 (not shown) that would otherwise be defined. Similarly, at least a portion of the spacer bushing 2577 can be disposed within the opening 2580 defined by the sprocket bracket 2572 and can be configured to function similarly to the spacer 2576. Moreover, the spacer bushing 2577 can include a flange 2581 that can define, for example, a boundary or the like between an inner portion and an outer portion of the spacer bushing 2577. In this manner, the bearing 2574 can be disposed about the inner portion of the spacer bushing 2577 and the seal 2575 can be disposed between the flange 2581 and an inner surface of the sprocket bracket 2572 defining the opening 2580, as shown in FIG. 39. The second spacer 2578 can be disposed about the axle 2290 (not shown in FIGS. 37-39) between the spacer bushing 2577 and the first arm 2246 of the swing arm 2240, thereby defining a predetermined distance between the sprocket 2571 and the swing arm 2240.

Figure 40:
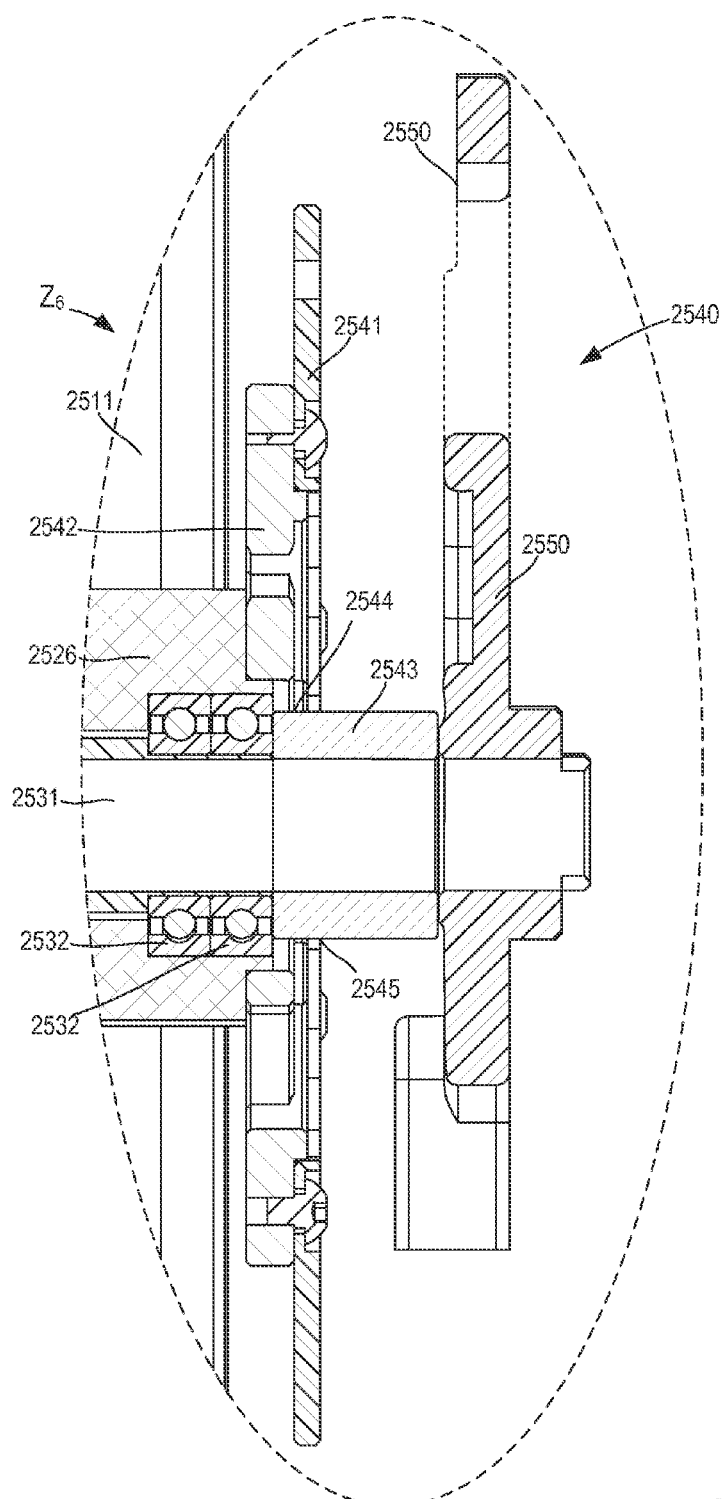
FIG. 40 is an enlarged view of the wheel assembly identified as the region $Z_6$ in FIG. 38.

As shown in FIGS. 37, 38 and 40, the brake assembly 2540 includes a rotor 2541, a rotor bracket 2542, a spacer 2543, and a brake hanger 2550. Although not shown in FIGS. 25-43, the brake assembly 2540 can include any suitable component commonly found in a brake system. For example, the brake assembly 2540 can include a master cylinder, slave cylinder, brake lines, one or more calipers, and brake pads. As shown in FIG. 40, the rotor bracket 2542 is fixedly coupled to the second hub 2526 via a set of mechanical fasteners. Similarly, the rotor 2541 is fixedly coupled to the rotor bracket 2542 via a set of mechanical fasteners. At least a portion of the spacer 2543 is disposed within an opening 2544 defined by the rotor bracket 2542 and an opening 2545 defined by the rotor 2541. In this manner, the spacer 2543 can be disposed between the rotor 2541 and the brake hanger 2550 to define a predetermined distance therebetween. For example, the spacer 2543 can be configured to define a distance between the rotor 2541 and the brake hanger 2550 such that a caliper (not shown) can be coupled to and/or supported by the brake hanger 2550 and disposed about a portion of the rotor 2541 (e.g., as is common seen in disc brake configurations in both motorcycles and four-wheeled vehicles).

Figure 43:
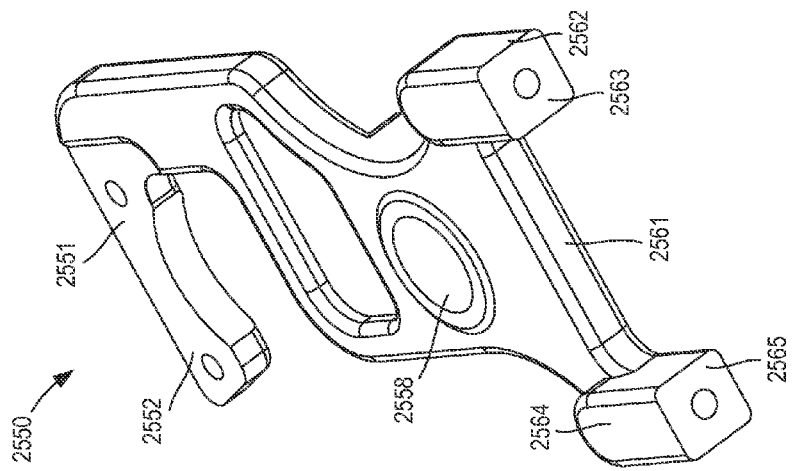
FIGS. 41-43 are a right perspective view, a left perspective view, and a bottom perspective view of a brake hanger included in the wheel assembly illustrated in FIGS. 27 and 28.
Figure 42:
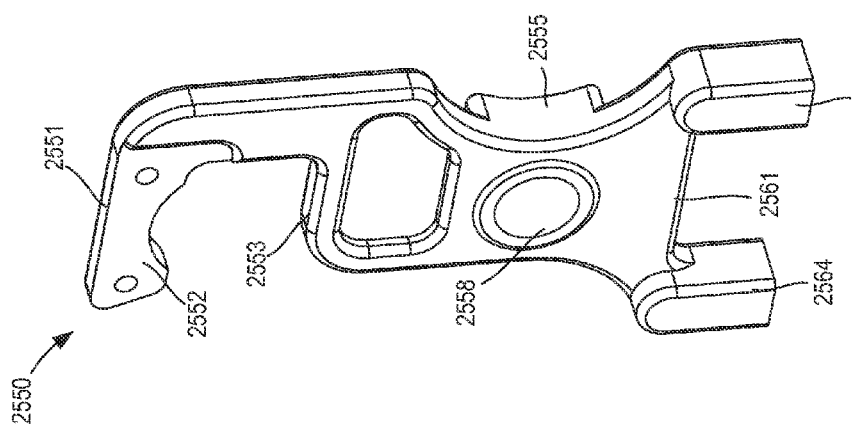
Figure 41:
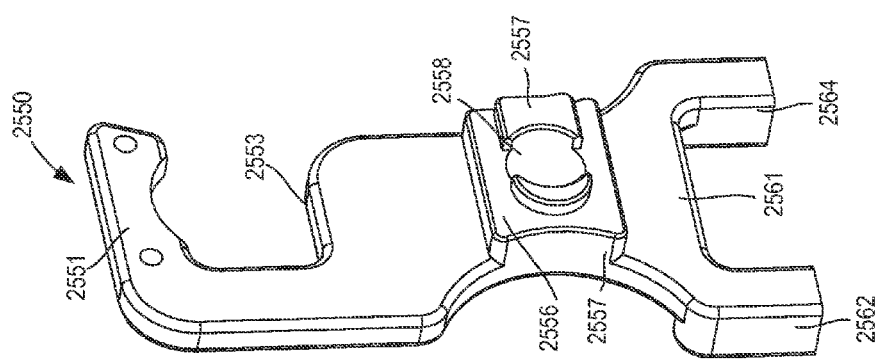

The brake hanger 2550 can be any suitable configuration. For example, as shown in FIGS. 41-43 the brake hanger 2550 can be configured to support and/or be coupled to a first brake caliper and a second brake caliper (not shown). More specifically, the brake hanger 2550 includes a first caliper mounting portion 2551, and a second caliper mounting portion 2561, and a hanger mounting portion 2555. The first caliper mounting portion 551 includes a mounting surface 2552 that can be placed in contact with a mounting portion of the first brake caliper, and defines a notch 2553 that can be configured to provide clearance for a piston (e.g., a "pot") of the brake caliper. The second caliper mounting portion 2561 includes a first arm 2562 having a mounting surface 2563, and a second arm 2564 having a mounting surface 2565. In this manner, the second caliper mounting portion 2561 can be mounted to a second brake caliper. In some embodiments, the first brake caliper and the second brake caliper can be substantially similar in form and function. Similarly stated, in some embodiments, the first brake caliper and the second brake caliper can each include brake pads that are configured to exert a force of the rotor 2541 to slow, stop, and/or prevent movement of the wheel assembly 2500.

The hanger mounting portion 2555 of the brake hanger 2550 includes a first protrusion 2556 and a second protrusion 2557, and defines an opening 2558 that extends through the brake hanger 2550. Although not shown in FIGS. 27-43, the brake hanger 2550 can be disposed about the axle 2290 and positioned between the spacer 2543 and the second arm 2260 of the swing arm 2240. In this manner, the axle 2290 can extend through the opening 2558 to be coupled to the second arm 2260, as described above. Moreover, the arrangement of the brake hanger 2550 can be such that the first protrusion 2556 of the hanger mounting portion 2555 is placed in contact with an inner surface of the second arm 2260 of the swing arm 2240 and the second protrusion 2557 is disposed within the slot 2263 defined by the second arm 2260. In this manner, the brake hanger 2550 and the spacer 2543 can be configured to define a predetermined space between, for example, the rotor 2541 and the swing arm 2240.

In this manner, the drive train 2400 can be included in the vehicle 2000 and used, for example, to provide propulsion for the vehicle 2000 in both the forward and reverse directions. The arrangement of the frame 2100, the reverse gear assembly 2420, the swing arm 2260, and the wheel assembly 2500 can, for example, obviate the need for engine output mechanisms such as, for example, a "jack shaft" or the like. Moreover, the arrangement of the brake hanger 2550 can be such that two brake calipers can be used, for example, concurrently and in substantially equal capacity to slow, stop, and/or prevent rotation of the wheel assembly 2500.

Figure 44:
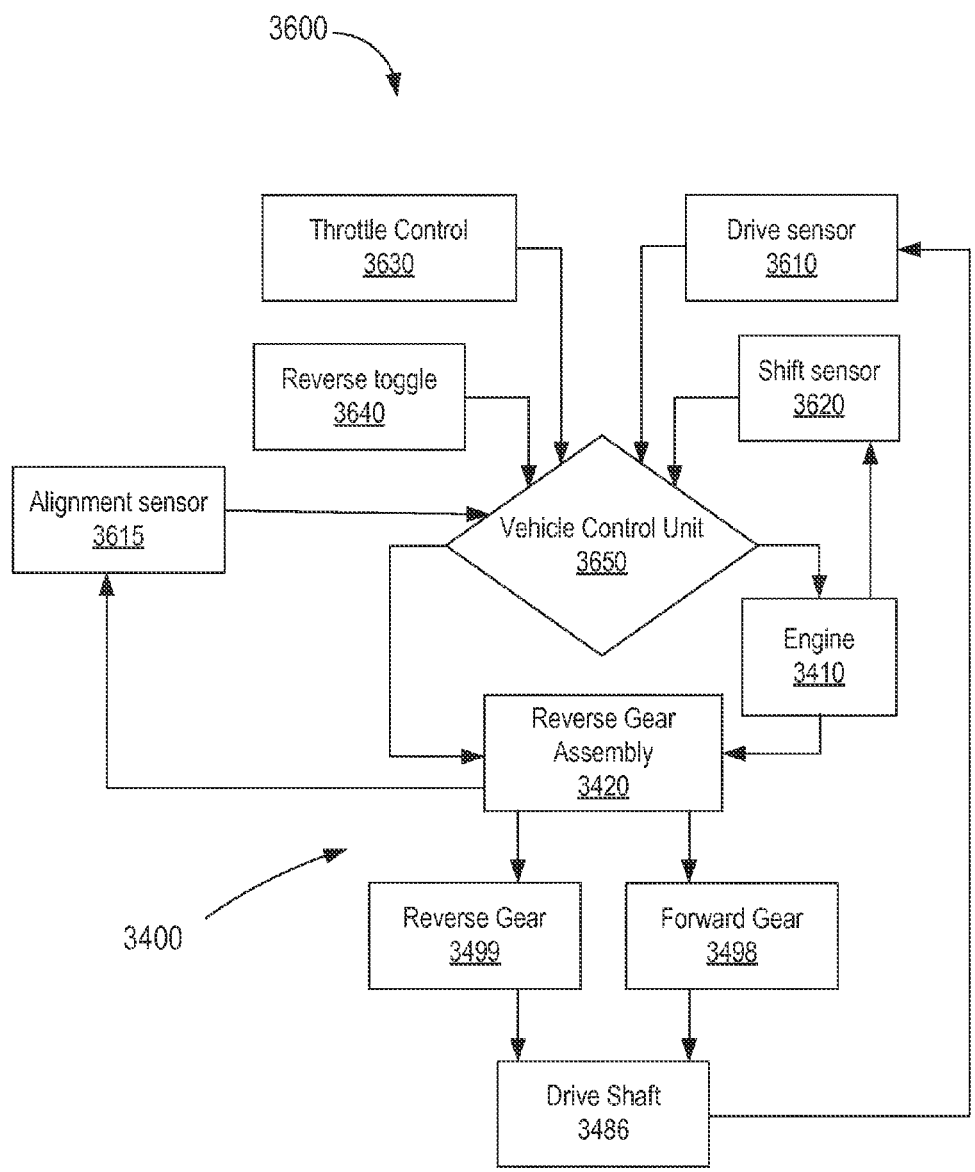
FIG. 44 is a flowchart illustrating a reverse gear control system according to an embodiment.

As described above, the vehicle 2000 can include any suitable electronic system configured to control the operation of the reverse gear assembly 2420. For example, FIG. 44 is a schematic block diagram of an electrical system 3600 configured to control at least a portion of a drive train 3400, according to an embodiment. The drive train 3400 includes at least an engine 3410 (or engine assembly, including an engine and a transmission included therein or operably coupled thereto) and a reverse gear assembly 3420 operably coupled thereto. The engine 3410 and the reverse gear assembly 3420 can be substantially similar to the engine 2410 and the reverse gear assembly 2420, respectively, described above with reference to the drive train 2400; thus, the structural components of the engine 3410 and the reverse gear assembly 3420 are not described in further detail herein.

As described above with reference to the reverse gear assembly 2420, the reverse gear assembly 3420 receives as an input, for example, a drive shaft (referred to henceforth as an "input shaft") from the engine 3410 (and/or a transmission included therein or coupled thereto). In response to a rotation of the input shaft (i.e., resulting from the operation of the engine 3410), the reverse gear assembly 3420, in turn, rotates an output shaft 3486. More specifically, the reverse gear assembly 3420 can be transitioned between a first or forward configuration (e.g., represented as "forward gear 3498" in FIG. 44), in which the output shaft 3486 is rotated in a first direction, and a second or reverse configuration (e.g., represented as "reverse gear 3499" in FIG. 44), in which the output shaft 3486 is rotated in a second direction, opposite the first direction.

The electrical system 3600 includes a throttle control 3630 (e.g., a throttle pedal of a foot pedal assembly), a reverse toggle 3640, a drive sensor 3610, a shift sensor 3620, and a vehicle control unit (VCU) 3650. The VCU 3650 can be any suitable vehicle control unit (VCU) and/or engine control unit (ECU). For example, in some embodiments, the VCU 3650 contains logic that determines the desired engagement of the drive train 3400, as described below. As shown, the VCU 3650 receives signals from the drive sensor 3610, the shift sensor 3620, the reverse toggle 3640, and the throttle control 3630. In some embodiments, the VCU 3650 can also receive an input from other sensors (not shown, but which can include, an engine speed sensor (tachometer), a vehicle speed sensor (speedometer), an intake manifold temperature sensor, etc.). In this manner, the VCU 3650 can determine the desired engine, transmission, reverse gear, and/or vehicle operating conditions and convey signals to various actuators, modules, and/or the like to control the engine, the transmission, the reverse gear assembly 3620, and/or vehicle accordingly.

The VCU 3650 can be, for example, a commercially-available processing device configured to perform one or more specific tasks related to controlling the vehicle. For example, the VCU 3650 can include at least a microprocessor and a memory device. The microprocessor can be, for example, a general purpose processor, a central processing unit (CPU), a front end processor, an application-specific integrated circuit (ASIC) or a combination of ASICs, which are designed to perform one or more specific functions and/or to execute a set of instructions or modules stored in the memory. In other embodiments, the microprocessor can be an analog or digital circuit, or a combination of multiple circuits. The memory device can include, for example, a read only memory (ROM), a random access memory (RAM), an electronically programmable read only memory (EPROM), erasable electronically programmable read only memory (EEPROM), and/or flash memory.

In some embodiments, the memory includes a set of instructions to cause the processor to execute modules, processes and/or functions used to control various portions of the vehicle. As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)), and/or software-based module (e.g., a module of computer code stored in memory and/or executed at the processor) capable of performing one or more specific functions associated with that module.

In use, to engage a reverse mode (i.e., reverse gear 3499 in FIG. 44) of the drive train 3400, a user can change the state of the reverse toggle 3640 from, for example, a first configuration, associated with a forward motion of the vehicle, to a second configuration, associated with a reverse motion of the vehicle (or vice versa). In some embodiments, the reverse toggle 3640 can be separate from a forward gear selector (e.g., the reverse toggle 3640 can be operably coupled to and/or included in the shift linkage or the like, which in turn, is coupled to the shift arm 2468 shown with reference to FIG. 18). In other embodiments, the reverse toggle 3640 can be integrated into the forward gear selector (e.g., a push button or the like). In response to being manipulated, the reverse toggle 3640 can send an electronic signal to the VCU 3650. The VCU 3650 can also receive signals from the drive sensor 3610, the shift sensor 3620, and/or the throttle sensor 3630 to determine the state of the drive train 3400. Thus, based on the condition of the vehicle and/or the drivetrain 3400, the VCU 3650 can perform one or more processes in response to receiving the signal from the reverse toggle 3640.

For example, if the drive sensor 3610 indicates the output shaft 3486 is rotating in a forward direction, if the shift sensor 3620 indicates a forward gear is engaged, and/or if the throttle control 3630 is not closed (e.g., in its minimum position), the VCU 3650 can receive the signal from the reverse toggle 3640, yet not perform an action in response thereto. Thus, in some embodiments, the VCU 3650 can "lock out" or otherwise prevent the operator from shifting between the reverse gear 3499 and the forward gear 3498. In other embodiments, the VCU 3650 can sound an alarm if the VCU 3650 determines that it is not desirable to change modes (i.e., between the reverse gear 3499 and the forward gear 3498). For example, in some embodiments, the VCU 3650 can send a signal to the engine 3410 to shut down, and/or can provide the user with some other feedback to indicate the mode cannot (or should not) be changed (e.g., a light indicator or other visual indicator, a buzzer or other auditory indicator, and/or the like).

In some embodiments, the reverse gear assembly 3420 can include an actuator (e.g., a solenoid or the like, not shown in FIG. 44) that can engage a portion of the reverse gear assembly 3420 to prevent the reverse gear assembly 3420 from being transitioned from the forward gear 3498 to the reverse gear 3499. For example, in some embodiments, the reverse gear assembly 3420 can include a shift arm which is operably coupled to a shift rod (e.g., substantially similar to the shift arm 2468 and the shift rod 2470, respectively, of the reverse gear assembly 2420). In such embodiments, the actuator can be transitioned from a first configuration, in which the actuator prevents movement of, for example, the shift rod, and a second configuration, in which the actuator at least temporarily allows movement of the shift rod. Thus, the actuator can be maintained in the first configuration until the VCU 3650 determines that the drivetrain 3400 is in a state suitable for shifting between the forward gear 3498 and the reverse gear 3499, or vice versa.

Moreover, in some embodiments, the reverse gear assembly 3420 can include the shift sensor 3620, the drive sensor 3610 and/or any other suitable sensors for controlling operation of the reverse gear assembly 3420, alerting the user to the condition of the reverse gear assembly 3420 or the like. For example, in some embodiments, the reverse gear assembly 3420 includes a sensor or the like that can sense, for example, the position of the shift rod, the position of an input gear disposed about the shift rod, a status of the actuator (e.g., in the first configuration or the second configuration), and/or the like. In some embodiments, the system 3600 can include an "alignment sensor" 3615 configured to sense the alignment position of an input gear (e.g., the input gear 2477) relative to an idler gear (e.g., the idler gear 2482) and/or the output gear (e.g., the output gear 2487). That is to say, the sensor can sense the position, alignment, engagement, meshing, and/or the like of the teeth of the input gear relative to the teeth of the idler gear and/or the teeth of the output gear. In this manner, the sensor can provide input to the VCU 3650 associated with the ability of the reverse gear to be changed between modes. For example, when the sensor determines that the teeth of the input gear (e.g., the input gear 2477) are aligned with the teeth of the idler gear (e.g., the idler gear 2482) and/or the output gear (e.g., the output gear 2487), the VCU can provide feedback to indicate the mode can safely be changed (e.g., via a light indicator or other visual indicator, a buzzer or other auditory indicator, and/or the like). Conversely, when the sensor determines that the teeth of the input gear (e.g., the input gear 2477) are not aligned with the teeth of the idler gear and/or the output gear (i.e., the teeth are moving relative to each other, or are not aligned), the VCU can provide feedback to indicate the mode cannot (or should not) be changed.

In some embodiments, the VCU 3650 can receive an "alignment position" signal from the sensor 3615, and in response, can send a signal to an indicator that can be activated, and/or to move the actuator from the first (or "lock out") position to the second (or "shift") position. In some embodiments, the VCU 3650 can receive a signal from the sensor 3615, and in response, can send a signal to multiple different indicators and/or actuators, such as a first indicator (e.g., associated with the forward gear 3498) and a second indicator (e.g., associated with the reverse gear 3499).

In other embodiments, the alignment position of the input gear (whether meshed and/or engaged with the output gear or the idler gear) can be used to indicate whether the reverse gear assembly 3420 is in the reverse gear 3499 mode or the forward gear 3498 mode. Thus, in some embodiments the alignment position sensor 3615 can detect the axial position (i.e., the position along an axis of rotation) of the input gear within the reverse gear assembly. In this manner, the VCU 3650 can produce an indication associated with the mode, independent from feedback related to the rotation of the output (or drive) shaft from the drive sensor 3610.

In some embodiments, the VCU 3650 can receive inputs from more than one sensor and can produce an output (either an indication or an actuation signal) based on multiple inputs, including the alignment sensor 3615, the drive sensor 3610 and/or the shift sensor 3620. For example, in some embodiments, if the drive sensor 3610 indicates the drive shaft 3486 is not rotating, if the shift sensor 3620 indicates the transmission is in neutral, and/or if the throttle control 3630 is closed, the VCU 3650 can perform one or more actions based on the signal sent from the reverse toggle 3640. For example, in some embodiments, the VCU 3650 can send a signal to an actuator or the like (described above), which in response, can be positioned to allow the shift rod of the reverse gear assembly 3420 to be moved (i.e., is placed in its second configuration). If the reverse toggle 3640 sends a signal associated with a forward motion of the vehicle, the operator can, for example, manually shift into a forward gear (e.g., first gear). Thus, with the actuator allowing movement of the shift rod, the shifting into a forward gear places the shift arm and thus, the shift rod of the reverse gear assembly 3420 in a position associated with the forward gear 3498. Once in the desired gear, the VCU 3650 can send a signal to the actuator to cause the actuator to transition to its first (or "lock out") configuration, thereby temporarily preventing movement of the shift rod.

If, however, the reverse toggle 3640 sends a signal associated with a reverse motion of the vehicle, the operator can manually shift into a reverse gear. In some embodiments, manually shifting into the reverse gear can be by manipulating the same shifter as the forward gear. In other embodiments, the manually shifting into the reverse gear can include shifting a second gear shifter and/or lever from a first configuration, associated with the forward gear, to a second configuration, associated with the reverse gear. In still other embodiments, the shifting can be, for example, via a toggle, switch, push button, and/or the like. In such embodiments, activating the toggle can send a signal to the VCU 3650, which in turn, can send electric power to, for example, a servo motor or the like that is operable in placing the reverse gear assembly in the reverse gear.

With the actuator allowing movement of the shift rod, the shifting into the reverse gear places the shift arm and thus, the shift rod of the reverse gear assembly 3420 in a position associated with the reverse gear 3499. Once in the reverse gear 3499, the VCU 3650 can send a signal to the actuator to cause the actuator to transition to its first configuration, thereby temporarily preventing movement of the shift rod. As such, the VCU 3650 can send a signal associated with the throttle control 3630 to the engine 3410, and in turn, the engine 3410 (and/or a transmission included therein or coupled thereto) can rotate the input shaft of the reverse gear assembly 3420. Thus, with the reverse toggle 3640 in a configuration associated with a reverse motion of the vehicle (i.e., the reverse gear assembly 3420 is in the reverse gear 3499), the reverse gear assembly 3420 rotates the output shaft 3486 in the second direction, which is associated with a reverse direction of the vehicle.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, although the embodiments are shown and described herein as being included within a three-wheeled vehicle, any of the embodiments described herein, such as, for example, the reverse gear assembly 2420 can be included in any suitable vehicle. For example, in some embodiments, a reverse gear assembly similar to the reverse gear assembly 2420 can be included in a two-wheeled vehicle or a four-wheeled vehicle, where applicable.

By way of another example, while the arrangement of the reverse gear assembly 2420 is particularly shown and described above with reference to, for example, FIGS. 11-26, various changes in form may be made without changing the function of the reverse gear assembly 2420. In some embodiments, such changes can, for example, change and/or enhance the performance of the reverse gear assembly 2420. For example, while the input gear 2476, the idler gear 2482, and the output gear 2487 are shown as having a particular size (see e.g., FIG. 21), which in turn, can correspond to a particular gear ratio, in other embodiments, the reverse gear assembly 2420 can include an input gear, an idler gear, and an output gear of any suitable size. Thus, in some embodiments, the gear ratio of the reverse gear assembly 2420 can be increased or decreased in response to a change in size of at least one of the input gear 2476, the idler gear 2482, and the output gear 2487. Moreover, in some embodiments, the gear ratio of the reverse gear assembly 2420, when in the reverse gear configuration, can be such that the rotational velocity of the output gear 2487 is limited, which in turn, can limit a velocity of the vehicle while in reverse.

As another example, while the input shaft 2475 and the output shaft 2486 are particularly shown in, for example, FIG. 18, in other embodiments, the reverse gear assembly 2420 can include any suitable input shaft and/or output shaft. For example, while the first end portion of the output shaft 2486 is shown and described above as receiving the bearing adapter 2491, which in turn, is pressed into the bearing 2489, which in turn, is pressed into the output opening 2432 (and/or a corresponding recess defined by the first housing member 2431), the reverse gear assembly 2420 can include an output shaft and bearing having any suitable arrangement. Specifically, the arrangement of the output shaft 2486 is such that the bearing adapter 2491 is disposed about a portion of the spline and includes a smooth outer surface corresponding to a smooth inner surface of the bearing 2489, thereby allowing a portion of the spline to extend through the housing 2430 to be coupled to the output sprocket 2496. In other embodiments, the reverse gear assembly 2420 can include an output shaft with, for example, a stepped or staged configuration.

For example, in some embodiments, an output shaft can have a first end, a second end, and a first spline. The second end can be substantially smooth and configured to be pressed into the bearing 2490, which in turn, is pressed into the bearing recess 2454. The first end can have a smooth portion and a second spline portion. The second spline portion is configuration to be disposed outside of the housing 2430 to engage the output sprocket 2496. The smooth portion of the first end is disposed between the first spline portion and the second spline portion and is configured to be pressed into the bearing 2489, which in turn, is pressed into the output opening 2432 (and/or a corresponding recess defined by the first housing member 2431). More specifically, the output shaft can have a first diameter associated with an outer surface at or along the first spline portion, a second diameter associated with the smooth portions, and a third diameter associated with the second spline portion. As described above, the output shaft can have a stepped or staged configuration. Thus, the first diameter is greater than the second diameter, and the second diameter is greater than or nominally greater than (e.g., substantially equal with a hard lower tolerance or minimum size) the third diameter. Thus, the bearing 2489 can be advanced over the second spline portion and pressed about the smooth portion of the first end. In this manner, the first end can partially extend through the housing 2430 to allow the second spline portion to engage the output sprocket 2496. Such an arrangement, therefore, can be obviate the need for the bearing adapter 2490. Moreover, the input shaft of the reverse gear assembly 2420 can be arranged in a substantially similar manner, thereby obviating the need for the bearing adapter 2480. In some embodiments, such an arrangement can, for example, reduce fluid leaks or the like that may otherwise result from the arrangement of the bearing adapters 2480 and 2490.

Although various embodiments have been described as having particular features and/or combinations of components, other embodiments are possible having a combination of any features and/or components from any of embodiments as discussed above. For example, wheels can be substituted for sprockets, gears can be substituted for pulleys, and belts can be substituted for chains, etc.

The embodiments described herein can be assembled at a manufacturing plant and delivered to an end user as a complete vehicle and/or the embodiments described herein can be delivered and assembled elsewhere.

While specific systems and subsystems are described, any of the embodiments herein can include and suitable system and/or subsystem that may be needed for the operation of the vehicle. For example, the embodiment described herein can include any suitable braking system and/or components thereof. Thus, any of the embodiments described herein can include, for example, a brake pedal, master cylinder, brake lines, calipers, pads, drums, shoes, reservoirs, etc. needed for the operation of the braking system. Similarly, any of the embodiments described herein can include controls and any suitable electronics coupled thereto for the operation of the systems and/or subsystems. For example, the embodiments described herein can include controls and/or electronics operative in the functioning of headlights, taillights, turn signals, windshield wipers, radios, etc.

Any of the components included in the embodiments described herein can be formed and/or manufactured using any suitable technique or combination thereof. For example, in some embodiments, the rim 2510 of the wheel assembly 2500 can be formed by machining each portion of the rim 2510 from a single billet of material such as, for example, aluminum. In other embodiments, the portions of the rim 2510 can be cast or forged. Moreover, any of the components included in the embodiments described herein can be exposed to any suitable treatment such as, for example, cold working, hot working, strain hardening, tempering, annealing, and/or the like. Furthermore, any of the components can include any suitable surface treatment and/or coating that can, for example, reduce friction, protect against fluids, salts, and/or other common road treatments, and/or the like.

What is claimed:

1. An apparatus, comprising:
    a housing configured to be coupled to an engine assembly of a vehicle;
    an input portion including an input gear disposed within the housing, the input portion operably coupled to the engine assembly such that rotation of an engine output member rotates the input gear, the input gear configured to be moved from a first position within the housing to a second position within the housing;
    an idler portion including an idler gear disposed in the housing and rotatably engaged with the input gear when the input gear is in its first position, the idler gear being spaced apart from the input gear when the input gear is in its second position; and an output portion including an output gear and an output member, the output member disposed outside of the housing and substantially coplanar with a drive portion of a rear wheel assembly, the output gear disposed within the housing and rotatably engaged with the idler gear, the output gear being spaced apart from the input gear when the input gear is in its first position such that rotation of the input gear indirectly rotates the output gear in a first direction via the idler gear, the output gear being rotatably coupled to the input gear when the input gear is in its second position such that rotation of the input gear directly rotates the output gear in a second direction, opposite the first direction, the output member configured to rotate with the output gear.

2. The apparatus of claim 1, wherein the engine assembly includes a transmission configured to rotate the output shaft of the engine assembly in the first direction.

3. The apparatus of claim 1, wherein the engine assembly includes a transmission configured to rotate the engine output member of the engine assembly in the first direction, the housing configured to be coupled exterior to the transmission.

4. The apparatus of claim 1, wherein the vehicle is a three-wheeled vehicle defining a longitudinal centerline, a radial axis of the rear wheel assembly being coaxial with the longitudinal centerline.

5. The apparatus of claim 1, wherein the vehicle is a three-wheeled vehicle defining a longitudinal centerline, the drive portion of the rear wheel assembly and the output member defining a drive plane that is offset from the longitudinal centerline.

6. The apparatus of claim 5, further comprising:
a continuous linkage coupled to the output member and the drive portion of the rear wheel assembly, a centerline of the continuous linkage being coplanar with the drive plane.

7. The apparatus of claim 5, further comprising:
a continuous linkage coupled to the output member and the drive portion of the rear wheel assembly, the continuous linkage being any one of a single chain or a single belt.

8. The apparatus of claim 1, wherein:
the engine assembly includes a transmission configured to rotate the engine output member of the engine assembly in the first direction, the transmission operably coupled to a first shifter configured to selectively shift the transmission between a plurality of gears; and
the input portion is operably coupled to a second shifter configured to selectively initiate movement of the input gear between its first position and its second position.

9. The apparatus of claim 1, further comprising:
a sensor configured to produce a signal associated with an alignment position of the input gear; and
an indicator configured to produce an indication in response to the signal.

10. An apparatus, comprising:
a frame of a vehicle defining a longitudinal centerline, the frame having an engine mounting portion configured to mount an engine assembly thereto;
a swing arm having a first end portion rotatably coupled to the frame, and a second end portion rotatably coupled to a rear wheel assembly, the rear wheel assembly including a drive portion; and
a reverse gear assembly coupled to the engine assembly, the reverse gear assembly including an input shaft including an input gear and an output shaft including an output gear and an output member, the input shaft configured to receive an input from the engine assembly such that the input gear rotates in a first direction, the output member being operatively coupled to the drive portion of the rear wheel assembly via a continuous linkage, the input gear configured to move relative to the output gear to transition the reverse gear assembly between a first configuration, in which the output gear is rotated in the first direction, and a second configuration, in which the output gear is rotated in a second direction opposite the first direction.

11. The apparatus of claim 10, wherein the engine assembly includes a transmission configured to rotate the input gear in the first direction, the reverse gear assembly configured to be coupled exterior to the transmission.

12. The apparatus of claim 10, wherein:
the engine assembly includes a transmission configured to rotate the input gear in the first direction, the transmission operably coupled to a shifter configured to selectively shift the transmission between a plurality of gears; and
the reverse gear assembly including an actuator configured to selectively initiate movement of the input gear between its first position and its second position.

13. The apparatus of claim 10, wherein the vehicle is a three-wheeled vehicle defining a longitudinal centerline, a radial axis of the rear wheel assembly being coaxial with the longitudinal centerline.

14. The apparatus of claim 10, wherein the vehicle is a three-wheeled vehicle defining a longitudinal centerline, the drive portion of the rear wheel assembly and the output member defining a drive plane that is offset from the longitudinal centerline.

15. The apparatus of claim 14, further comprising:
the continuous linkage coupled to the output member and the drive portion of the rear wheel assembly, a centerline of the continuous linkage being coplanar with the drive plane.

16. The apparatus of claim 10, further comprising:
a sensor configured to produce a signal associated with an alignment position of the input gear; and
an indicator configured to produce an indication in response to the signal.

17. The apparatus of claim 16, wherein the sensor is configured to produce a signal associated with an alignment position of the input gear relative to at least one of the input shaft or the output gear.

18. The apparatus of claim 16, wherein the indicator is configured to produce a visual indication associated with the direction of motion of the output member.

19. The apparatus of claim 10, wherein the reverse gear assembly includes an actuator configured to transition between a first configuration and a second configuration, the actuator configured to limit movement of the input gear between its first position and its second position when in the first configuration, the actuator configured to allow movement of the input gear between its first position and its second position when in the second configuration.

20. An apparatus, comprising:
a housing configured to be coupled to an engine assembly of a vehicle;
an input portion including an input gear disposed within the housing, the input portion operably coupled to the engine assembly such that rotation of an engine output member rotates the input gear, the input gear configured to be moved from a first position within the housing to a second position within the housing;
an idler portion including an idler gear disposed in the housing and rotatably engaged with the input gear when the input gear is in its first position, the idler gear being spaced apart from the input gear when the input gear is in its second position;

an output portion including an output gear rotatably coupled to the idler gear, the output gear being spaced apart from the input gear when the input gear is in its first position such that rotation of the input gear indirectly rotates the output gear in a first direction via the idler gear, the output gear being rotatably coupled to the input gear when the input gear is in its second position such that rotation of the input gear directly rotates the output gear in a second direction; and a sensor configured to produce a signal associated with an alignment position of the input gear.

21. The apparatus of claim 20, wherein the vehicle is a three-wheeled vehicle defining a longitudinal centerline, the three-wheeled vehicle including a rear wheel assembly defining a radial axis, the radial axis being coaxial with the longitudinal centerline.

22. The apparatus of claim 21, wherein the output portion includes an output member, the output member being disposed outside of the housing and operably coupled to a drive portion of the rear wheel assembly, the drive portion of the rear wheel assembly and the output member defining a drive plane that is offset from the longitudinal centerline.

23. The apparatus of claim 21, wherein the output portion includes an output member, the output member being disposed outside of the housing and operably coupled to a drive portion of the rear wheel assembly, the drive portion of the rear wheel assembly and the output member defining a drive plane that is offset from the longitudinal centerline, the apparatus further comprising:

a continuous linkage coupled to the output member and the drive portion of the rear wheel assembly, a centerline of the continuous linkage being coplanar with the drive plane.

24. The apparatus of claim 20, wherein the sensor is configured to produce a signal associated with an alignment position of the input gear relative to at least one of the input shaft or the output gear.

25. The apparatus of claim 20, further comprising:
an indicator configured to produce an indication associated with the signal.

26. The apparatus of claim 20, further comprising:
an actuator configured to transition between a first configuration and a second configuration based on the signal, the actuator configured to limit movement of the input gear between its first position and its second position when in the first configuration, the actuator configured to allow movement of the input gear between its first position and its second position when in the second configuration.

27. The apparatus of claim 26, further comprising:
an indicator configured to produce an indication associated with the actuator.

\* \* \* \* \*